United States Patent [19]

Hogan et al.

[11] Patent Number: 5,619,554
[45] Date of Patent: Apr. 8, 1997

[54] DISTRIBUTED VOICE SYSTEM AND METHOD

[75] Inventors: Steven J. Hogan; Kristi T. Feltz; Douglas R. Murdock; David J. Vercande, all of Cedar Rapids; Roy A. Rhodes, Marion, all of Iowa

[73] Assignee: LinkUSA Corporation, Cedar Rapids, Iowa

[21] Appl. No.: 257,623

[22] Filed: Jun. 8, 1994

[51] Int. Cl.$^6$ .............................. G10L 9/00; H04M 1/64; H04M 3/50
[52] U.S. Cl. .................. 379/67; 379/88; 379/89; 379/71; 379/76; 395/2.79; 395/2.87
[58] Field of Search .................... 379/67, 88, 89, 379/142, 112, 71, 76, 83, 87; 370/61; 395/2.87, 2.89, 2.79

[56] References Cited

U.S. PATENT DOCUMENTS

| | | |
|---|---|---|
| 4,232,199 | 11/1980 | Boatwright et al. . |
| 4,611,096 | 9/1986 | Asmuth et al. . |
| 4,625,081 | 11/1986 | Lotito et al. ............................... 379/88 |
| 4,697,282 | 9/1987 | Winter et al. ............................. 379/88 |
| 4,841,574 | 6/1989 | Pham et al. ............................... 381/31 |
| 4,891,835 | 1/1990 | Leung et al. ............................. 379/88 |
| 4,905,003 | 2/1990 | Helferich ................................. 341/110 |
| 4,918,322 | 4/1990 | Winter et al. ............................. 379/96 |
| 5,222,120 | 6/1993 | McLeod et al. ........................... 379/88 |
| 5,359,645 | 10/1994 | Katz ......................................... 379/88 |
| 5,367,609 | 11/1994 | Hopper et al. ........................ 395/2.87 |
| 5,384,829 | 1/1995 | Heileman, Jr. et al. ................. 379/67 |
| 5,448,633 | 9/1995 | Jammaleddin ......................... 379/207 |
| 5,477,541 | 12/1995 | White et al. ........................... 370/94.1 |

OTHER PUBLICATIONS

*Summa Architec Series Portico*, (SDS Product Overview), 1992.
*The Open Architect Network Interface*, "Profit from Open Architecture".

Primary Examiner—Krista M. Zele
Assistant Examiner—Parag Dharia
Attorney, Agent, or Firm—Sterne, Kessler, Goldstein & Fox, P.L.L.C.

[57] ABSTRACT

A distributed voice system and method provides voice scripting and voice messaging to a call processing system. According to this system and method, audio voice is recorded in frames and the frames encapsulated into data packets. The data packets are stored in a database as voice scripts or voice messages. To play back a voice script or voice message, its packets are sequentially retrieved from the database. As soon as the first packet is retrieved, the data are extracted therefrom and playback can begin. As the voice is being played back to a user 106, subsequent packets are retrieved, the data extracted therefrom, and the data buffered for playback. In this manner, a voice script or a voice message can be played back without interruption.

16 Claims, 44 Drawing Sheets

| FIG 35 | FIG 38 |
| FIG 36 | FIG 39 |
| FIG 37 | FIG 40 |

DISTRIBUTED VOICE SYSTEM AND METHOD

BACKGROUND OF THE INVENTION

1. Field of the Invention

The present invention relates generally to systems and methods used in processing telephone calls, and more particularly, to systems and methods for allowing telephone carriers to offer enhanced products and services to their subscribers.

2. Related Art

Deregulation of the long-distance telephone industry spawned the growth of numerous long-distance service providers, each vying for a share of the United States' long-distance market. Thus far, the U.S. industry is dominated by three large companies: AT&T, MCI and Sprint. These large carriers have the resources and capital at their disposal to enable them to develop and provide a wide range of telephone-related services to their customers.

Perhaps less known, but still extremely important in the more than $50 billion interexchange U.S. long-distance market, are the smaller companies. In 1991, AT&T, MCI and Sprint controlled approximately 85 percent of the U.S. market. At this time, 12 medium-sized companies shared eight percent of the U.S. market. The remhining seven percent of the U.S. market was divided among nearly 320 small carriers.

The larger carriers are able to attract customers by offering a full range of services in addition to direct dial calling. These services include, but are not limited to: operator-assisted calling, full-feature calling cards, and specialized 800 number routing.

The strategy followed by the smaller carriers in attracting customers has been to offer excellent service and low-cost, direct-dial long-distance calling (e.g. 1+calling). Many smaller carriers, for example, focus on a particular geographic market. By understanding the market's calling patterns, the smaller carrier can maximize crucial economies and can attract subscribers by offering long-distance calling at rates lower than those offered by larger carriers.

Additionally, many smaller carriers use the fact that they are a small, local business in order to attract other local businesses as their clients. These carriers stress the ability to offer more personalized, responsive attention than some larger carriers may provide.

However, many of the smaller carriers are finding it increasingly difficult to compete with the larger carriers by offering direct-dial calling alone. For these carriers to attract and retain customers, they need the ability to offer the same range of features and services provided by some of the larger carriers. For example, a small carrier may have a small travel agency as a long-distance subscriber. As the travel agency grows, develops more business, and hires additional salespersons, the travel agency's telephone services requirements also grow. The travel agency may want to offer calling cards to its salespersons who travel frequently The travel agency may also want the ability to re-route an incoming call that was made to their 800 number. Such re-routing allows the travel agency to re-route incoming 800-number calls to any telephone number, a voice mailbox, or a pager. Additionally, the travel agency may want the ability for its office workers, clients and vendors to make operator-assisted calls.

Unfortunately, most smaller carriers can only provide direct-dial long distance service to its customers. If a smaller carrier wants to offer enhanced products to its customers, the smaller carrierl has two choices. First, the smaller carrier may purchase its own telephone switching system and operator consoles. Second, the smaller carrier may purchase and resell the products of one of its larger competitors.

However, reliable, affordable, and scalable switching equipment is not commercially available. If a long-distance carrier wants to purchase its own equipment, the selection is limited to the large-scale complex switching systems that are currently available. Because these systems are costly, in most instances, the smaller carrier is forced to go through a larger carrier to obtain enhanced products.

Several problems arise out of the inability of smaller carriers to provide enhanced calling services. Three of these problems are now described.

First, the flexibility and customization options available to the smaller carriers in providing services are limited when they resell the products of their larger competitors. One reason for this is that those products were not designed with the smaller carriers' needs in mind. For example, consider a smaller carrier that wants to offer a product like 800 number forwarding to its customers. The smaller carrier will want its customers to hear customized user prompts, including the identification of the carrier. The smaller carrier will also want to establish its own prices for the service. To further customize its systems, the carrier may want to change the way the call processes, or to add additional features such as the ability to route an 800 number to a voice mailbox.

In another example, the smaller carrier is unable to provide carrier-unique operator services. The cost of providing operator services prohibits most smaller carriers from hiring their own operators and purchasing the required equipment. Instead, smaller carriers typically purchase operator services from a competitor carrier or from operator service providers.

One drawback of having to use a competitor's operators is the inability to custom brand the call. For example, when a customer of the smaller carrier places an operator-assisted call using a competitor carrier's operators, she hears the operator of the competitor carrier thank her for using the competitor carrier's services. For example, consider the following hypothetical. XYZ, a small carrier, procures operator services for its users from ABC, a large carrier. When XYZ's user places an operator-assisted call, the operator answers the call with the greeting: "Thank you for using ABC."

Another drawback of having to use another's operators is the inability to custom-tailor call processing because the operator services provided and the operator responses cannot be customized. The smaller carrier has no control over the operators used by the competitor carrier or the operator service provider.

Relying on larger carriers for providing these enhanced products does not give smaller carriers the flexibility they desire. This is because smaller carriers cannot customize the products they obtain from the larger carriers to provide unique services to their subscribers.

A second problem is the range of services that can be provided by a smaller carrier is limited to the services that carrier can purchase from its competitors. As a result, the smaller carrier often cannot create innovative new products and services to offer its customers.

Another problem is the smaller carrier's inability to get customized fulfillment material through a competitor carrier. For example, calling cards provided by a larger competitor carrier, in turn to be provided to the smaller carrier's customers, often bear the name of the competitor carrier.

In summary, because the small carriers must rely on the larger competitor carriers for advanced products and services such as calling cards, operator assistance, 800 service, audiotext, voice mail, and the like, the smaller carriers cannot offer a full range of carrier-unique and customer-unique products. As a result, the smaller carriers lose part of their ability to compete in the U.S. long-distance market.

The problems of flexible control of a telephone network are not limited to the smaller carriers or the long-distance industry. All telephone carriers would benefit from the ability to offer popular, customized, value-added services. Commercially available hardware and conventional solutions to date, however, do not offer this ability.

SUMMARY OF THE INVENTION

The present invention is directed toward a system and method for recording and playback of voice scripts and voice messages for subscribers to a call processing system. Voice scripts are used to allow an automated voice response unit to provide instructions to and otherwise communicate with users of the call processing system. Voice scripts are recorded and stored in a voice script service. When required, a voice script is retrieved from the voice script service and played to the user. The voice script provides a user with a greeting, instructions on how to proceed when using an enhanced feature of the call processing system, and/or other required information. The voice scripts can be customized to a particular carrier or user, and can also be provided in a specified language.

When a call is placed by a user requiring operator assistance, a network control processor receives the call data for that call, allocates an operator console to handle the call, and provides information to the console allowing the console to retrieve and play the appropriate script.

When a voice script or a voice message is recorded, the frames of audio voice are encapsulated into packets and the packets are stored in a database. Preferably, each packet contains a plurality of frames of audio voice. When a voice message or voice script is to be played to a user 106, the first packet of that voice script or voice message is retrieved and playback begins immediately. As the first packet is depacketized and the voice script played to the user, subsequent packets are retrieved, the data extracted therefrom and queued in a buffer for playback. As a result, playback can begin as soon as the first packet is retrieved and playback continues without interruption until the voice script or the voice message is completely played.

The capability is also provided to record voice scripts remotely. This is accomplished through an automated voice response unit. To accomplish this, a user with the appropriate access can dial into a voice response unit and record a voice script in the same way that voice messages are recorded. As a result of this capability, carrier-customers of the call processing system can change their customer-specific voice scripts without intervention by a human operator at the call processing system.

BRIEF DESCRIPTION OF THE DRAWINGS

The present invention is described herein with reference to the accompanying drawings. In the drawings, like reference numbers indicate identical or functionally similar elements. Additionally, the left digit(s) of each reference number identifies the drawing in which the reference number first appears.

FIG. 7 is a high-level operational flow diagram illustrating the process that the call processing system uses to process operator-assisted calls.

FIG. 8, which is a continuation of FIG. 7, illustrates a high-level operational flow of the process that the call processing system uses to process operator-assisted calls.

FIG. 34, which comprises

FIG. 35 is an operational flow diagram illustrating a manner in which packets are retrieved from the voice script service and placed in the frame block queue.

FIG. 36, which is a continuation of FIG. 35, is an operational flow diagram illustrating a manner in which packets are retrieved from the voice script service and queued in the frame block queue.

FIG. 37, which is a continuation of FIGS. 35 and 36, is an operational flow diagram illustrating the manner in which packets are retrieved from voice script service and placed into the frame block queue.

FIG. 38, which is a continuation, of FIG. 35, is an operational flow diagram illustrating a manner in which packets are retrieved from voice script service and stored in the frame block queue.

FIG. 39, which is a continuation of FIG. 37, is an operational flow diagram illustrating a manner in which packets are retrieved from the voice script service and placed into the frame block queue.

FIG. 40, which is a continuation of FIG. 37, is an operational flow diagram illustrating a manner by which packets are retrieved from the voice script service and placed into the frame block queue.

DETAILED DESCRIPTION OF THE PREFERRED EMBODIMENTS

Table of Contents 1.0 High-Level Overview of the Invention
1.1 Standard Call Processing System
1.2 Enhanced Call Processing System
2.0 Distributed Voice System
2.1 Distributed Voice Scripts 2.1.1 Voice Script Recording
    2.1.2 Voice Script Play
2.2 Voice Messaging 2.2.1 Voice Message Recording
    2.2.3 Remote Script Recording
2.3 Voice Data Processor
2.4 Voice Recording
2.5 Voice Playback
2.6 Packet Retrieval
3.0 DEF
4.0 Conclusion 1.0 High-Level Overview of the Invention The present invention is directed toward a distributed voice system and method for recording and playing back voice scripts and voice messages. The distributed voice system operates in the environment of a call processing system. In order to provide the reader with a more complete understanding of the invention, two call processing systems iare first described. In Section 1.1, a standard call processing is described. Section 1.2 describes an enhanced call processing system that utilizes a network control processor (NCP) 304 (illustrated in FIG. 3) to provide enhanced call processing features. In Section 2 of this document a distributed voice system and method are described. In Section 3, data records, known as DEF records, are described.

1.1 Standard Call Processing System

Figure 1:
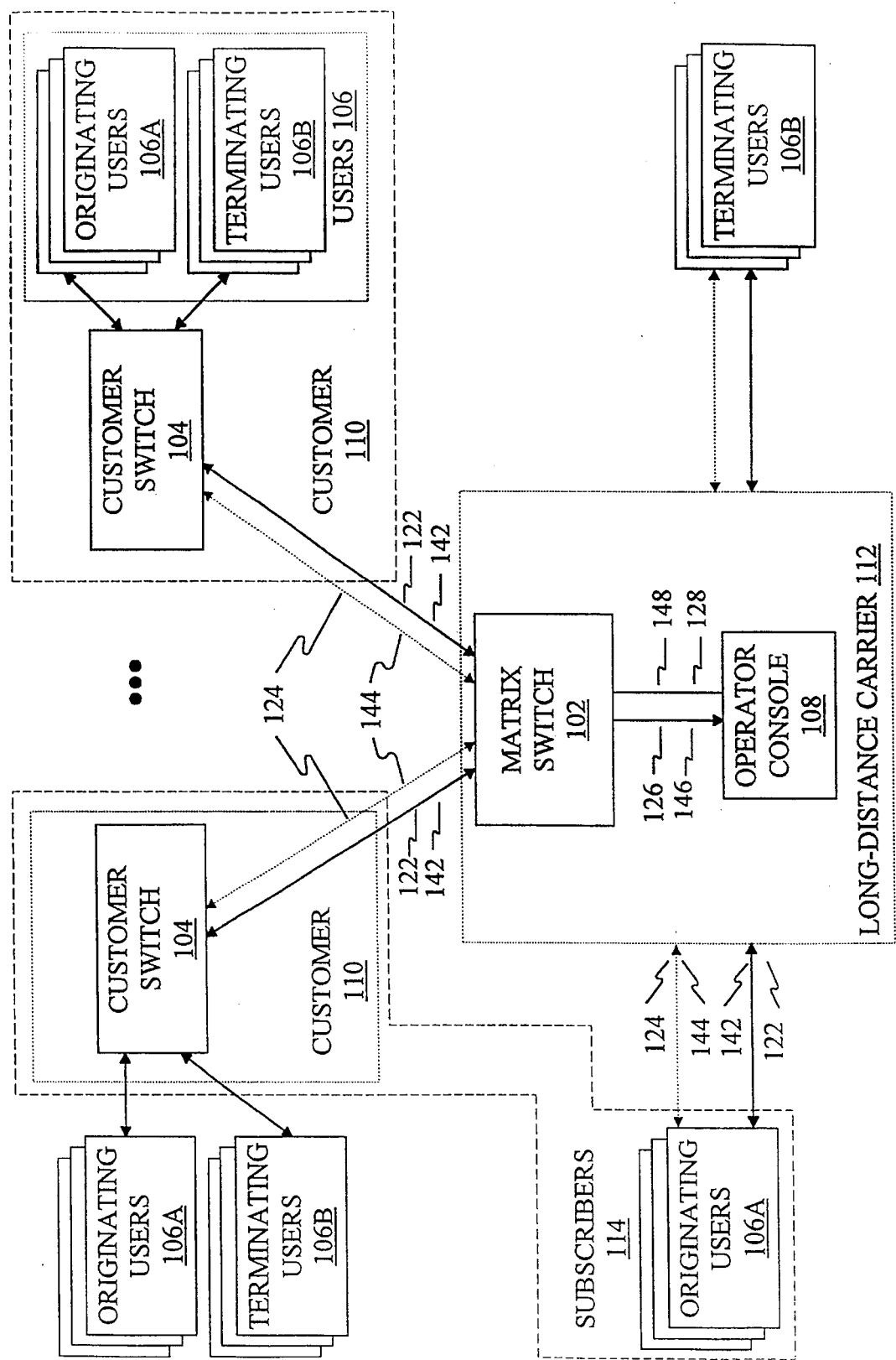
FIG. 1 is a high-level block diagram illustrating the architecture of a conventional telephone switching configuration.

An example of a conventional telephone switching configuration is illustrated in FIG. 1. FIG. 1 is a high-level block diagram illustrating the architecture of a conventional telephone switching configuration. Referring now to FIG. 1, the configuration includes a matrix switch 102 and an operator console 108. A typical subscriber 114 to a long-distance carrier 112 may be a business, another carrier, or an individual user 106. Customer 110 may, for example, be a business or it may be a carrier that is procuring enhanced services from a competitor long-distance carrier 112. Customer 110 may have its own customer switch 104 for routing calls between outside trunks and inside lines or instruments.

Users 106 (for example, humans talking on the telephone) place long-distance calls using long-distance carrier 112. The user 106 who places the call (calling party) is termed an originating user 106A. The user 106 to whom the call is placed (called party) is termed a terminating user 106B.

Originating user 106A may place the call directly with long-distance carrier 112 where originating user 106A is a customer of long-distance carrier 112. Where originating user 106A subscribes to another carrier that is a customer 110 of long-distance carrier 112, the call is routed through customer 110. Where originating user 106A is an end-user at a business that is a customer 110 of long-distance carrier 112 and that has its own switch 104, that originating user's call also gets routed through customer switch 104. In the latter two cases, originating user 106A is deemed a "client" of customer 110.

Matrix switch 102 is provided as a switch to route calls between users 106. A call is routed from originating user 106A to terminating user 106B. Matrix switch 102 typically can route thousands of telephone calls simultaneously. An example of matrix switch 102 is the commercially-available switch model DMS 250, manufactured by Northern Telecom, Inc. in Richardson, Tex., USA. "DMS" is a registered trademark of Northern Telecom, Inc.

Figure 2:
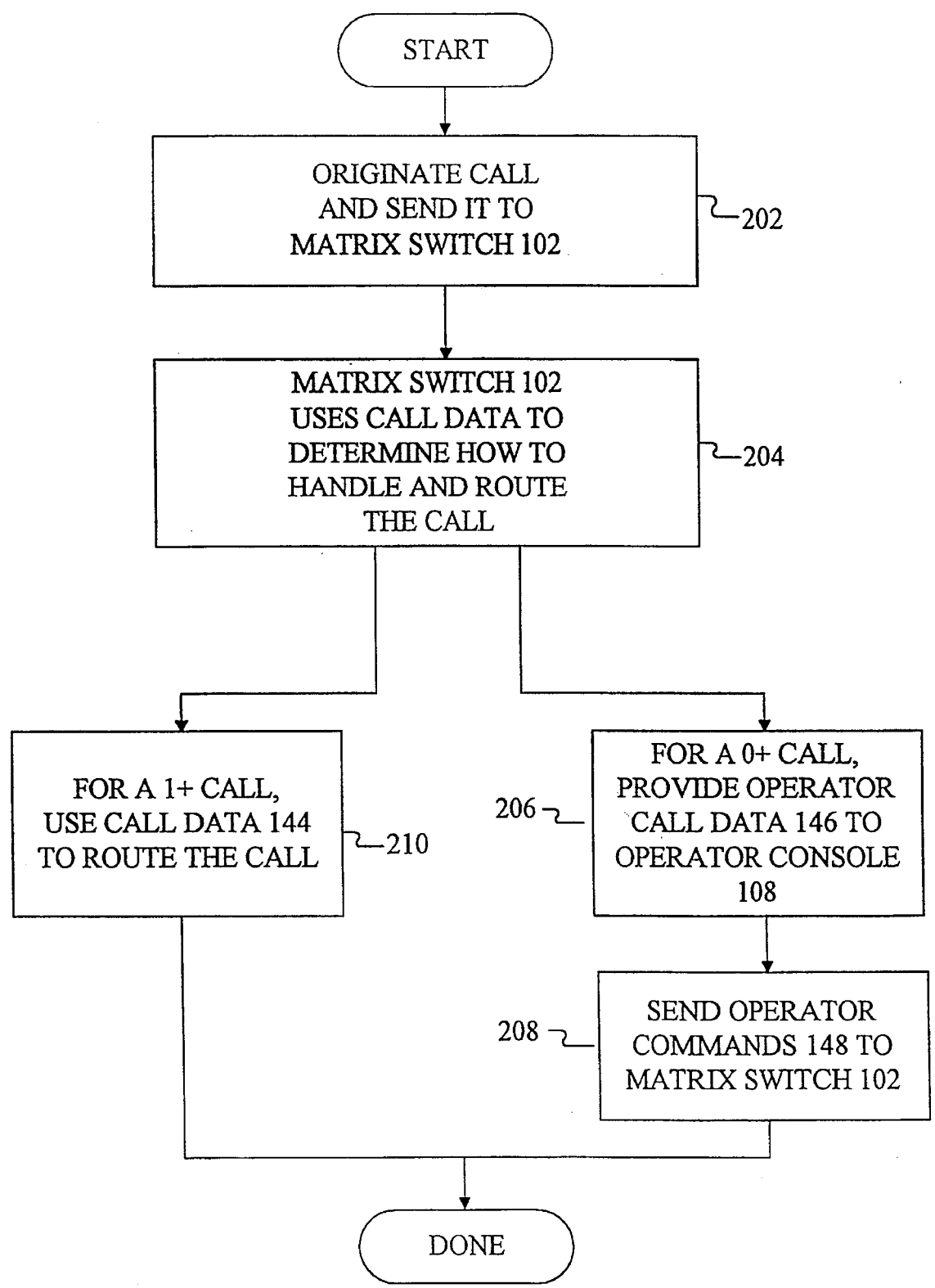
FIG. 2 is a high-level operational flow diagram illustrating the manner in which a conventional long-distance carrier provides long-distance telephone services to a long-distance carrier customer.

The manner in which long-distance carrier 112 provides long-distance services is now described. FIG. 2 is a high-level operational flow diagram illustrating the manner in which long-distance carrier 112 provides long-distance telephone services to its subscribers 114. FIGS. 1 and 2 are now referred to in order to illustrate how long-distance carrier 112 provides direct-dial long-distance service and operator-assisted calling for users 106. Long-distance direct dialing is accomplished by dialing one plus (1+) the called number. Operator-assisted calling can be placed by dialing zero plus (0+) the called number or by simply dialing zero (0).

The long-distance call is originated by user 106 and sent to matrix switch 102. This occurs in a step 202. The call is sent over two channels. These channels are an audio channel 122 and a signalling channel 124. Audio channel 122 carries the audio portion of the call. The audio portion of the call is referred to as call audio 142. It is over audio channel 122 that the caller's voice (in other words, call audio 142) can be heard. Call audio 142 can be analog audio, digital audio, or other information transferred among users 106 in analog or digital form (for example, fax or modem signals).

Signalling channel 124 is used to transmit call data 144. Call data 144 includes information regarding the type of telephone call being made and other call handling parameters including called number, originating number (e.g., an automatic number identification, or ANI), ihow the call was dialed (1+, 0+, 0), and the like. Call data 144 also provides call setup parameters to matrix switch 102.

An example of a signalling channel 124 is the industry standard common channel signalling system 7 (SS7) out-of-band signalling channel. SS7 is typically a 56 kilobit (kbit) link, and is commonly transmitted over a T-1 carrier. Typically, call data 144 is a data packet comprising 30–40 bytes of data.

Matrix switch 102 accepts call data 144 to determine how to handle and route the call. This occurs in a step 204.

If the call requires operator assistance (for example, a collect call), operator call data 146 is provided to an operator console 108. This occurs in a step 206. Typically, operator call data 146 is transferred to operator console 108 over a data link 126. Operator call data 146 includes information regarding the type of call and other information which matrix switch 102 knows regarding the call such as originating number, how the call was dialed, and the like.

Operator console 108 is typically a manual operator console which requires a human operator. The human operator answers the incoming call. The human operator then sends operator commands 128 to matrix switch 102 to complete the call so the operator can verify that the called party will accept the charges for the call. This occurs in a step 208.

If the call was instead a direct-dial call, matrix switch 102 uses call data 144 provided over signalling channel 124 to determine where to route the call. Matrix switch 102 then routes the call to the destination number. This occurs in a step 210.

There are several problems associated with this system used by the conventional long distance carrier. First, data link 126 over which operator call data 146 are transferred is often slower, than desired and introduces unwanted delays in handling the call.

A second problem is that the human operator at operator console 108 only gets the information that matrix switch 102 decides to send. In other words, call handling is limited to the features and capabilities that are provided by the particular matrix switch 102 that was purchased by the carrier.

Note, other manufacturers may provide matrix switches 102 with different features from those of the DMS 250. For example, other switches 102 may have a higher data rate link 126. However, long-distance carrier 112 is still limited to the choices of matrix switches 102 that are commercially available, because it would be prohibitively expensive to design, develop and manufacture a custom matrix 102. Thus, the functionality and capabilities that can be provided by a long distance carrier in this conventional system are limited to the functionality and characteristics provided by available matrix switches 102.

Because matrix switches 102 are costly to develop, they are typically designed to provide only those basic functions that all long-distance carriers are likely to desire. In this manner, the development costs of matrix switch 102 can be spread among numerous long-distance carriers. The cost of developing and manufacturing a unique matrix switch 102 is too high to provide a custom switch for a single long-distance carrier, or for only a small group of long-distance carriers. As a result, customer-unique and carrier-unique calling features and services cannot be provided.

Additionally, most manufacturers of matrix switches 102 are unable to modify existing matrix switches 102 to meet unique needs of the various long-distance carriers without a significant cost and isignificant time to implement.

An additional problem is that it is typically expensive to provide operator positions to interface to matrix switch 102. This is because operator consoles can only interface to conventional matrix switches 102 via special operator ports. Most conventional matrix switches provide a limited number of such operator ports. For example, the DMS 250 matrix switch 102 provides a capability of 384 operator console ports per switch. Thus, in this example, if more than 384 operator consoles are desired, at least one additional DMS 250 matrix switch must be purchased. At a cost of approximately $2 million per DMS 250 (1993 prices), the cost of additional operator positions is high.

This example serves to illustrate an underlying reason behind the problems discussed in the Background section. Due to the high cost of available matrix switches 102, most, if not all, of the smaller long-distance carriers cannot afford to purchase or develop custom telecommunications switching equipment. As a result, these carriers cannot have their own operator positions. Therefore, these carriers must obtain high-end services such as operator-assisted calling through carriers 112 who have such capabilities.

Additionally, for those long-distance carriers who do have matrix switches 102, such switches 102 cannot be easily (or cost-effectively) reconfigured, or customized, to meet unique call processing needs. Thus, the flexibility required to offer a wide range of customer services and call handling capabilities cannot be provided to the customers and users of these call processing systems 112.

1.2 Enhanced Call Processing System

Figure 3:
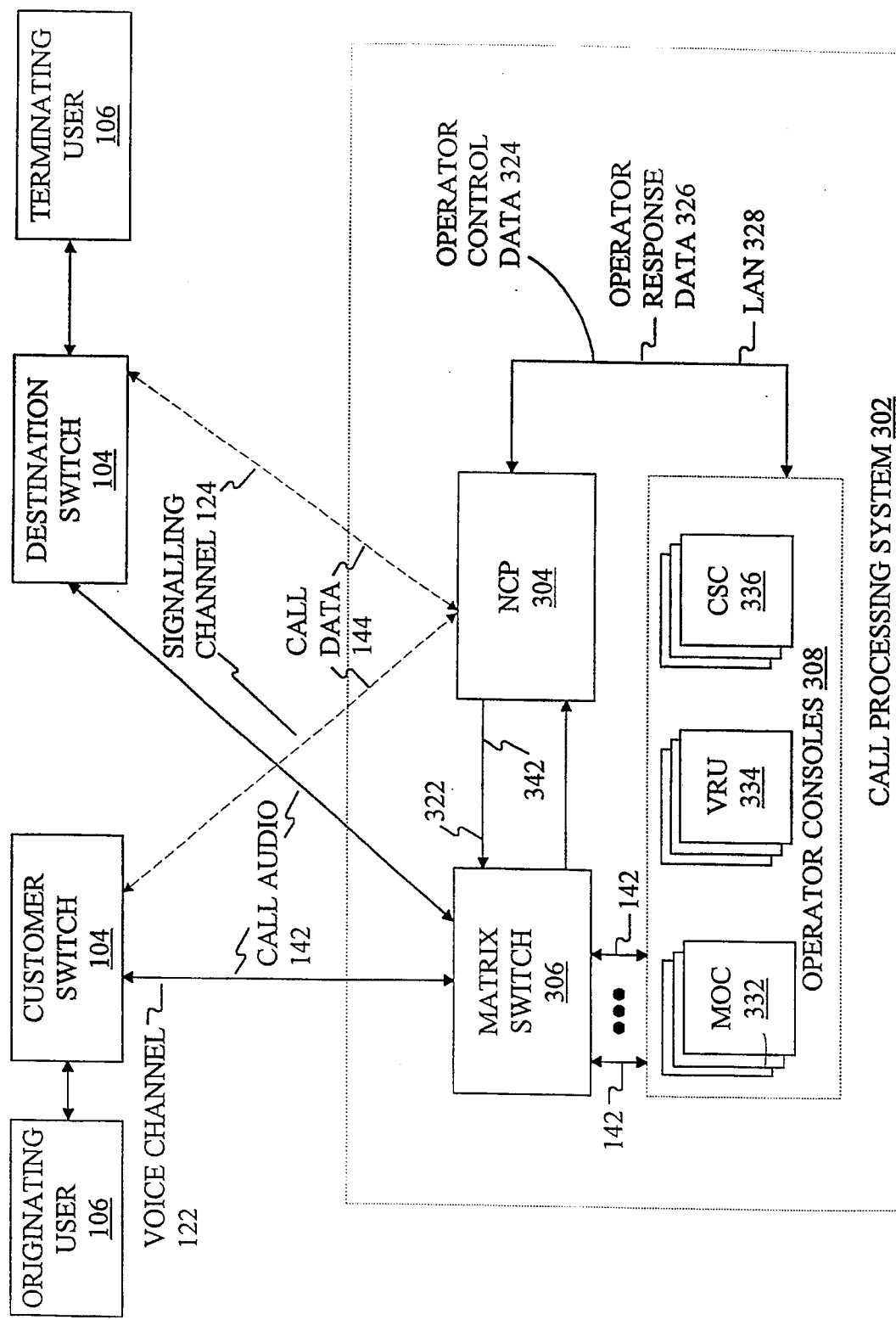
FIG. 3 is a high-level block diagram: illustrating a call processing system.

A call processing system can be implemented to overcome the above-discussed limitations of the matrix switch 102 and to provide a flexible call processing system. FIG. 3 provides a high-level illustration of such a call processing system 302.

As is described fully in this document, call processing system 302 provides a wide range of enhanced calling products and features to carriers and individual users. One or more carriers can Use call processing system 302 to obtain carrier-unique and customer-unique, customized products and features for their customers.

Call processing system 302 includes a network control processor (network control processor) 304 and a matrix switch 306. Matrix switch 306 could be the same as matrix switch 102 (for example, a DMS 250). Alternatively, matrix switch 306 could be a simpler type of switch as will be described below. Network control processor 304 is a unique combination of hardware, software structure and programs designed and developed to control calls being handled by call processing system 302. Network control processor 304 is fully described in detail in co-pending patent application of common assignee, Ser, No. 08/136,211 and filed on Oct. 15, 1993, which is incorporated herein by reference in its entirety.

Call processing system 302 can also include one or more operator consoles 308. Operator console 308 can be the same as operator console 108 used in the conventional system. However, in a preferred embodiment, operator consoles 308 provide additional features not found in conventional operator consoles 108. For example, operator consoles 308 provide the capability to use customized scripts to present a carrier-unique interface. Scripts and other features of operator consoles 308 are discussed in Section 2 of this document.

Types of operator consoles 308 can include a manual operator console (MOC) 332 and an automated voice response unit (VRU) 334. Manual operator console 332 provides the functionality, required for a human operator to converse with the caller. Automated voice response unit 334 does not require a human operator to handle operator-assisted calls. Automated voice response unit 334 includes stored voice responses (automated scripts) to provide automated voice instructions to the caller. For example, automated voice response unit 334 may instruct a caller 106A (originating user) to enter her calling card number.

An additional type of operator console 308 includes a customer service console (CSC) 336. Customer service console 336 performs customer service related functions. These functions include giving credits for call problems and answering questions of users 106 and long-distance carrier customers of call-processing system 302.

When a call is originated by originating user 106A, call audio 142 and call data 144 for the call are routed to call processing system 302. A key feature of call processing system 302 is that it enables call audio 142 on audio channel 122 to be handled separately from call data 144.

Figure 4:
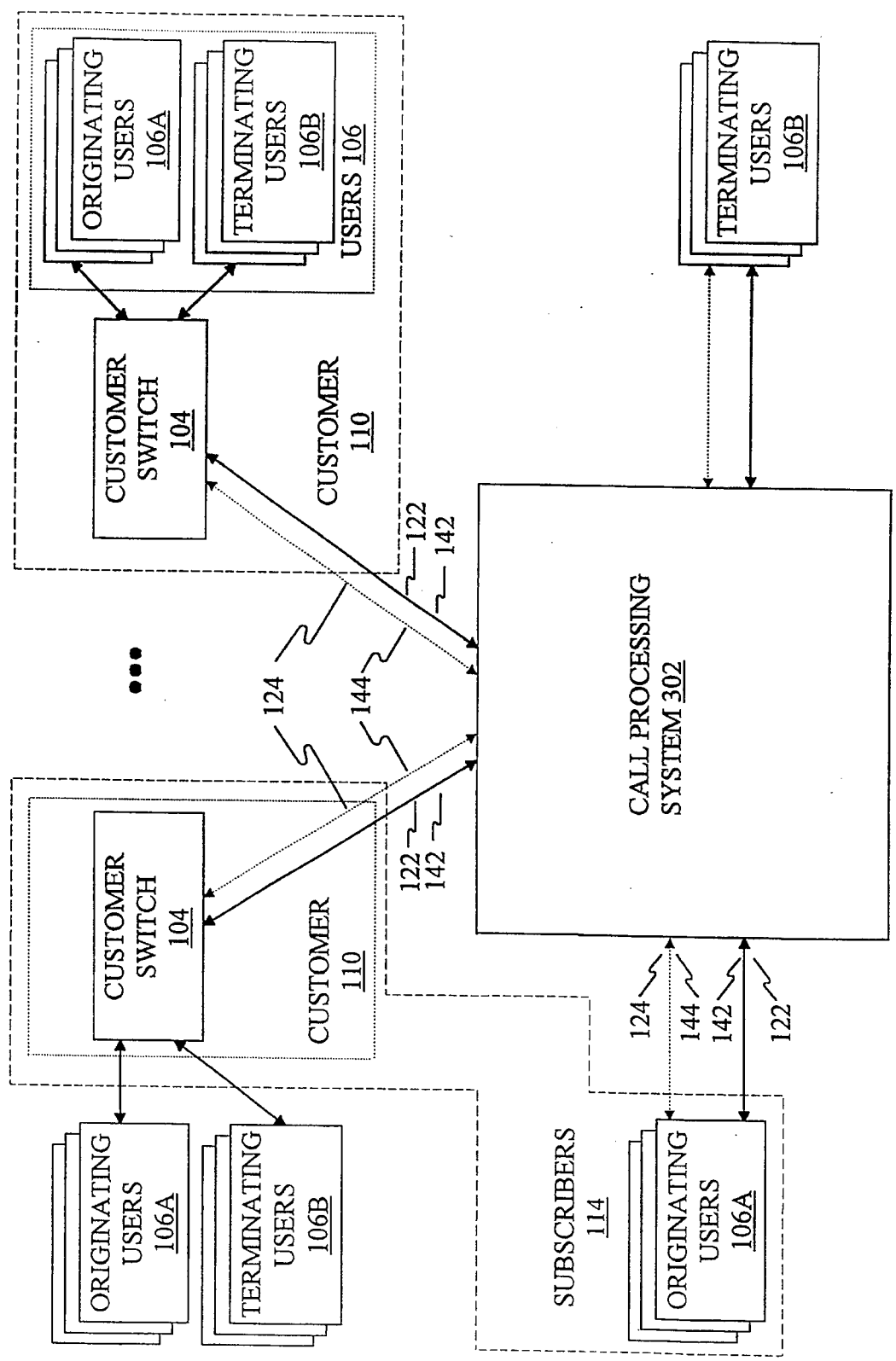
FIG. 4 is a high-level block diagram illustrating the interface of customers and users to the call processing system according to one embodiment of the present invention.

Originating user 106A can be a client of a customer 110 of call processing system 302, or a direct subscriber 14 of call processing system 302. Customer 110 can be a business or a carrier procuring enhanced services from call processing system 302. Originating user 106A may place a call directly to call processing system 302 or through customer switch 104. This is more clearly illustrated in FIG. 4. The detail of customer 110 and users 106 is illustrated separately in FIG. 4 for clarity. The term subscriber 114 is used to generally refer to users 106 who are direct clients of call processing system 302 and/or to customers 110.

Calls are placed to terminating users 106B. Terminating users 106B may be subscribers 114, clients of customers 110, or any other destination to which a call is placed.

Network control processor 304 receives call data 144 via signalling channel 124. Network control processor 304 uses call data 144 to make call handling decisions. Examples of these decisions include whether operator assistance is required, whether a number translation is required, how to bill the call, where the call should be routed, and the like. Also, when the call is originated, matrix switch 306 receives call audio 142 from the user 106 who placed the call.

Network control processor 304 then sends switch control data 322 to matrix switch 306. Switch control data 322 include data that control call routing in matrix switch 306. For calls requiring operator assistance, network control processor 304 sends operator control data 324 to operator console 308. Operator control data 324 includes information on how to handle the operator-assisted call.

Figure 5:
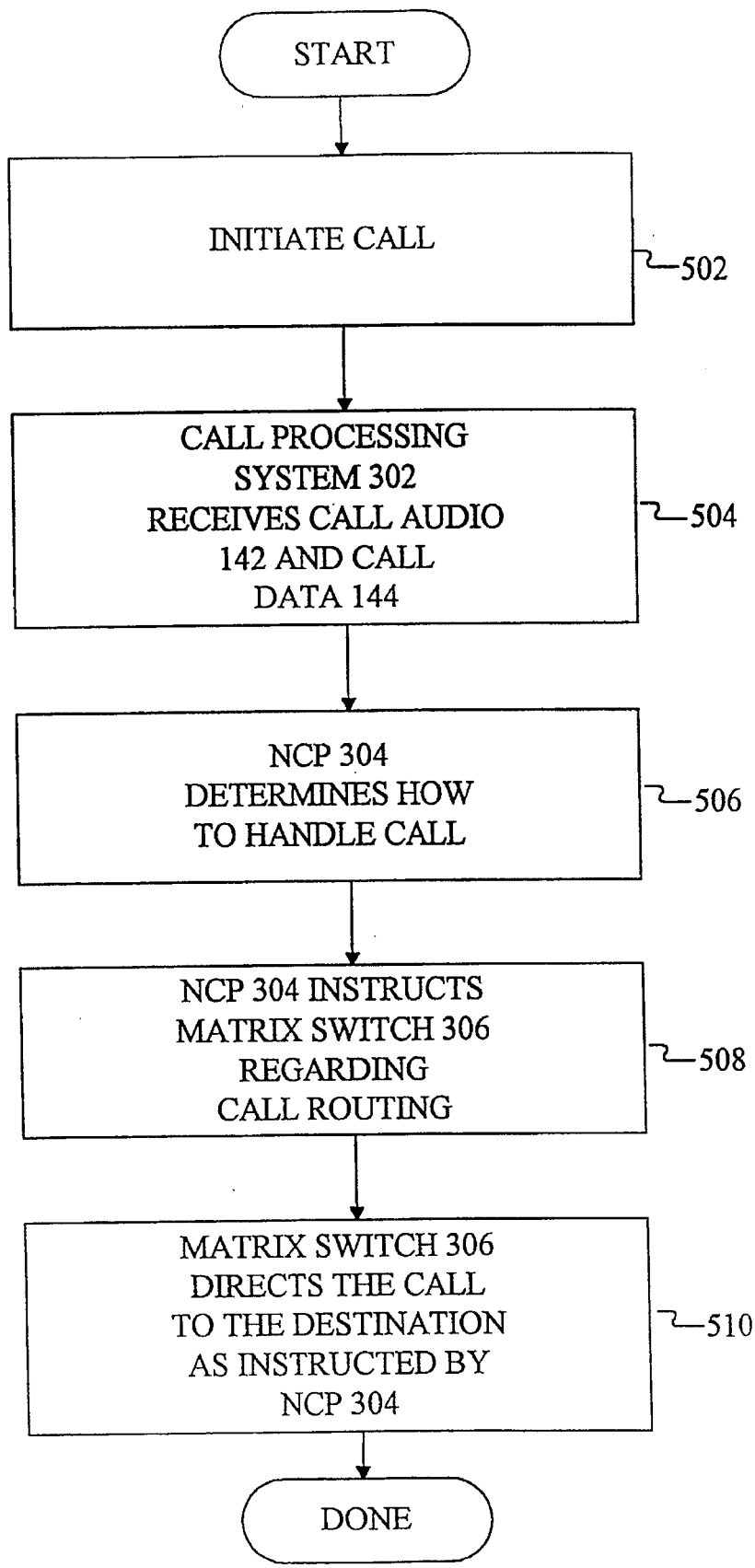
FIG. 5 is a high-level operational flow diagram illustrating the steps involved in placing and completing a call using the call processing system.

Call processing system 302 is best described in conjunction with an example illustrating how calls are handled. FIG. 5 is an operational flow diagram illustrating the steps involved in placing and completing a call using call processing system 302. Referring to FIGS. 3 and 5, these steps are now described.

In a step 502, an originating user 106A initiates a call. In other words, a caller picks up the telephone and dials a telephone number of a called party (terminating user 106B). Examples of user 106 can include a human communicating via a telephone instrument, a fax machine, or a modem. The only difference is that originating user 106A originates the telephone call, while terminating user 106B is the user to whom the call is placed.

The call can be routed directly to network control processor 304, or it could be routed to network control processor 304 via customer switch 104. In the latter case, customer switch 104 forwards call audio 142 and call data 144 associated with this call to call processing system 302. If a customer switch 104 is not in place, call audio 142 goes directly to matrix switch 306 at call processing system 302 and call data 144 to network control processor 304.

In a step 504, call processing system 302 receives call audio 142 and call data 144 for the call initiated in step 502. More specifically, matrix switch 306 receives call audio 142, and network control processor 304 receives call data 144.

In a step 506, network control processor 304 uses call data 144 to determine how to handle the call. Specific details regarding the manner in which network control processor 304 makes this determination are fully described in detail in the Network Control Processor Section of this patent document.

In a step 508, network control processor 304 sends switch control data 322 to matrix switch 306. Switch control data 322 commands matrix switch 306 to route the call to the correct destination. For example, switch control signal 322 may command matrix switch 306 to route the call audio 142 to customer switch 104 at the terminating end and ultimately to terminating user 106B.

The manner in which network control processor 304 commands matrix switch 306 is through sending switch control data 322 to matrix switch 306. The format and content of switch control data 322 depends on the type of matrix switch 306 utilized. Note that in some cases, depending on the customer, a customer switch 104 at the terminating end may not be used. In these cases, the call is routed directly to terminating user 106B.

In a step 510, matrix switch 306 routes the call to terminating user 106B as instructed by network control processor 304 in step 508.

As a result of the functionality provided by network control processor 304, matrix switch 306 no longer controls the call as was the case with matrix switch 102 in the conventional system. Matrix switch 306 now simply functions as a passive switch that is reconfigured based on switch control information 322 sent by network control processor 304.

Network control processor 304 receives all the call data 144 associated with the telephone call. There is no filtering or screening performed before data 144 is received by network control processor 304. Call data 144 can include, among other call attributes, the originating number, the called number, and the route or circuits activated in customer switch 104. Thus, full control of the call and all its call audio 142 and call data 144 can be provided by call processing system 302.

Figure 6:
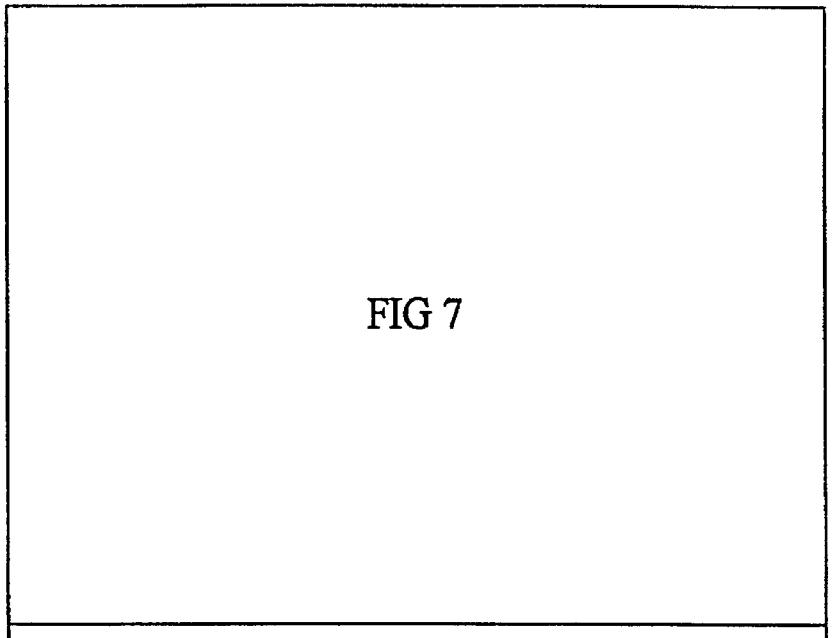
FIG. 6, which comprises
Figure 6:
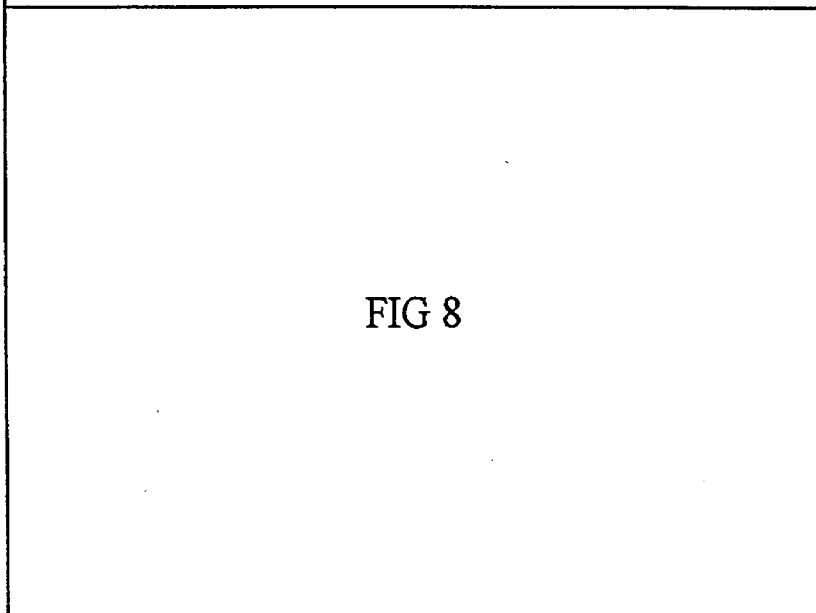
Figure 7:
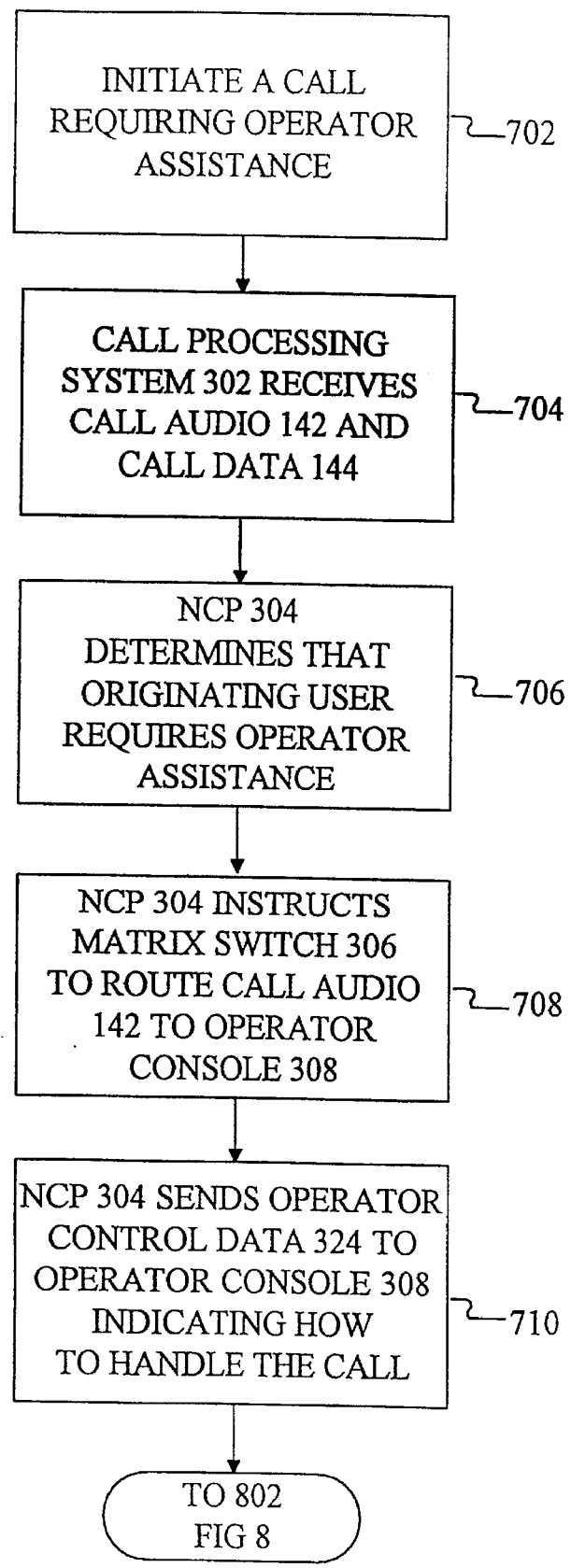
FIGS. 7 and 8, is a high-level operational flow diagram illustrating the process that the call processing system uses to process operator-assisted calls.
Figure 8:
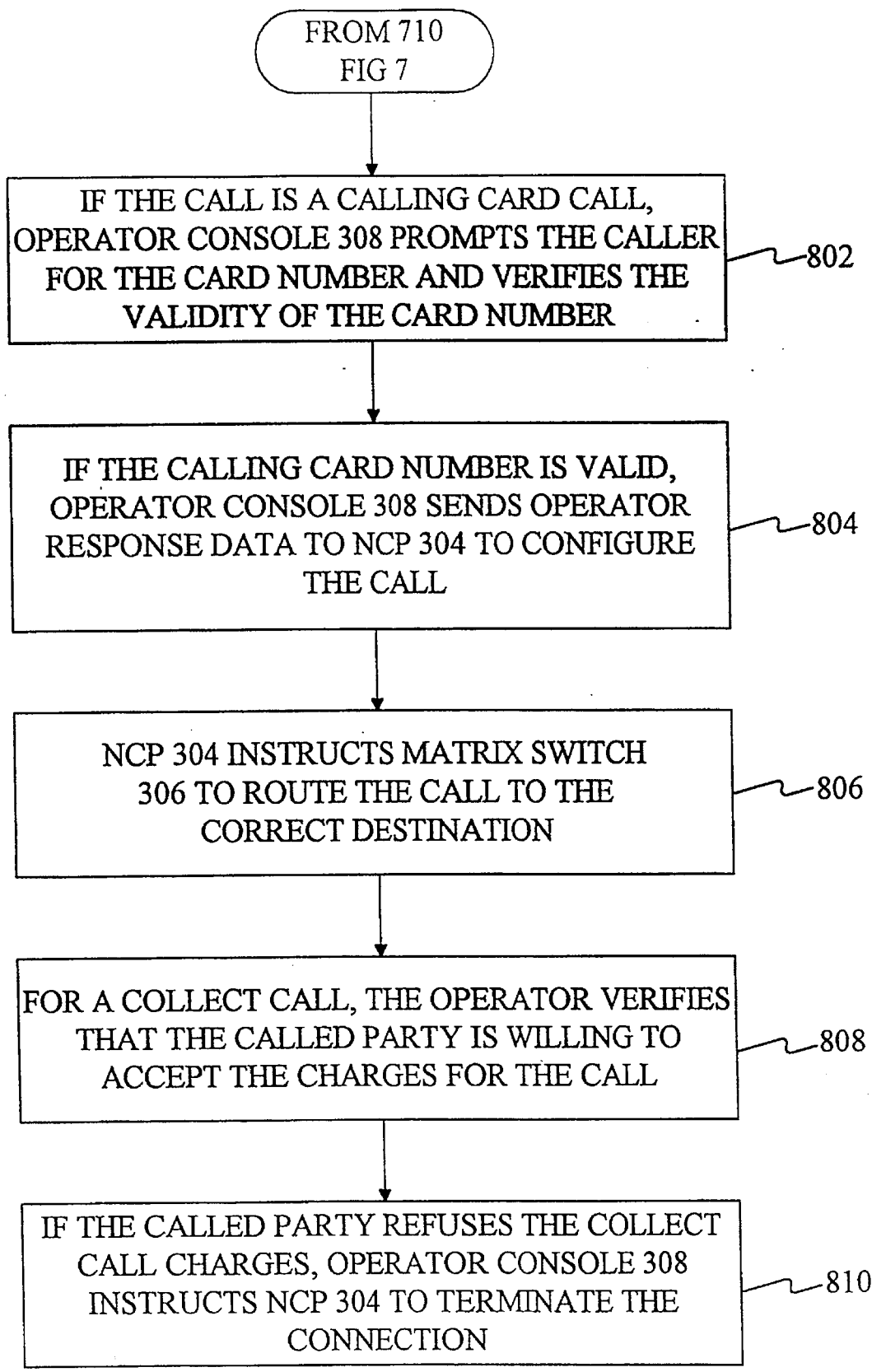

A further high-level illustration of the functionality of call processing system 302 is now described with reference to the following example. In this example, an originating user 106A initiates a call requiring operator assistance. FIG. 6, which comprises FIGS. 7 and 8, is a high-level operational flow diagram illustrating the process that call processing system 302 uses to process operator-assisted calls. Referring now to FIGS. 3, 7, and 8, originating user 106A initiates an operator-assisted call as shown in a step 702.

In a step 704, call processing system 302 receives call audio 142 and call data 144. More specifically, matrix switch 306 receives call audio 142 and network control processor 304 receives call data 144.

In a step 706, network control processor 304 interprets call data 144 and determines that originating user 106 originated a call requiring operator assistance. For example, in one embodiment network control processor 304 could examine the called number and determine that because the first number dialed is zero, the caller is requesting operator assistance.

In a step 708, network control processor 304 instructs matrix switch 306 to route call audio 142 to an operator console 308. If a human operator is not required, call audio 142 can be routed to an automated operator console (for example, an automated voice response unit 334). In this case, the voice response unit 334 instructs the caller on how to proceed. These instructions are typically telephone keypad button sequences to be pressed by the caller to complete the call. An example of this is where voice response unit 334 instructs the caller to enter a calling card number.

If a human operator is required to handle the call, the call audio 142 is routed to a manual operator console 332. In this case, the caller can converse with the operator. An example of this case is where the caller is placing a collect call.

Where matrix switch 306 is a DMS 250, network control processor 304 simply instructs the DMS 250 to route the call to the console position assigned to operator console 308. Because operator console 308 only gets call audio 142, operator console 308 is treated as any other destination and can be identified by a terminating number.

In a step 710, network control processor 304 routes operator control data 324 to operator console 308 via a LAN 328. Operator control data 324 instructs operator console 308 regarding the handling of the call. Operator control data 324 is determined by network control processor 304 when network control processor 304 receives call data 144.

There is a key distinction between call-processing system 302 and the conventional system illustrated in FIG. 1. With the conventional system, special operator console ports are required to allow an operator console 108 to be interfaced to matrix switch 102. This is because control information had to be provided by matrix switch 102 to operator console 108.

However, according to call processing system 302, matrix switch 306 only has to transfer call audio 142 to operator console 308. The control information is provided by network control processor 304 in the form of operator control data 324. Operator console 308 only gets call audio 142 from matrix switch 306. Therefore, operator console 308 can be treated as if it is any other terminating user 106B or customer switch 104. Thus operator console 308 does not have to interface to matrix switch 306 via a special operator console port. Therefore, the number of operator consoles 308 that can interface to matrix switch 306 is not limited to the number of operator console ports available on matrix switch 306.

Operator console 308 now has a connection with audio channel 122. As noted above, operator console 308 can be either a manual operator console 332 for a human operator, or an automated voice response unit 334.

If originating user 106A is placing a calling card call, originating user 106A is prompted by operator console 308 to enter the calling card number. The number is received and verified to ensure that it is a valid number. If the number is invalid, the user is informed that the call cannot be completed. This occurs in a step 802 (FIG. 8).

For valid calling card numbers and for collect calls, operator console 308 initiates the connection to the terminating user 106. This occurs as described in steps 804–808 as follows.

In a step 804, operator console 308 sends operator response data 326 to network control processor 304 via LAN 328 indicating that the call can be placed as requested. In response, network control processor 304 sends switch control data 322 to configure matrix switch 306. This tells matrix switch 306 how to route the call. This occurs in a step 806.

In a step 808, matrix switch 306 is reconfigured to direct the call to the destination as instructed by network control processor 304.

For a collect call, the operator asks the called party whether they are willing to accept the charges. This occurs in a step 808.

If the called party is not willing to accept the charges, operator console 308 sends operator response data 326 to network control processor 304 indicating that the call should be terminated. This occurs in a step 810.

It should be understood that the two examples of placing a collect call and a calling card call are offered as examples only. These examples should not be interpreted to imply that the call processing system 302 is limited to only these types of capabilities.

Call processing system 302 provides additional value-added features to telephone services. Call processing system 302 can be configured to provide the capability for, among other things, operator assisted calling, calling card and credit card calling, number translation and forwarding, real-time call billing, and real-time call rating.

2.0 Distributed Voice System

As discussed above, call processing system 302 utilizes an automated voice response unit 334 to provide automated operator assistance to user 106. To allow automated voice response unit 334 to provide such assistance, automated voice response unit 334 must be able to communicate with user 106. A distributed voice system is provided to allow automated voice response unit 334 to provide instructions and otherwise communicate to user 106 using voice scripts. The distributed voice system allows carrier-unique voice scripts to be stored in databases and played to users 106 where appropriate. The distributed voice system also provides functionality to implement voice messaging for users 106.

In a preferred embodiment, the distributed voice system is implemented in the environment of a call processing system 302 as described above in Section 1.2 of this document. Additionally, the distributed voice system uses a DEF service 916 (FIG. 9) to control operations. The DEF service is described in detail in Section 3 of this document.

Figure 9:
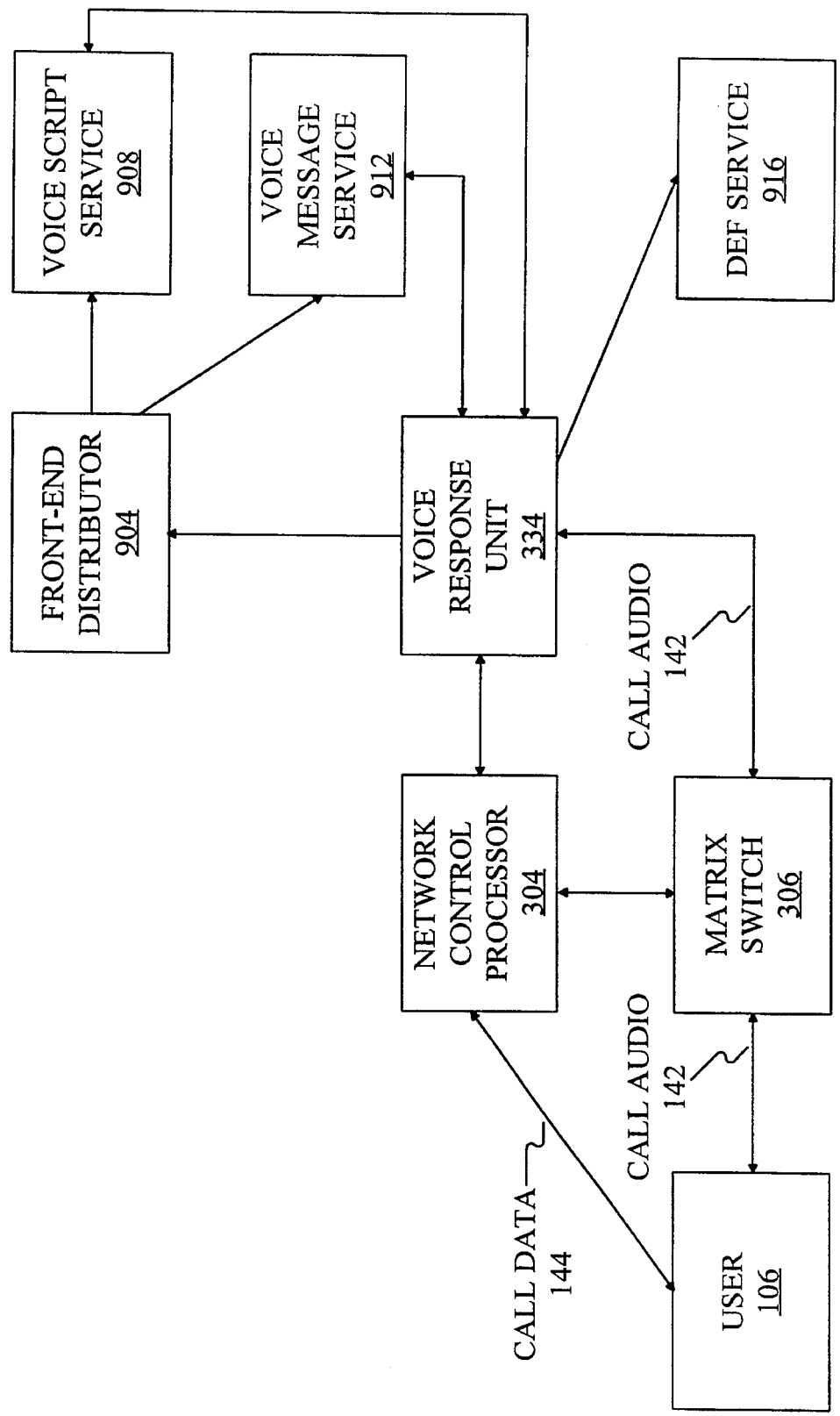
FIG. 9 is a block diagram illustrating a call processing system with distributed voice features.

FIG. 9 is a block diagram illustrating a call processing system 302 with distributed voice features. Referring now to FIG. 9, the distributed voice system includes a front-end distributor 904, a voice script service 908, and a voice message service 912. When a call is received from a user 106 requiring a voice script 1008 (illustrated in FIG. 10), voice response unit 334 retrieves voice script 1008 from voice script service 908 and plays that voice script 1008 to user 106. Voice response unit 334 stores voice scripts 1008 into voice script service 908 and voice messages 1308 (illustrated in FIG. 13) in voice message service 912 via front-end distributor 904.

2.1 Distributed Voice Scripts

Voice scripts 1008 are used to provide voice communications to a user via an automated voice response unit 334. When a user 106 places a call requiring operator assistance and this operator assistance is provided by an automated voice response unit 334, the allocated automated voice response unit 334 communicates with user 106 using voice scripts 1008. Voice scripts 1008 provide user 106 with a greeting and instructions on how to proceed. These instructions can include a menu offering choices to user 106 that can be made by the user 106 depressing numbers on the telephone key pad.

Figure 10:
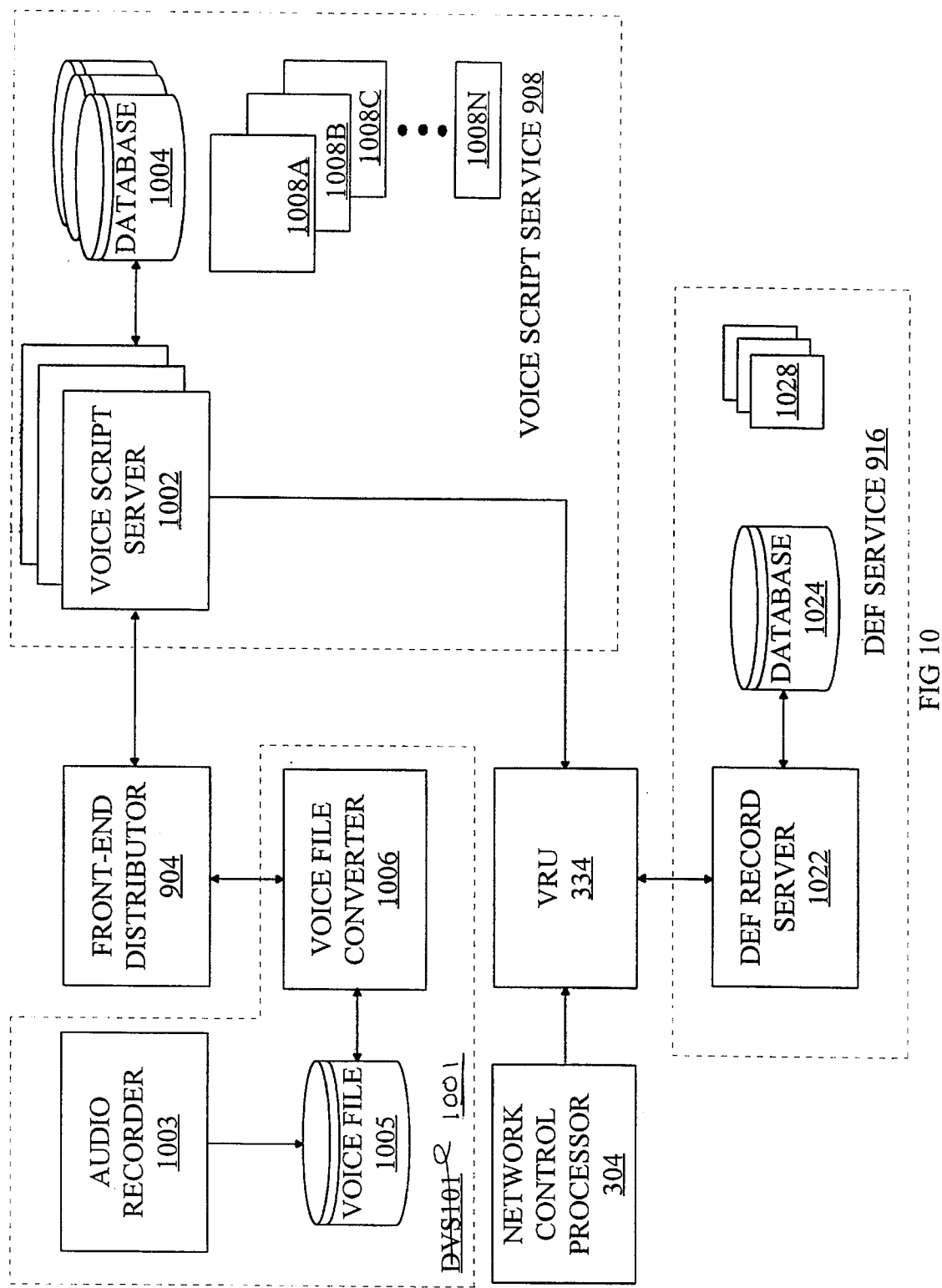
FIG. 10 is a block diagram illustrating a call processing system with distributed voice script capabilities.

FIG. 10 is a block diagram illustrating a call processing system 302 with distributed voice script capabilities. The distributed voice script system includes a voice script system 1001, a front-end distributor 904, and voice script service 908. Voice script system 1001 includes an audio recorder 1003, a voice file 1005, and a voice file converter 1006.

Voice script service 908 includes a voice script server 1002, a voice script database 1004, and one or more voice scripts 1008A–1008N. To minimize errors and system downtime, multiple redundant voice script servers 1002 and voice script databases 1004 can be provided. Where such redundancy is provided, each voice script database 1004 has its own redundant copy of scripts 1008A–1008N. To accommodate the recording of multiple scripts 1008 into multiple voice script data bases 1004, front-end distributor is provided to distribute each script 1008A–1008N to each redundant voice script server 1002.

2.1.1 Voice Script Recording

Once a voice script 1008 is recorded and stored in voice script database 1004, automated voice response unit 334 can retrieve that voice script 1008 when required and play it to a user 106.

Figure 11:
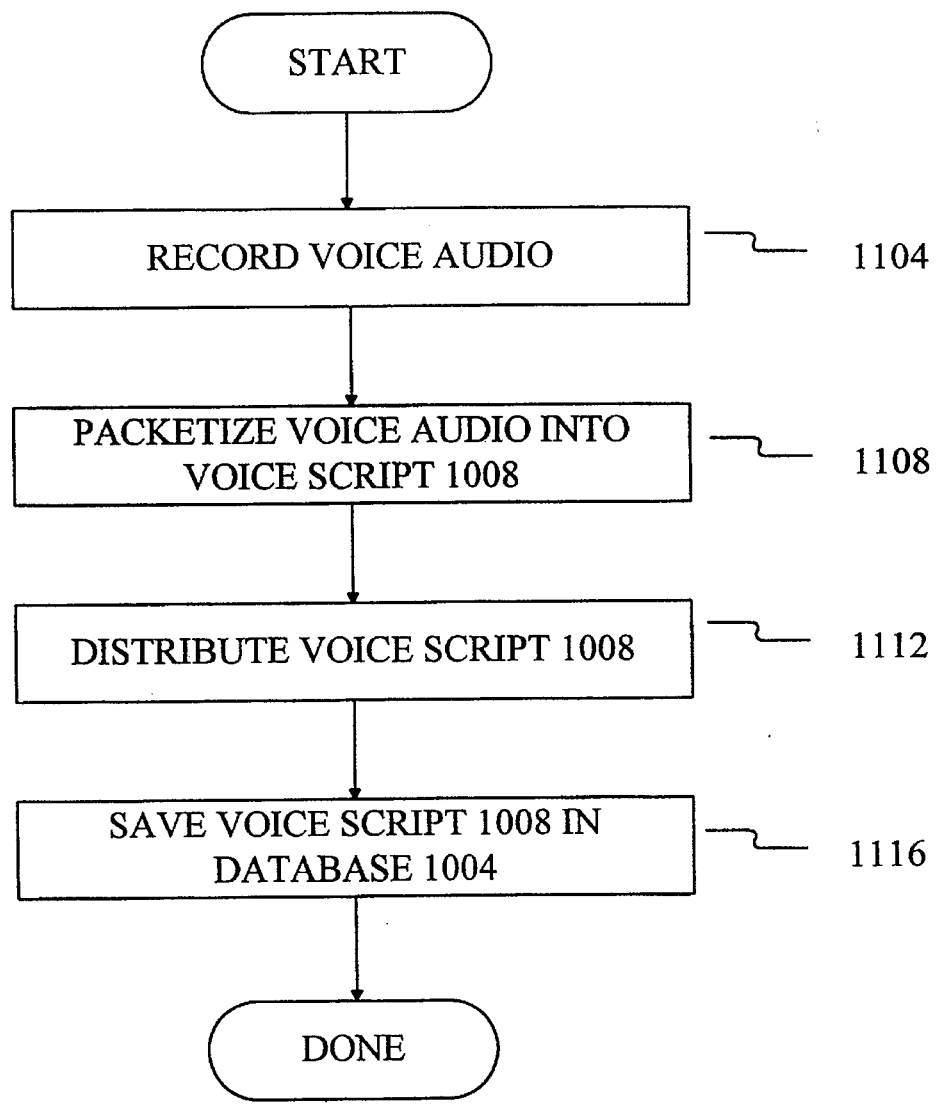
FIG. 11 is an operational flow diagram illustrating the process by which a voice script is recorded and stored in a voice script database.

A method for recording a voice script 1008 is now described. FIG. 11 is an operational flow diagram illustrating the process by which a voice script 1008 is recorded and stored in voice script database 1004. Referring now to FIGS. 10 and 11, in a step 1104, a speaker records voice audio using audio recorder 1003 and records this voice audio in a voice file 1005. In one embodiment, voice script system 1001 is implemented using a DOS-based personal computer. In this embodiment, audio recorder is a VBX100 1-port PC compatible voice processing board and SE/DOS run time software and device driver. The VBX100 voice processing :board and SE/DOS run time software and device driver are available from Natural MicroSystems in Natick, Mass. U.S.A.

In a step 1108, voice file converter 1006 packetizes the voice audio into packet data to create a voice script 1008. Voice file converter 1006 forwards this created voice script 1008 to front-end distributor 904.

In a step 1112, front-end distributor 904 distributes voice script 1008 to the multiple redundant voice script servers 1002 within voice script service 908. In a step 1116, each voice script server 1002 stores voice script 1008 in its associated voice script database 1004. The data packets that make up voice script 1008 are sequentially numbered and can be retrieved from database 1004 using a key composed of a script number and a sequential frame block number. To provide subscriber-unique scripting, scripts can be stored based on the language in which the script is recorded, and other subscriber-unique information. This information can include, for example, branding to uniquely identify the name of a carrier-customer 110 that is providing the telephone service to user 106.

To accommodate this, unique scripts can be recorded for each carrier-customer 110 to provide a carrier-unique interface to users 106. Additionally, voice scripts 1008 can be recorded in different languages to provide correct-language scripting to a specific user 106. Therefore, voice scripts 1008 are stored in voice script database 1004 based on not only a script number identifying the voice script 1008 but also on the script language and carrier 110 identification. This facilitates retrieval of a specific voice script 1008 using a key composed of a language, a carrier identification (i.e., a brand), a script number, and a sequential frame block number.

2.1.2 Voice Script Play

When a user 106 places a call requiring operator assistance, and that operator assistance is provided by an automated voice response unit 334, the assigned automated voice response unit 334 retrieves the appropriate script 1008 from voice script service 908 and begins playing this voice script 1008 to user 106. This process of playing a voice script 1008 is now described.

Figure 12:
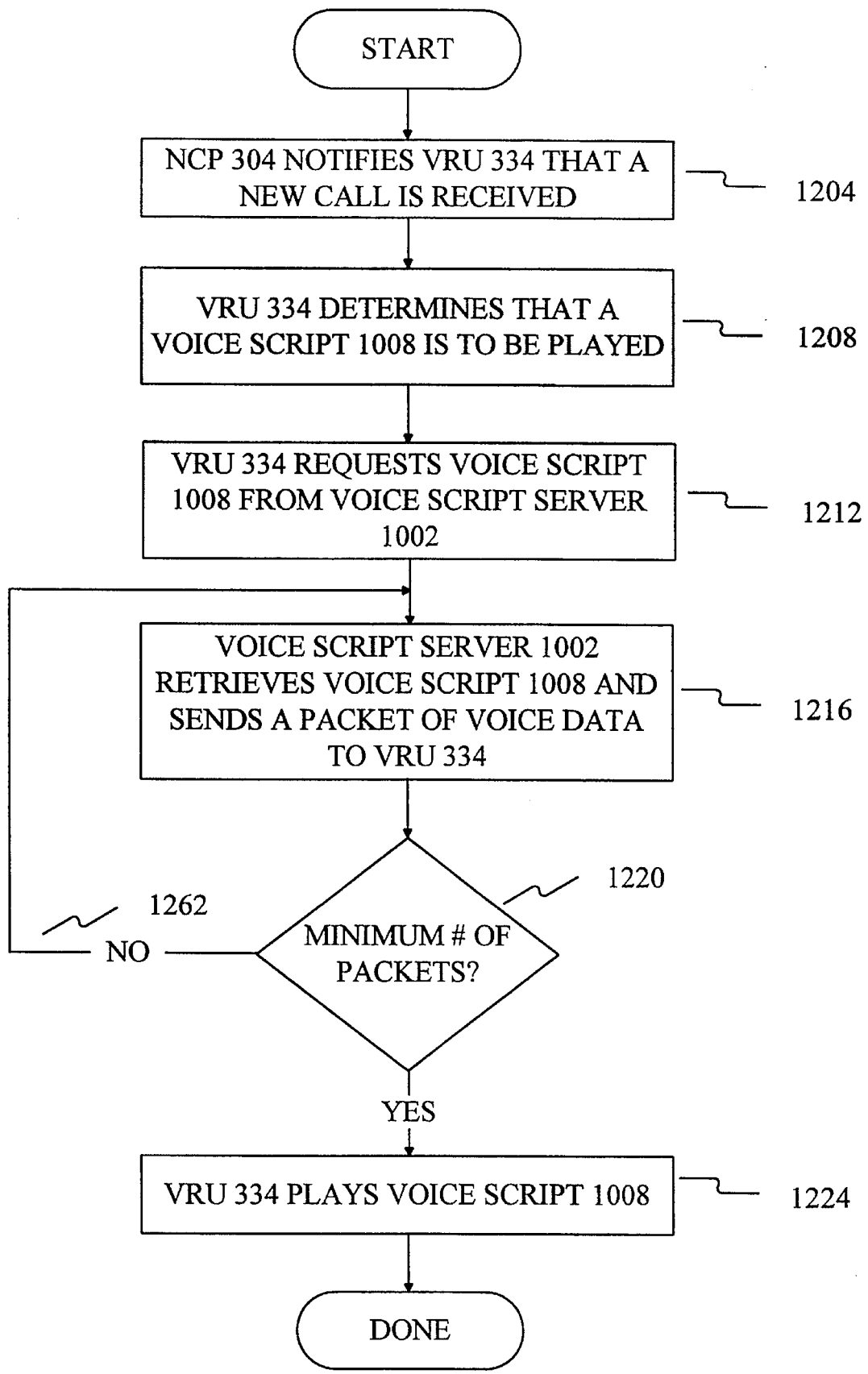
FIG. 12 is an operational flow diagram illustrating a manner in which a voice script is played to a user.

FIG. 12 is an operational flow diagram illustrating the process by which a voice script 1008 is played to a user 106. Referring now to FIGS. 10 and 12, in a step 1204, when a user 106 places: a call requiring assistance of an automated voice response unit 334, network control processor 304 notifies the automated voice response unit 334 that a new call is received. Network control processor 304 allocates an automated voice response unit 334 to handle the call and connects call audio 142 via matrix switch 306 (as illustrated in FIG. 9).

In a step 1208, automated voice response unit 334 determines which voice script 1008 is to be played to user 106. In one embodiment, this is accomplished by retrieving a DEF record 1028 from a DEF record database 1024 via DEF record server 122. DEF record 1028 indicates the correct voice script 1008 to be played to user 106. The use of DEF records 1028 is described in detail in Section 3 of this document.

In a step 1212, automated voice response unit 334 requests the appropriate voice script 1008 from voice script server 1002. In a step 1216, voice script server 1002 retrieves the appropriate voice script 1008 from voice script database 1004 and sends a packet of voice data from this voice script 1008 to automated voice response unit 334.

When a minimum number of packets has been received by automated voice response unit 334, automated voice response unit 334 begins playing the selected voice script 1008. This is illustrated by steps 1220 and 1224. If the minimum number of packets has not been received by automated voice response unit 334, voice script server 1002 continues to send packets of voice data as illustrated by flow line 1262. The minimum number of packets required is chosen such that automated voice response unit 334 can begin playing the selected voice script 1008 to user 106 without interruption. Automated voice response unit 334 can begin playing script 1008 before all of the packets that make up that script 1008 are retrieved from voice script service 908. In a preferred embodiment, the :minimum number of packets required is one. Thus, once the first packet of script 1008 is retrieved, automated voice response unit 334 can begin playing script 1008.

Automated voice response unit 334 continues playing selected voice script 1008 as it receives subsequent data packets from voice script service 908. Automated voice response unit 334 continues to :retrieve packets and to play the selected voice script 1008 until the voice script 1008 is completed.

2.2 Voice Messaging

The distributed voice system according to the invention allows voice messaging as well as voice scripting. The purpose of voice messaging is to allow a user 106 or a carrier 110 to record and store a message that can be retrieved by another user 106. In other words, voice messaging provides a voice mailbox feature for use by subscribers 114. Recording and playback of voice messages 1308 are similar to the recording and playback of voice scripts 1008, in that they are both packetized before they are stored and playback is accomplished by sequentially retrieving the stored data packets and playing them back to the user 106. After a minimum number of packets are retrieved, the playing begins and continues as additional packets are retrieved from the database. Voice message recording and voice message playback are now described in greater detail.

2.2.1 Voice Message Recording

Figure 13:
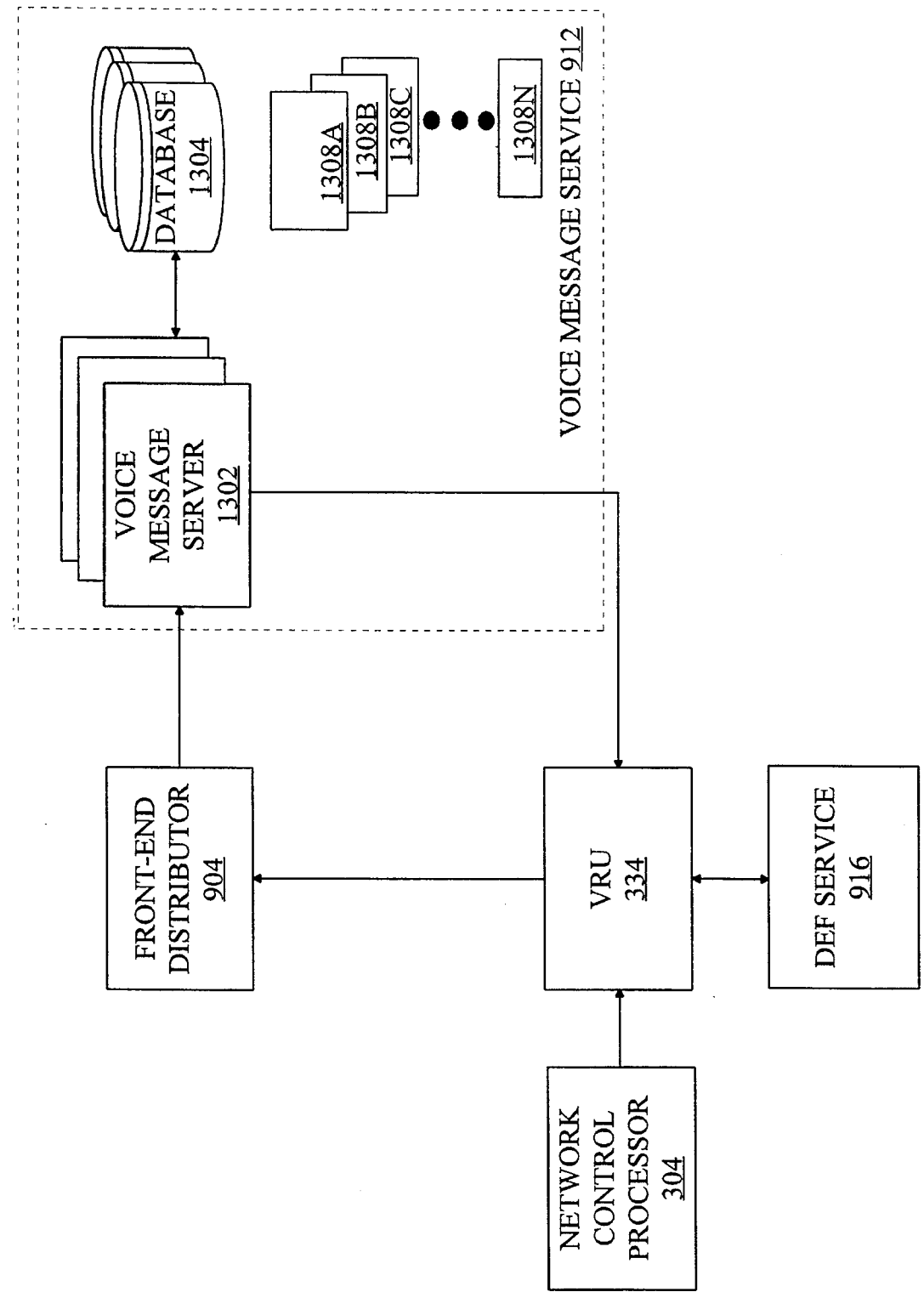
FIG. 13 is a block diagram illustrating a distributed voice messaging system.

FIG. 13 is a block diagram illustrating a distributed voice messaging system. Referring now to FIG. 13, a distributed voice messaging system includes a network control processor 304, an automated voice response unit 334, a DEF service 916, a front-end distributor 904, and voice messaging service 912. Voice messaging service 912 includes a message server 1302 and a voice message database 1304, and one or more voice messages 1308A–1308N. As was the case with voice script service 908, voice message service 912 can be implemented using redundant voice message servers 1302 and redundant voice message databases 1304. Where such redundancy is provided, each voice message database 1304 has a copy of each voice message 1308A–1308N.

When a user calls in to leave a message, that user 106 is connected to automated voice response unit 334 via matrix switch 306. This connection, illustrated in FIG. 9, is not repeated in FIG. 13 to simplify the drawing. User 106 recites the audible message to automated voice response unit 334 which packetizes the audible message to create a voice message 1308. Automated voice response unit 334 then forwards the created voice message 1308 to front-end distributor 904. Front-end distributor 904 stores voice message 1308 in the redundant voice message databases 1304.

Figure 14:
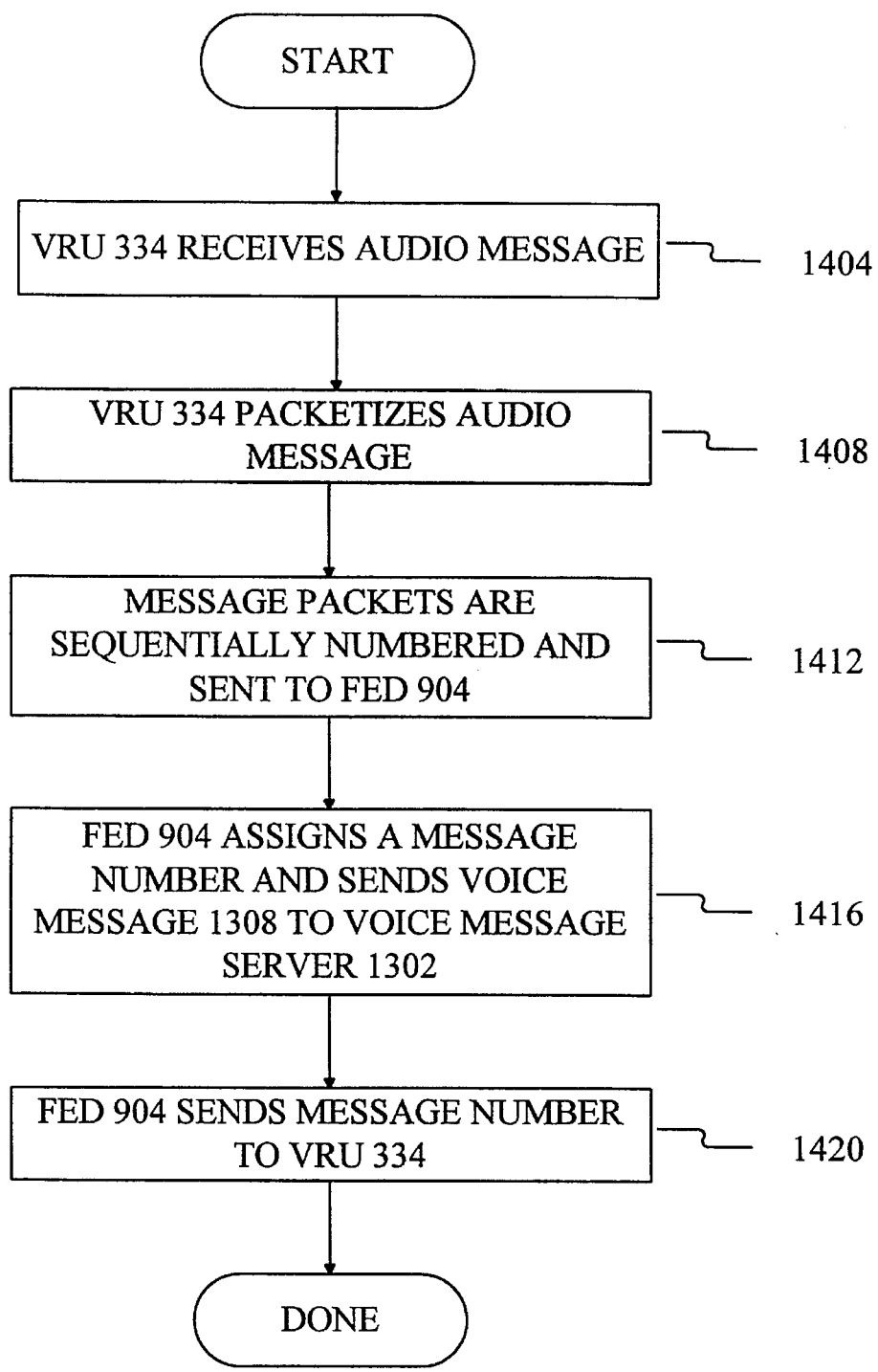
FIG. 14 is an operational flow diagram illustrating steps associated with recording a voice message.

FIG. 14 is an operational flow diagram illustrating the steps associated with recording a voice message 1308. Referring now to FIGS. 13 and 14, in a step 1404, automated voice response unit 334 receives an audio message from user 106. In a step 1408, automated voice response unit 334 packetizes the audio message received from user 106 into data packets. These data packets make up the voice message 1308. In a step DMR112, the data packets that make up voice message 1308 are sequentially numbered and sent to front-end distributor 904 for storage in voice message service 912.

In a step 1416, front-end distributor 904 assigns a message number to the voice message 1308 and sends voice message 1308 to voice message service 912. Where redundant voice message servers 1302 are implemented, front-end distributor 904 distributes message 1308 to each voice message server 1302.

In a step 1420, front-end distributor 904 sends the assigned message number to automated voice response unit 334. As a result of this process, voice message 1308 is stored in a voice message database 1304 and can be identified by a message number.

The playback of a voice message is accomplished in a manner that is similar to the playback of a voice script 1008. As is fully described in Section 3 of this document, when a call is received, the automated voice response unit 334 allocated to the call retrieves a DEF record 1028 indicating the steps to be taken to handle the call. For a call requesting message playback, the DEF record 1028 provides message information including the unique message number to request a specific voice message 1308 from voice message service 912. The data packets of voice message 1308 are sequentially retrieved, and playback begins as soon as enough packets are retrieved to allow uninterrupted playback. Packet retrieval continues until playback of voice message 1308 is completed.

2.2.3 Remote Script Recording

Voice scripts 1008 can be recorded remotely through automated voice response unit 334 in the same way that voice messages 108 are recorded. By allowing the ability for remote voice script 1008 recording, carrier-customers 110 can change their customer-specific voice scripts 1008 without any intervention by a human operator at call processing system 302. In other words, personnel at the site of customer 110 can record a new voice script 1008 via voice response unit 334 without requiring the use of audio recorder 1002 to record the script 1008.

2.3 Voice Data Processor

Figure 15:
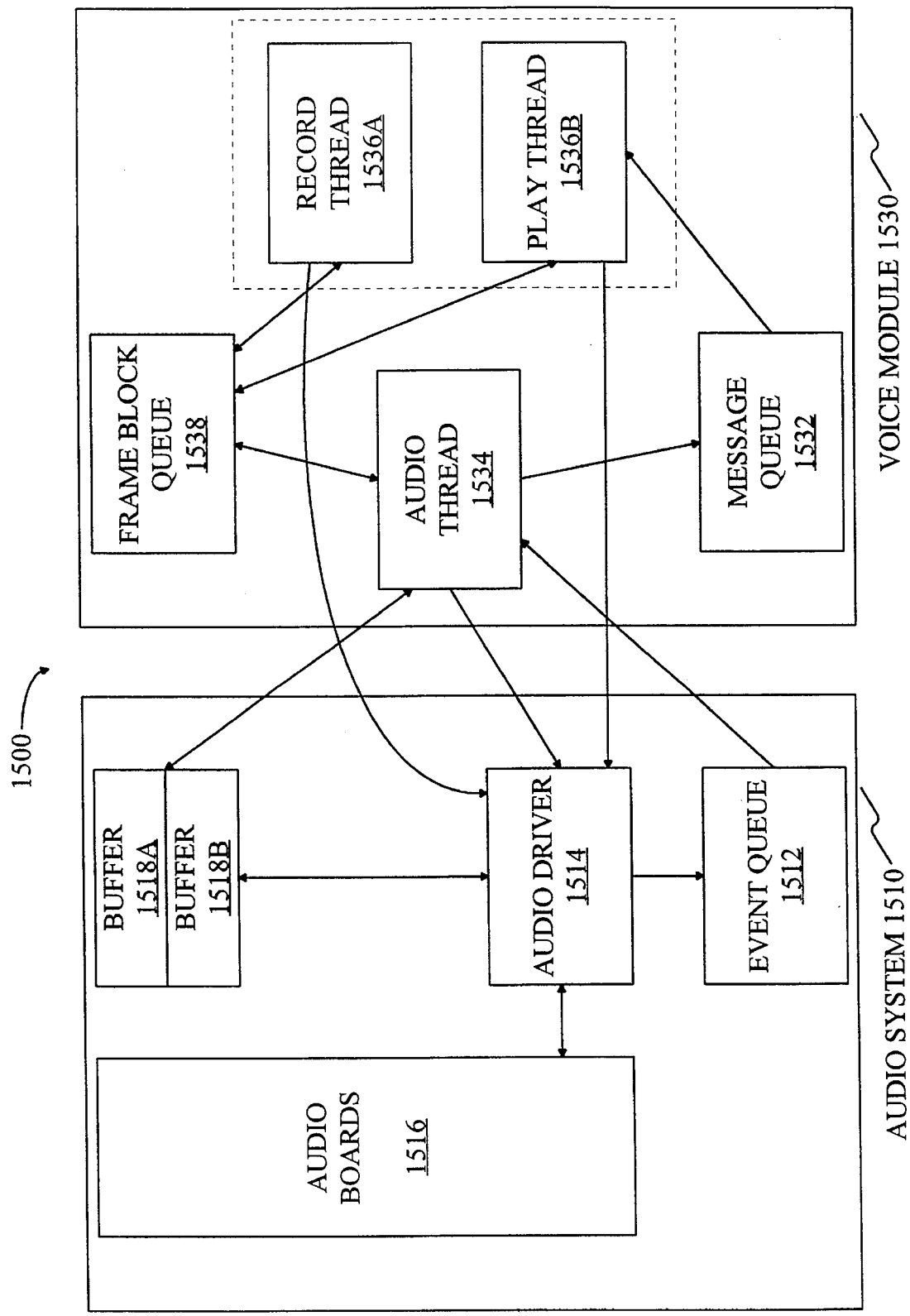
FIG. 15 is a diagram illustrating a representative functional architecture of a voice data processor.

In one embodiment of the distributed voice system, a voice data processor is used to control the encapsulation of audio data into packets. This voice data processor is now described. FIG. 15 is a diagram illustrating a representative architecture of a voice data processor 1500. This representative architecture is presented by way of example only. After reading the following description, it will be apparent to one skilled in the relevant art how voice data processor 1500 can be implemented using a variety of different architectures.

In this document, voice scripts 1008 and voice messages 1308 are generally referred to as voice data.

Referring now to FIG. 15, voice data processor 1500 comprises an audio system 1510 and a voice module 1530. Audio system 1510 includes an audio driver 1514, audio boards 1516, a buffer 1518, and an event queue 1512. Buffer 1518 is divided into a first buffer 1518A and a second buffer 1518B.

In this embodiment, audio board 1516 is a VBX 1200 voice processing board. Audio driver 1514 is VBX digital voice port driver, and event queue 1512 is a subport of audio driver 1514. These components are available from Natural MicroSystems in Natick, Mass., U.S.A. In this embodiment, these boards operate in the environment of a DOS-based personal computer. In an embodiment where automated voice response unit 334 is a personal computer-based system, these boards can be mounted in expansion slots of the automated voice response unit 334.

Voice data processor 1500 can be used to store either voice scripts 1008 or voice messages 1308 as packetized data (i.e., voice data). In the preferred embodiment, voice data processor 1500 is only used for remote recording of voice scripts 1008. In this embodiment, local voice script recording, including packetization and storage, is accomplished using a separate voice script system 1001 as described above with reference to FIG. 10. Voice script system 1001 functions similarly to voice data processor 1500. However, in this preferred embodiment, voice data processor 1500 is part of automated voice response unit 334, whereas voice script system 1001 is a stand-alone system.

Voice module 1530 includes an audio thread 1534, a message queue 1532, a frame block queue 1538, a record thread 1536A, and a play thread 1536B. In one embodiment, automated voice response unit 334 is a DOS-OS/2-based computer. In this embodiment, voice data processor 1500 is implemented in the OS/2 environment of automated voice response unit 334. In this OS/2 environment, each program is a single process. Each process can have one or more threads of execution. Where multiple threads are used, each thread executes independently of the other threads and all threads appear to be executing at the same time. In this environment, automated voice response unit 334 has a main application thread, a thread for receiving network messages, a timer thread, and an audio thread.

The implementation of voice module 1530 is not limited to an implementation using threads. The functionality performed by the threads could be performed using one or more processors, ASICs (application specific integrated circuits), software modules, or other implementations.

2.4 Voice Recording

Figure 16:
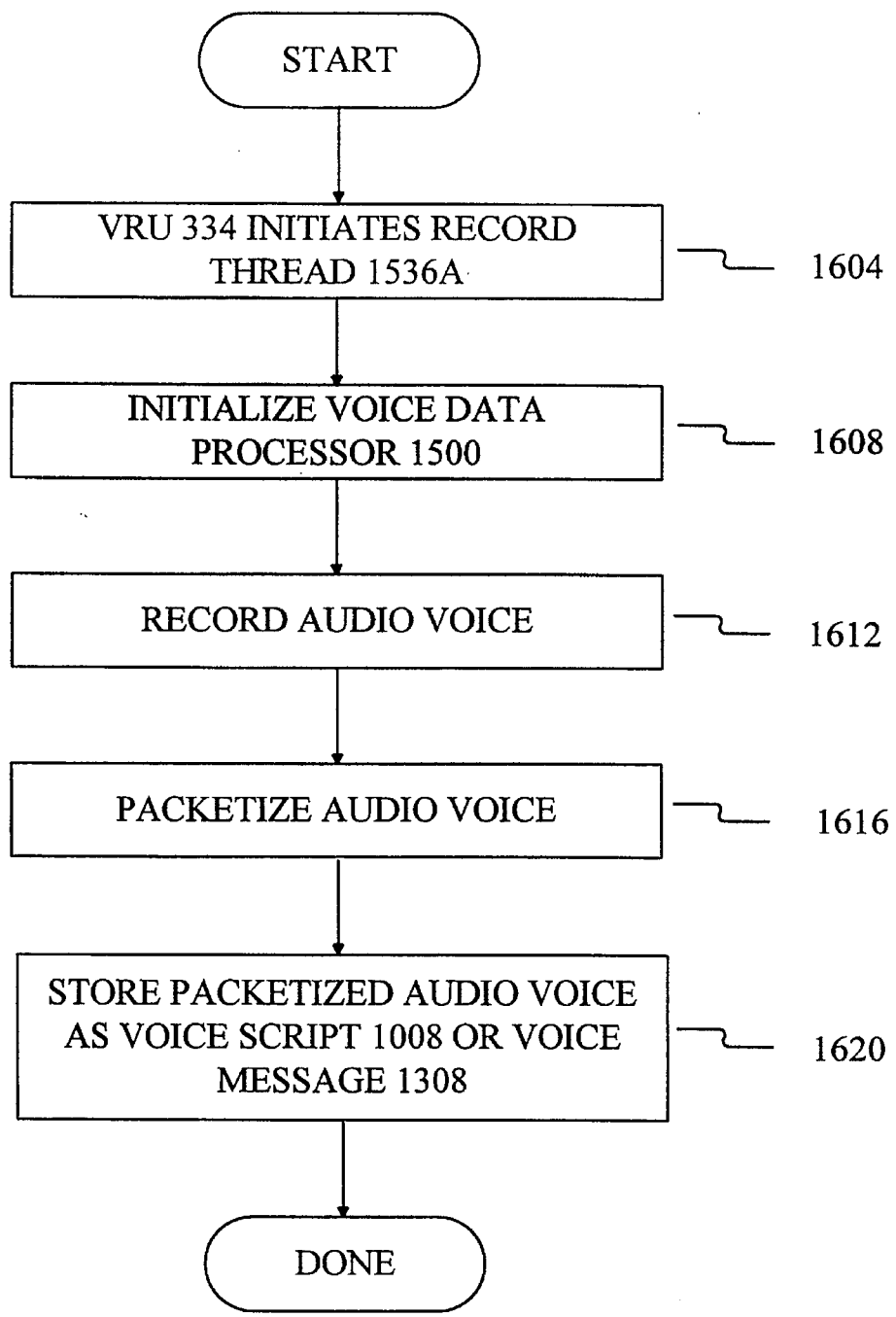
FIG. 16 is an operational flow diagram illustrating the recording of a voice script or a voice message for later playback.

FIG. 16 is an operational flow diagram illustrating the recording of a voice script 1008 or a voice message 1308 for later playback. Referring now to FIGS. 15 and 16, in a step 1604, automated voice response unit 334 initiates record thread 1536A. In a step 1608, record thread 1536A initializes voice data processor 1500. In a step 1612, the audio voice is recorded in buffers 1518 by audio system 1510. In a step 1616, this recorded audio voice is encapsulated into data packets which are stored as voice script 1008 or voice message 1308, as appropriate, in step 1620.

Figure 17:
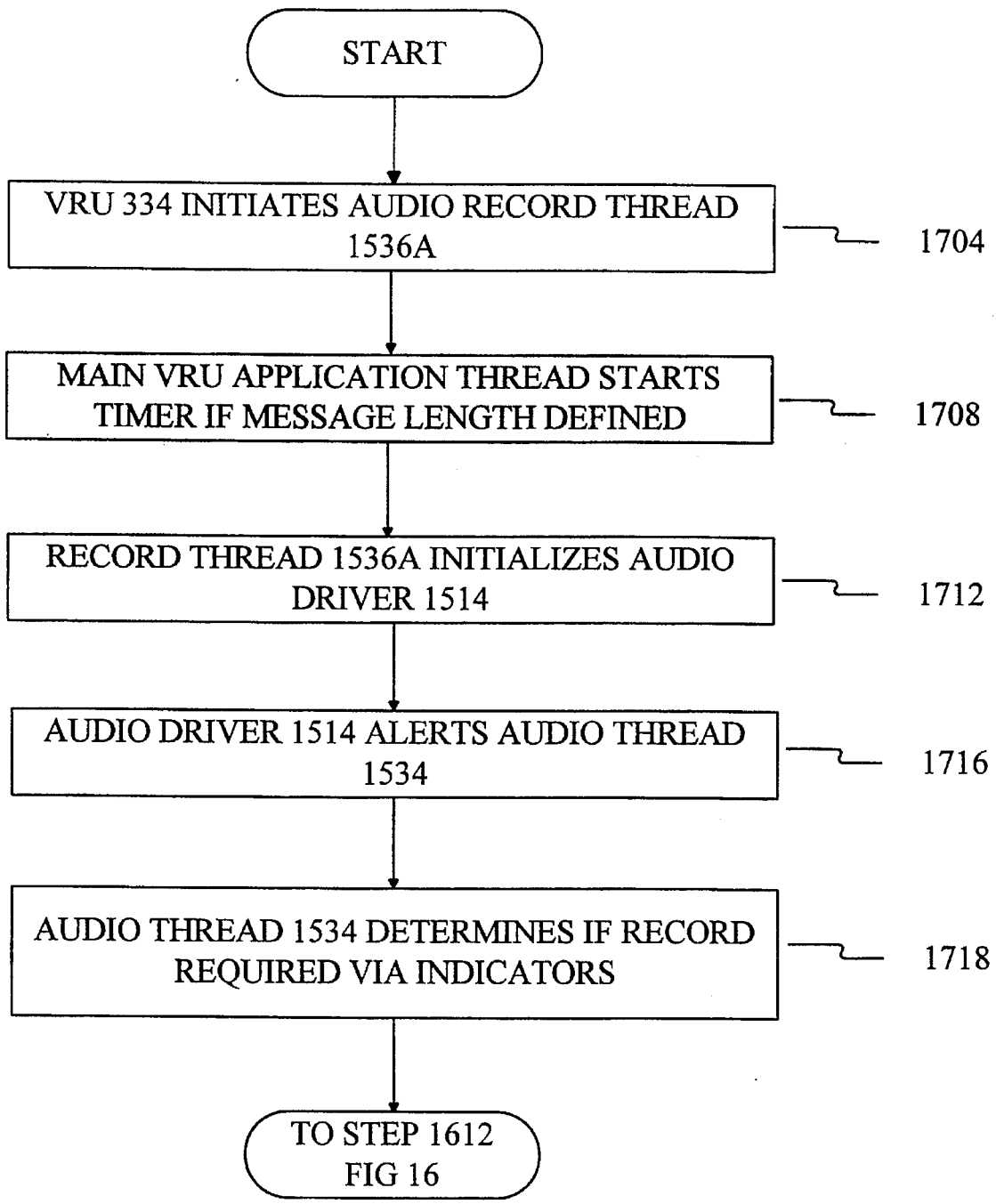
FIG. 17 is an operational flow diagram illustrating a process of initializing a voice data process.

The above-described process for recording voice script 1008 or voice nessage 1308 is now described in greater detail. FIG. 17 is an operational flow diagram illustrating the process of initializing voice data processor 1500 (i.e. step 1608).

Referring now to FIGS. 15 and 17, in a step 1704, automated voice response unit 334 initiates record thread 1536A. In one embodiment, when voice data needs to be recorded, the main application thread in automated voice response unit 334 initiates record thread 1536A. Upon initialization, record thread 1536A sets indicators to audio thread 1534, indicating that audio thread 1534 will be recording voice data.

In a step 1708, the main voice response unit 334 application thread starts a timer if the script or message length is defined. The timer can be used to limit the length of a script 1008 or a message 1308.

In a step 1712, record thread 1536A intializes audio driver 1514. In one embodiment, this is accomplished by record thread 1536A sending a QUEUE WAKE command to audio driver 1514. In response, audio driver 1514 alerts audio thread 1534 that audio voice is to be recorded. This occurs in a step 1716. In one embodiment, this is accomplished by audio driver 1514 sending a READ WAKE event to audio thread 1534 vis event queue 1512. Event queue 1512 is used to queue messages from audio driver 1514 to audio thread 1534.

In a step 1718, audio thread 1534 checks the indicators set by record thread 1536A in step 1704. These indicators provide an indication to audio thread 1534 that it will be recording voice data. With these steps accomplished, voice data processor 1500 is initialized and the recording processing can continue at step 1612 with the recording of voice data.

Figure 18:
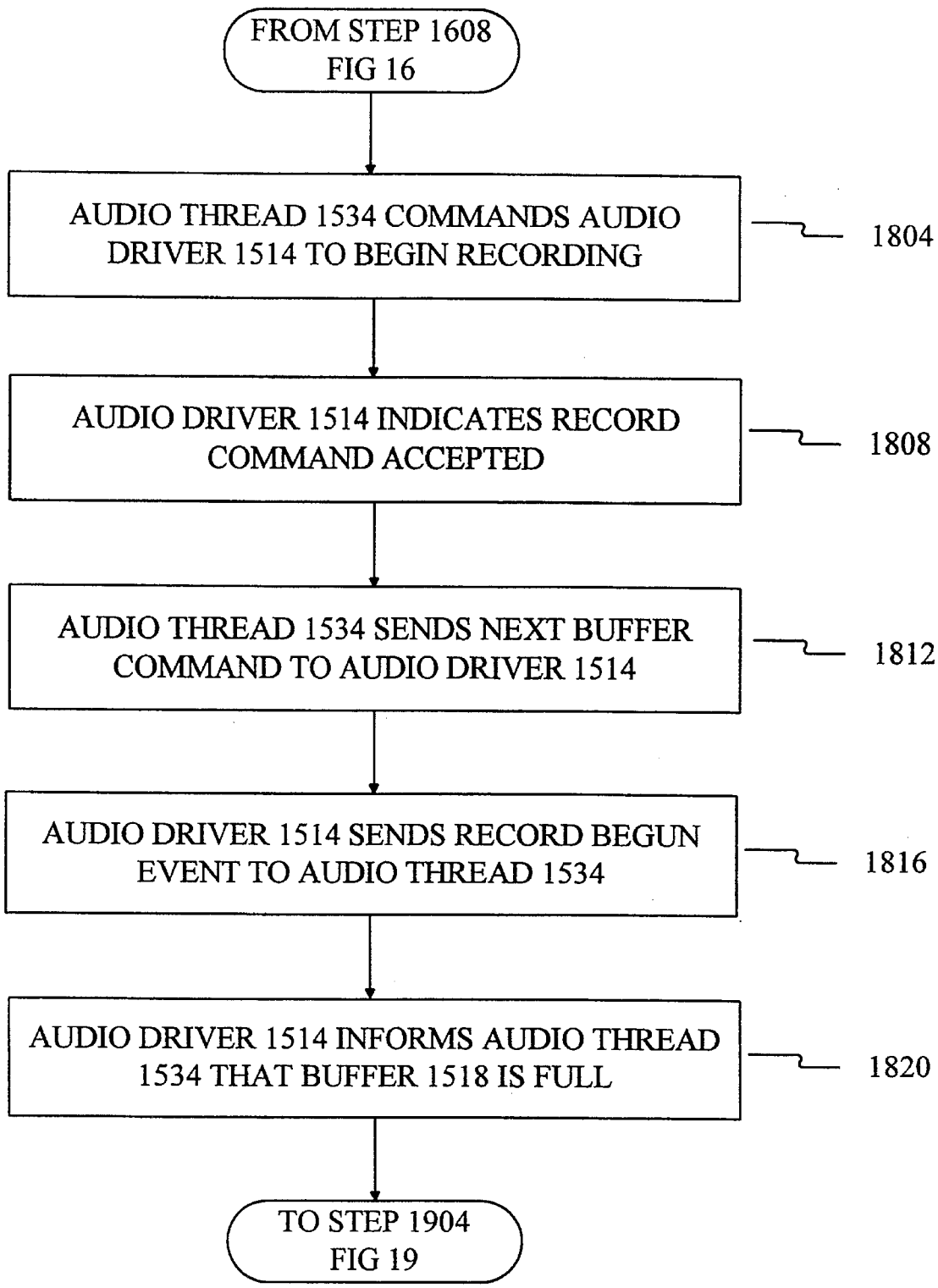
FIG. 18 is an operational flow diagram illustrating a manner in which voice data is recorded.

FIG. 18 is an operational flow diagram illustrating the steps associated with recording voice data. Referring now to FIGS. 15 and 18, in a step 1804, audio thread 1534 commands audio driver i1514 to begin recording the audio voice. In this step, audio thread 1534 sends the: address of a first data buffer 1518 to audio driver 1514. This is the address of the buffer 1518 in which the recorded audio voice will be stored. In one embodiment this is accomplished by audio thread 1534 sending a RECORD BEGIN command to audio driver 1514.

In a step 1808, audio driver 1514 acknowledges the command to begin recording by sending a BUFFER DONE CONTINUING event via event queue 1512 to audio thread 1534.

Upon receipt, in a step 1812, audio thread 1534 sends a NEXT BUFFER command to audio driver 1514 along with the address of the second data buffer 1518 in which the audio voice is to be recorded.

In a step 1816, audio driver 1514 sends a RECORD BEGUN event to audio thread 1534 via event queue 1512 indicating that the recording of the audio voice has started.

In a step 1820, when audio driver 1514 has filled the first buffer 1518A, audio driver 1514 informs audio thread 1534 that this buffer 1518A is full. This is accomplished by audio driver 1514 sending a first BUFFER DONE CONTINUING event to audio thread 1534 via event queue 1512. Audio driver 1514 releases the first buffer 1518A so the data therein can be packetized by voice module 1530. Before packetizing the audio voice in buffer 1518, audio thread 1534 first checks each frame of audio voice stored in the data buffer to determine whether a configurable length of silence is detected. In one embodiment, the configurable length of silence is three seconds.

Figure 19:
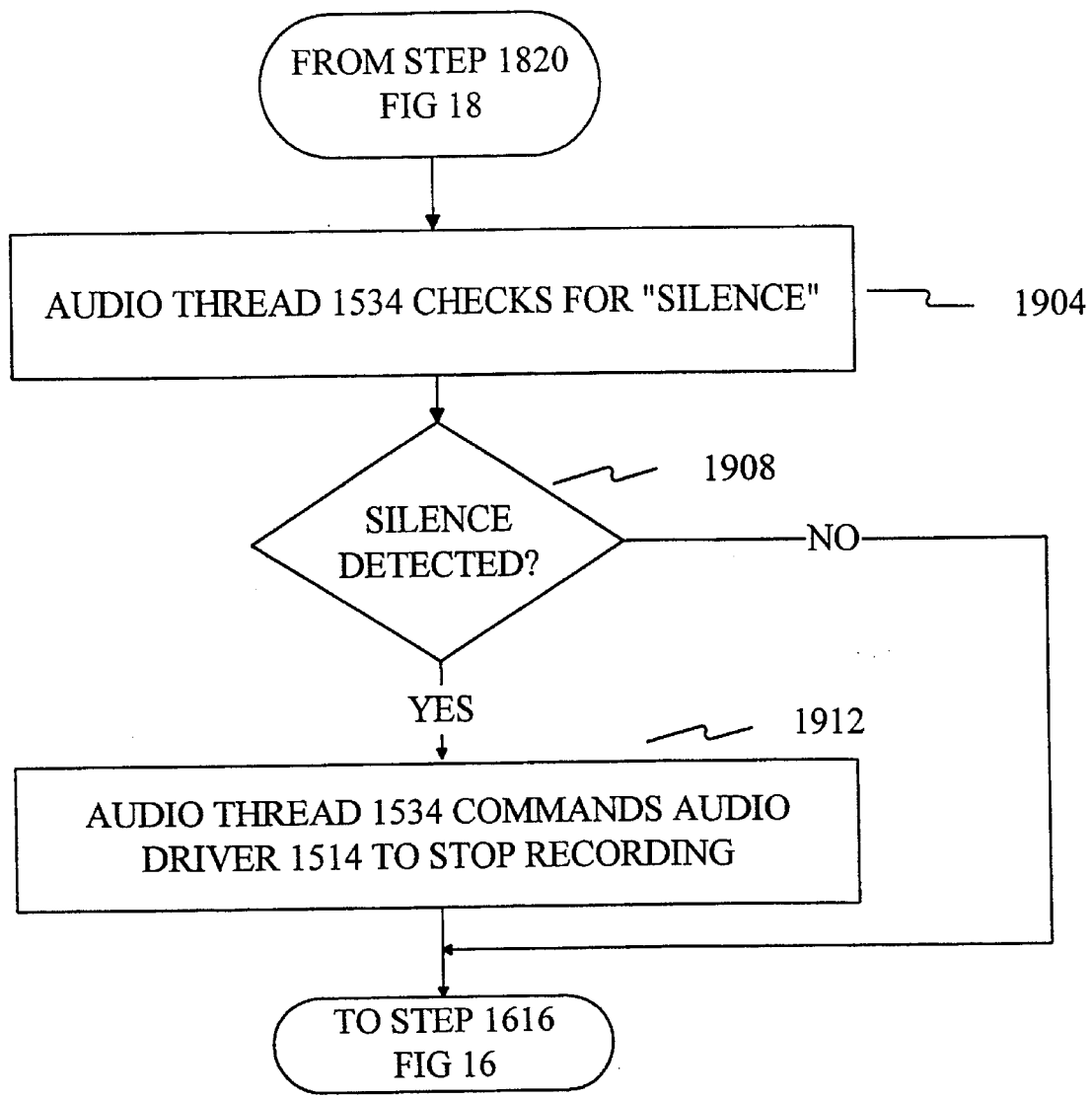
FIG. 19 is an operational flow diagram illustrating a manner in which voice data is checked for silence.

FIG. 19 is an operational flow diagram illustrating the steps of checking for silence. Referring now to FIGS. 15 and 19, in a step 1904, audio thread 1534 checks the data in first buffer 1518 to determine whether there is a configurable length of silence. If a configurable length of silence is detected, as illustrated by a step 1908, audio thread 1534 commands audio driver 1514 to stop recording by sending a STOP RECORDING command. This occurs in a step 1912. Also in this step, audio thread 1534 indicates to record thread 1536A that recording is stopping. This is accomplished by sending a CHECK FOR SILENCE message to record thread 1536A. Regardless of whether the configurable length of silence was detected in step 1908, audio thread 1534 can packetize the data recorded in first buffer 1518A. Thus, the operation continues at step 1616 (FIG. 16).

Figure 20:
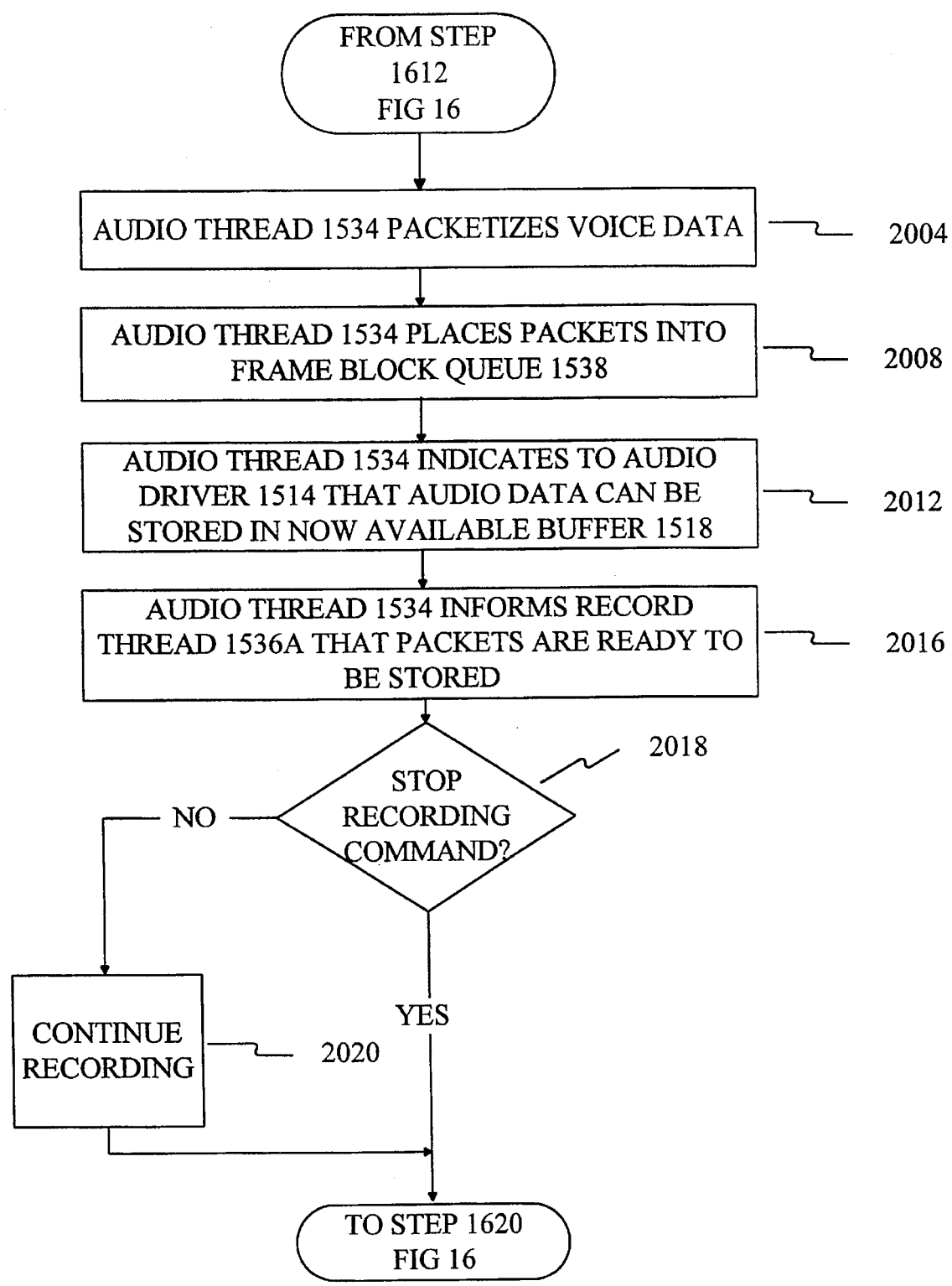
FIG. 20 is an operational flow diagram illustrating a manner in which voice data is packetized.

FIG. 20 is an operational flow diagram illustrating the packetizing of audio voice (i.e., step 1616). In a step 2004, audio thread 1534 takes the audio voice stored in buffer 1518A and encapsulates that data into data packets. In a step 2008, audio thread 1534 sequentially places each packet into frame block queue 1538. Once all the data is packetized and placed in a frame block queue 1538, audio thread 1534 sends a NEXT BUFFER command to audio driver 1514 along with the address of the now empty data buffer 1518A indicating that additional audio voice can be stored in that buffer 1518A. This occurs in a step 2012.

In a step 2016, audio thread 1534 notifies record thread 1536A that data packets of voice script 1008 (or voice message 1308) are in frame block queue 1538 and ready to be stored as voice data. In one embodiment this is accomplished by audio thread 1534 sending an AUDIO FED RECORD QUEUE message to record thread 1536A.

As audio thread 1534 is packetizing data and storing it in frame block queue 1538, audio driver 1514 is continuing to record the audio voice into buffers 1518. When the second buffer 1518B is full, the operation continues at step 1820 (FIG. 18) where audio driver 1514 informs audio thread 1534 that the second buffer 1518B is full. At this time, audio thread 1534 checks for silence (FIG. 19) and begins packetizing data (FIG. 20) from the second buffer 1518B.

If in step 1908 silence was detected in first buffer 1518A, and a STOP RECORDING command issued in step 1912 (illustrated by decision block 2018), there is no need for audio driver 1514 to continue recording, and the operation continues at step 1620 by storing packetized data currently in frame block queue 1538 into the appropriate database 1004, 1304.

If, on the other hand, in step 1908 no silence was detected in first data buffer 1518A, there is data to be packetized and stored in second buffer 1518B and the recording continues (FIG. 18) (illustrated by decision block 2020). As with first buffer 1518A, when second buffer 1518B is full, in a step 1820, audio driver 1514 informs audio thread 1534 that the second buffer 1518B is full. Again, audio thread 1534 checks second buffer 1518B for silence (FIG. 19), packetizes the data (FIG. 20), and stores it in frame block queue 1538 for subsequent storage in the appropriate database 1004, 1304. These steps of recording, checking for silence and packetizing continue until silence is detected in step 1908.

Figure 21:
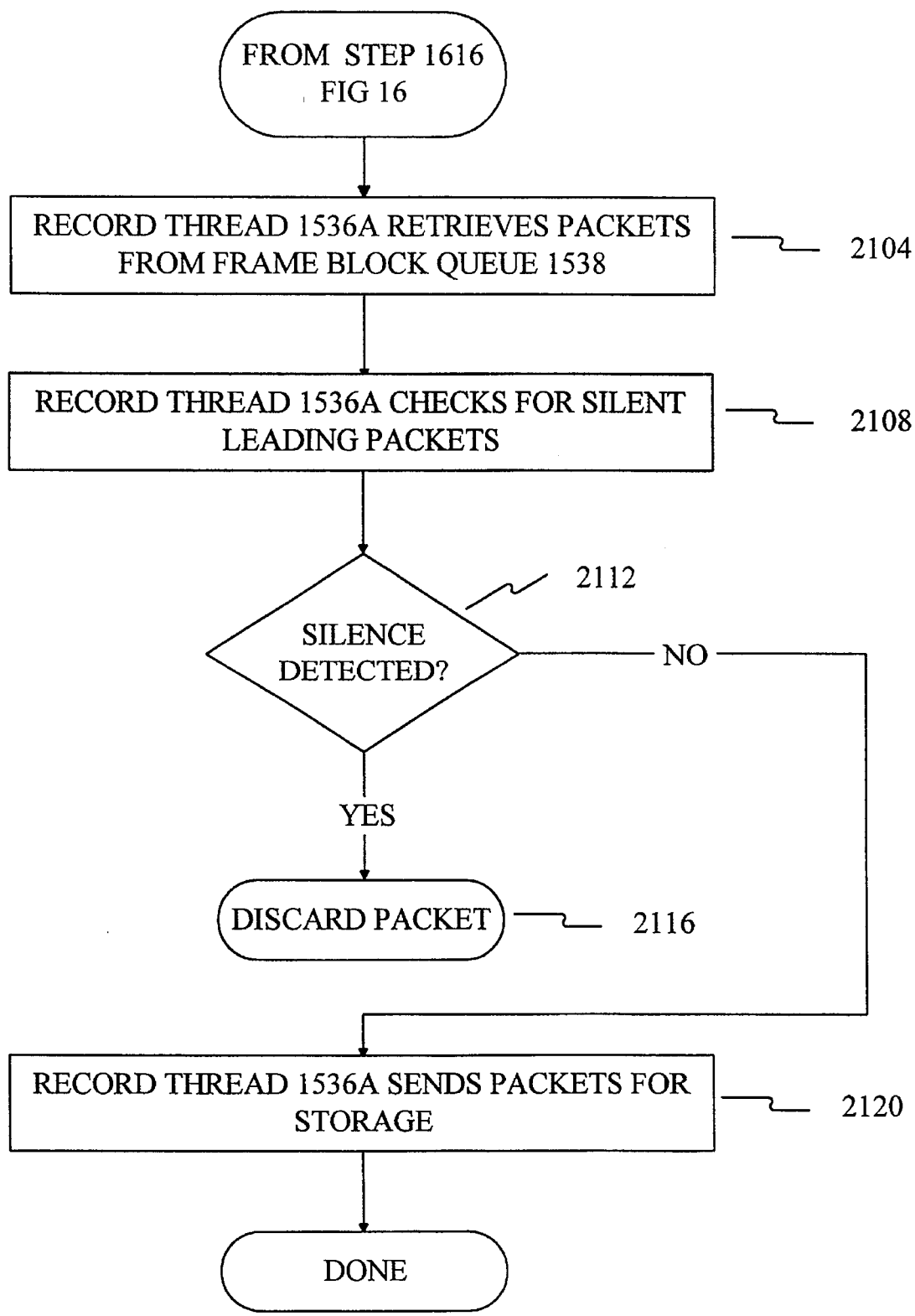
FIG. 21 is an operational flow diagram illustrating a manner in which packetized data is stored.

Regardless of whether a STOP RECORDING command has been issued, packetized data in frame block queue 1538 must be stored in step 1620. The process by which this packetized data are stored is illustrated in FIG. 21. Referring now to FIG. 21, in a step 2104, record thread 1536A retrieves the data packets from a frame block queue 1538. In a step 2108, each packet is checked to determine whether voice energy can be detected in any frame of the packet. If a packet does not contain any frames that have detectable voice energy, (illustrated by decision box 2112), that packet is discarded in a step 2116. If, however, voice energy is detected, that packet and all subsequent packets are sent to the appropriate database 1004, 1304 until recording is stopped, as illustrated by step 2120. The process of discarding leading packets containing all silent frames is how leading silence on a newly-recorded message is edited. After all the packets have been retrieved from frame block queue 1538 and stored, record thread 1536A waits for another AUDIO FED RECORD QUEUE message. Upon receipt of AUDIO FED RECORD QUEUE message, record thread 1536A continues at step 2104.

The storage of voice scripts in voice script database 1004 and voice messages in voice message database 1304 can be accomplished a variety of ways. The method of storage can be an element in a linked list in memory, as records in a flat file, or as records in a distributable network database server. In a preferred embodiment, recorded voice packets are stored as elements in a linked list in memory first, overflowing to a temporary flat file when the length of the recorded voice data exceeds what can be easily be stored in memory. Subsequently, when the voice data is saved for future use, the voice data is transferred to front end distributor 904 for distribution to voice script service 908 or voice message service 912.

As stated above, the recording of voice data and the initial storage continues until silence is detected. If the energy level in a frame of audio voice is below a configurable level, that frame is designated as silent. When the number of consecutive silent frames exceeds a configurable length of time, audio thread 1534 sends RECORD STOP command to audio driver 1514 and sends a CHECK FOR SILENCE message to record thread 1536A.

Figure 22:
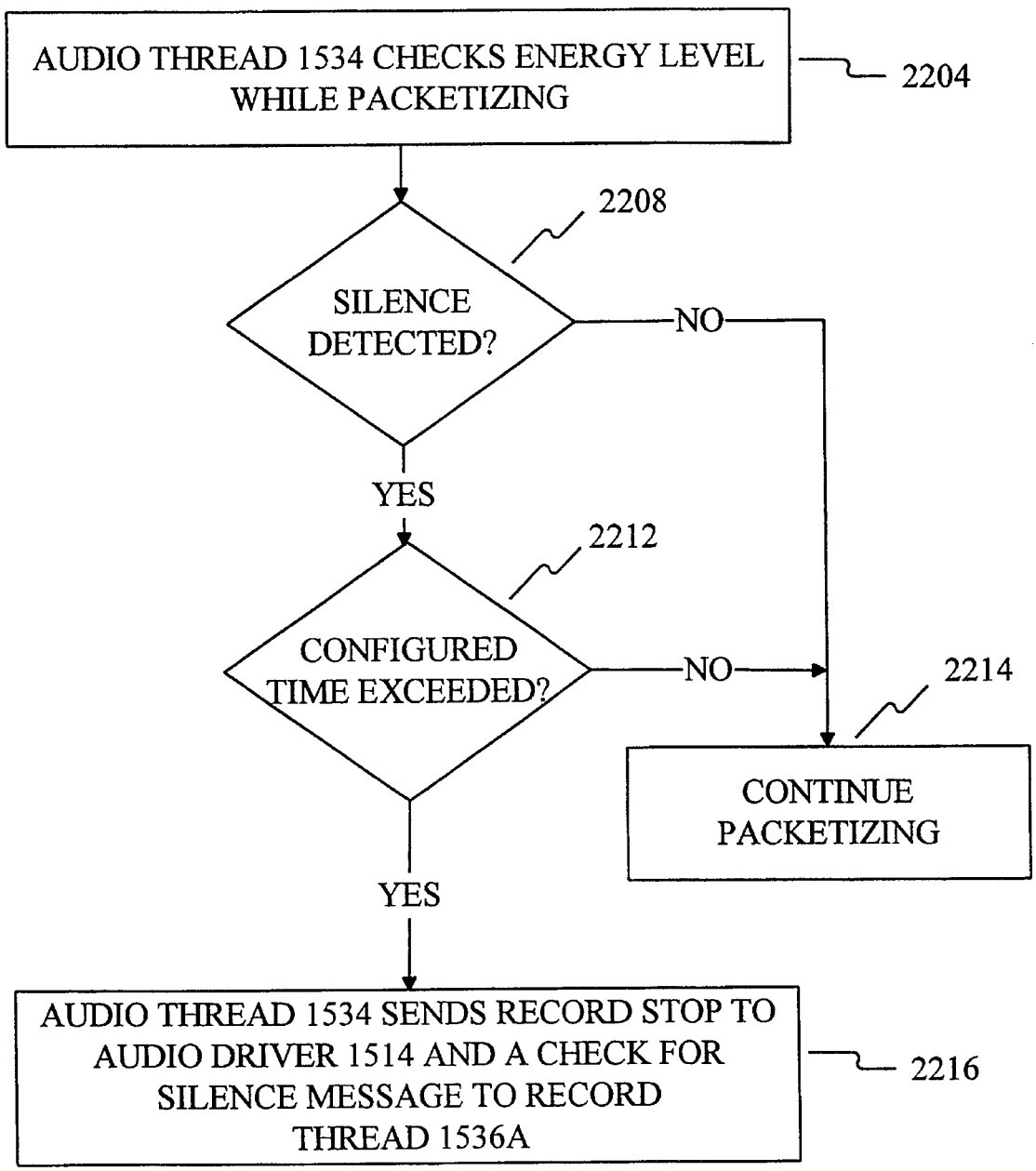
FIG. 22 is an operational flow diagram illustrating a manner in which recording is stopped when silence is detected.

FIG. 22 is an operational flow diagram illustrating a manner by which recording is stopped when silence is detected. Referring now to FIG. 22, in a step 2204, audio thread 1534 checks the energy level of each frame of audio voice as it is being encapsulated into data packets. If no silence is detected (decision block 2208), audio thread 1534 continues packetizing data. If, however, silence is detected (decision block 2208), audio thread 1534 compares the number of silent frames to a predetermined length of time to determine whether the length of silence is greater than the configured time. If, in decision block 2212, the configured length of time is exceeded, audio thread 1534 sends a RECORD STOP message to audio driver 1514 and a CHECK FOR SILENCE message to record thread 1536A. This occurs in a step 2216. This causes record thread 1536A to check for silence. Record thread 1536A continues to send packets for storage until it detects silence. The process of discarding trailing packets containing all silent frames is the method by which trailing silence in a newly recorded message is edited.

Figure 23:
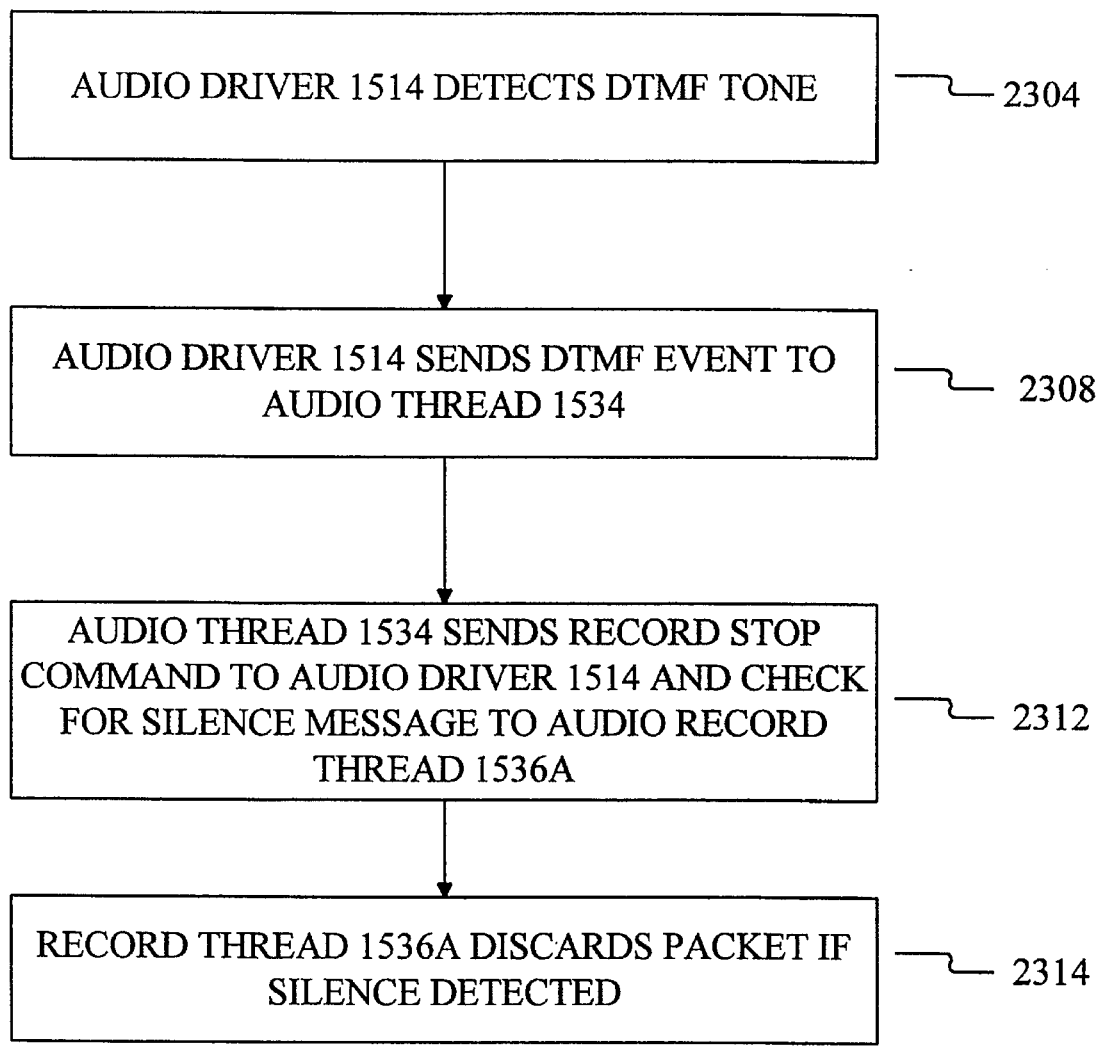
FIG. 23 is an operational flow diagram illustrating a stop recording scenario in response to a DTMF tone.

Recording can also be stopped when audio driver 1514 detects a DTMF (dual-tone multifrequency) tone or if a maximum message time length limit is exceeded. FIG. 23 is an operational flow diagram illustrating a stop recording scenario in response to a DTMF tone Referring now to FIG. 23, in a step 2304, audio driver 1514 detects a DTMF tone. In response, audio driver 1534 sends a DTMF event to audio thread 1534. This occurs in a step 2308. When audio thread 1534 receives the DTMF event, audio thread 1534 sends a RECORD STOP command to audio driver 1514 and a CHECK FOR SILENCE message to record thread 1536A. This occurs in a step 2312. In step 2314, record thread 1536A checks the packets for silence, and if silence is detected, discards the packet. The process of discarding trailing packets containing all silent frames is the method by which trailing silence on a newly recorded message is edited.

Figure 24:
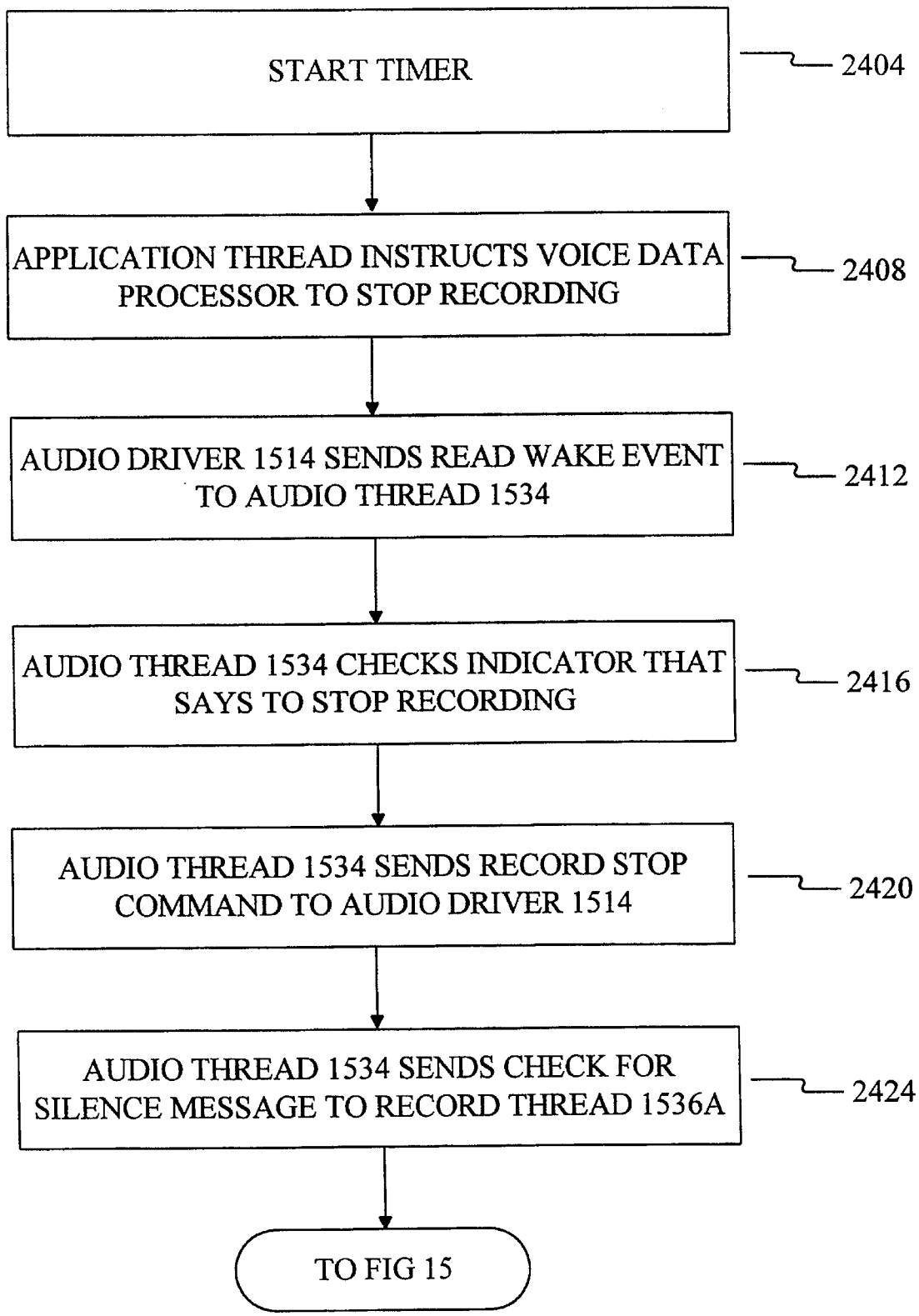
FIG. 24 is an operational flow diagram illustrating a manner in which recording is stopped when a maximum time limit is exceeded.

In the third scenario, recording is stopped when a maximum time limit for the message is exceeded. This is illustrated in FIG. 24. Referring now to FIG. 24, in a step 2404, if a recorded message has a maximum message length time limit defined, a timer is started for the message length time limit at the same time that recording is started.

When the timer expires, the application thread informs voice data processor 1500 to stop recording, as illustrated by step 2408. This is accomplished by setting an indicator telling audio thread 1534 to stop recording and sending a QUEUE WAKE command to audio driver 1514. In response, audio driver 1514 sends a READ WAKE event to audio thread 1534, causing audio thread 1534 to check the indicator that says stop recording. This is illustrated by steps 2412 and 2416. In response, audio thread 1534 sends a RECORD STOP command to audio driver 1514 and a CHECK FOR SILENCE message to record thread 1536A. This occurs in steps 2420 and 2424. In response, record thread 1536A checks for silence and discards silent packets.

Figure 25:
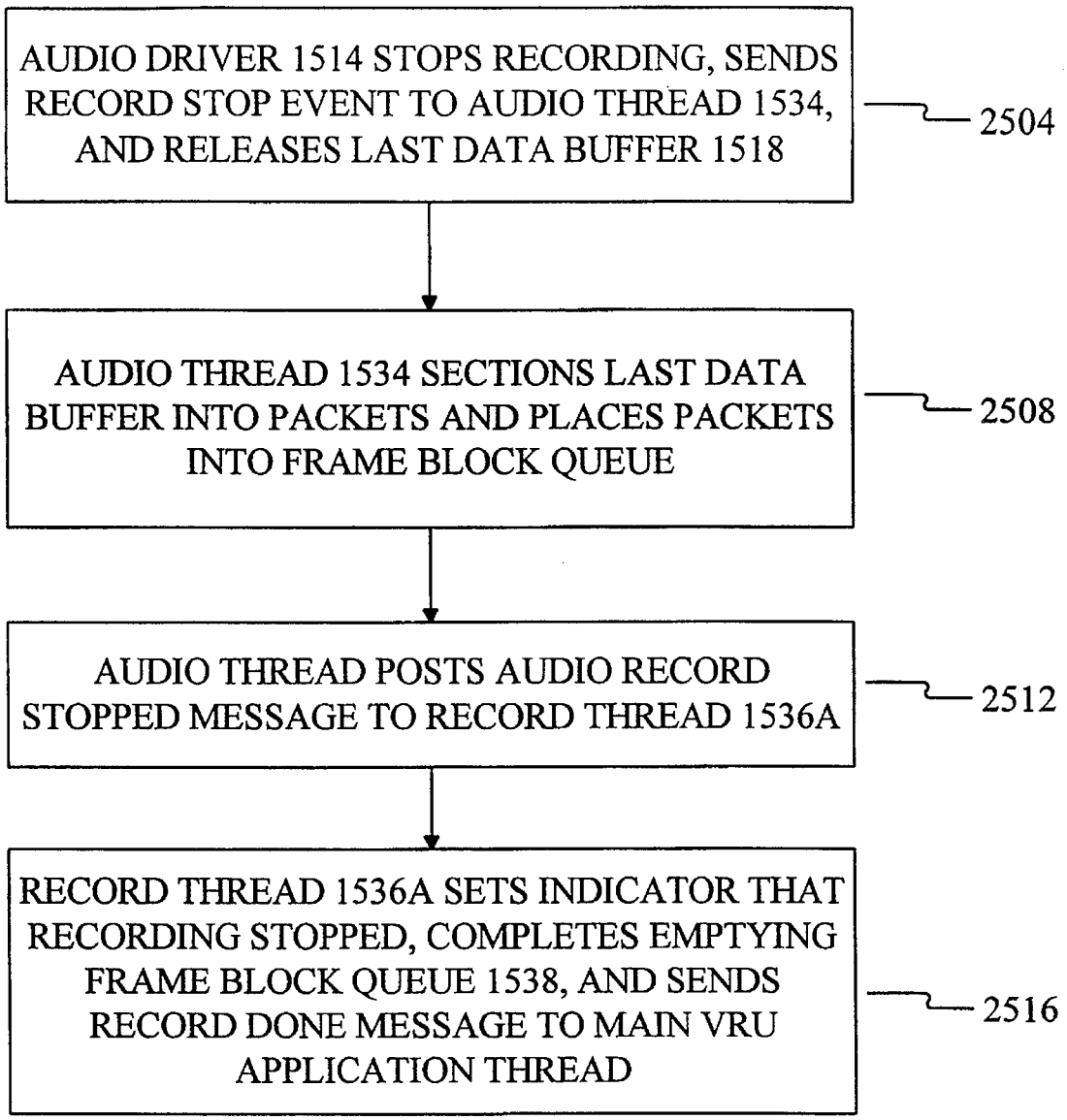
FIG. 25 is an operational flow diagram illustrating steps followed upon receipt of a RECORD STOP command.

In each of the three scenarios described above for stopping the recording, audio thread 1534 issued a RECORD STOP command to audio driver 1514. The steps followed upon receipt of this command are illustrated in FIG. 25. Referring now to FIG. 25, in a step 2504 upon receipt of the RECORD STOP command, audio driver 1514 stops recording and sends a RECORD STOP event to audio thread 1534 and releases the last data buffer 1518.

In response, audio thread 1534 sections the last data buffer 1518 into packets and places these packets in frame block queue 1538. This occurs in a step 2508. Audio thread 1534 then posts an AUDIO RECORD STOPPED message to record thread 1536A in a step 2512. In step 2516, record thread 1536A sets an indicator that recording has stopped, completes emptying frame block queue 1538, and sends a RECORD DONE message to the main automated voice response unit 334 application thread.

2.5 Voice Playback

Once a voice script 1008 is stored in voice script database 1004, this voice script 1008 can be played back to a user 106. Similarly, a voice message 1308 stored in voice message database 1304 can be played to a user 106. As briefly introduced above, playback is accomplished by retrieving the packets that make up the voice script 1008 or voice message 1308 and playing them to the user 106 as they are retrieved.

Figure 26:
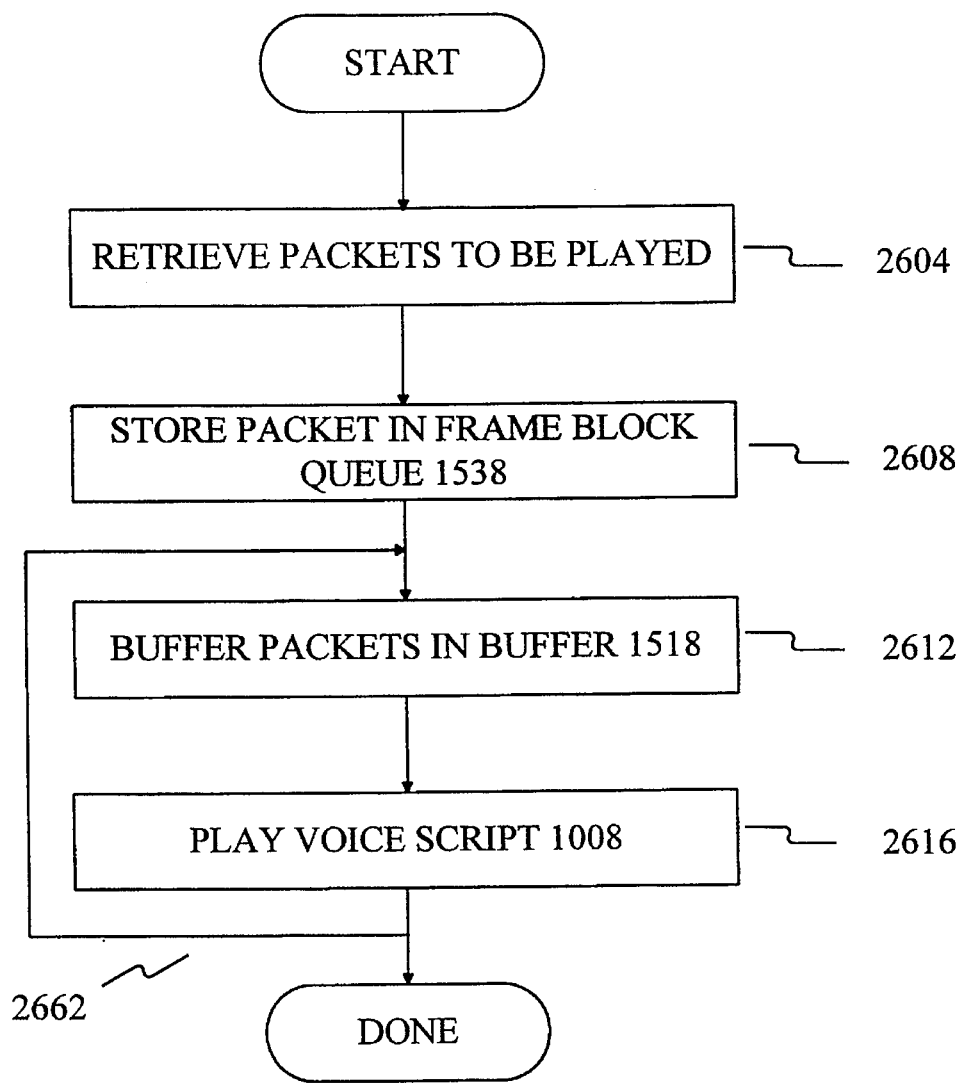
FIG. 26 is an operational flow diagram illustrating a manner in which voice data is played.

The process used to play back a voice script 1008 is the same as the process used to play a voice message 1308, The following discussion describes voice playback in terms of playing a voice script 1008 from a voice script database 1004. The same process is followed to replay a voice message 1308 from voice message database 1304. FIG. 26 is an operational flow diagram illustrating the process of playing voice data. Referring now to FIG. 26. in a step 2604 automated voice response unit 334 retrieves the script 1004 to be played. More specifically, the first packet or packets of the script are retrieved. In a step 2608, the retrieved packets are stored in frame block queue 1538. Once these packets are stored in:frame block queue 1538, the playback of voice script 1008 can be controlled by audio thread 1534 and audio driver 1514.

In a step 2612, the audio voice extracted from the packets queued in frame block queue 1538 is stored in a first buffer 1518A. In a step 2616, audio driver 1514 can play the message from first buffer 1518A. As illustrated by flowline 2662, if there are additional packets in frame block queue 1538, the data is de-packetized and stored in second buffer 1518B. Once audio driver 1514 has finished playing the audio voice from buffer 1518A, it begins playing the audio voice from 1518B. At this point, additional data can be de-packetized and stored in first buffer 1518A. This process continues until the entire message is played.

The above description provides a high level overview of the playback of voice data. The steps illustrated in 26 are now described in greater detail. In step 2604, automated voice response unit 334 retrieves the data packets that comprise the voice script 1008 that is to be played. This step is described in greater detail with reference to FIG. 27.

Figure 27:
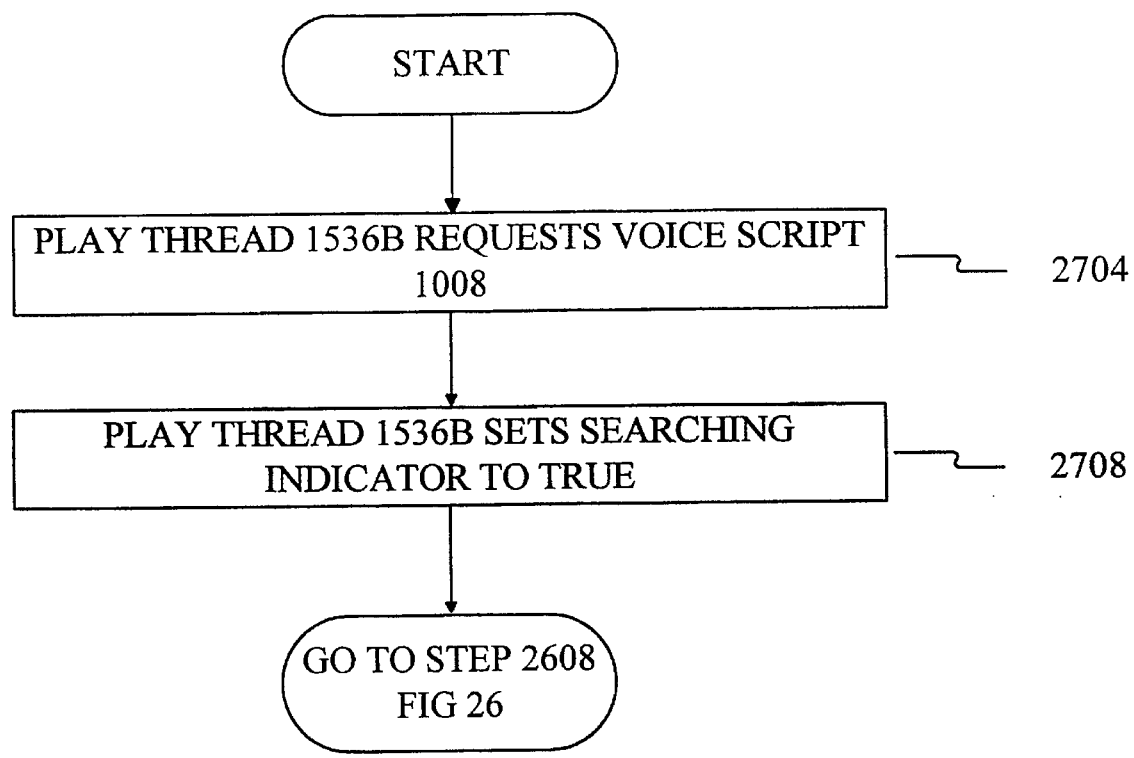
FIG. 27 is an operational flow diagram illustrating steps involved with retrieving packets of the voice script to be played.

FIG. 27 is an operational flow diagram illustrating the steps involved with retrieving packets of the script 1008 to be played (i.e. step 2604). Referring now to FIGS. 27 and 15, in a step 2704, play thread 1536B requests the appropriate voice script 1008 from voice script service 908. In a preferred embodiment, this is accomplished by sending a FIRST SEARCH REQUEST message to a CLIF client interface.

In a step 2708, play thread 1536B sets a searching indicator to true which indicates that voice data processor 1500 will be playing voice data. As packets are received, they are stored in frame block queue 1538, as illustrated by step 2612. Play thread 1536B continues to receive packets from voice script service 908 as long as there is room in frame block queue 1538 and until all the packets are retrieved for the appropriate voice script 1008.

Figure 28:
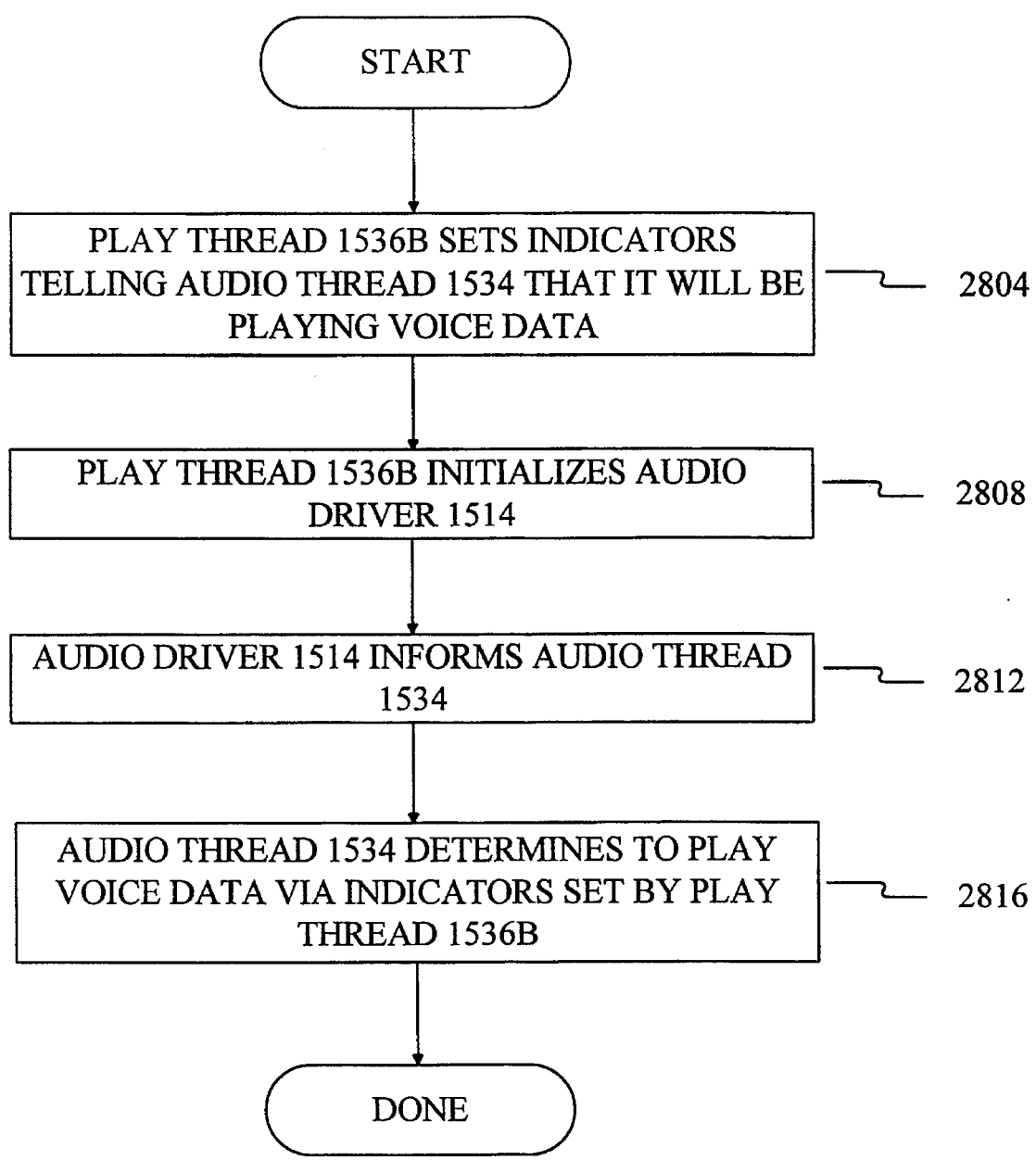
FIG. 28 is an operational flow chart illustrating a manner in which a voice data processor is initialized.

FIG. 28 is an operational flow chart illustrating the manner in which voice data processor 1500 is initialized to play a voice script 1008. Referring now to FIGS. 28 and 15, in step 2804, play thread 1536B sets an indicator telling audio thread 1534 that it will be playing voice data.

Play thread 2636B initializes audio driver 1514. This occurs in a step 2808. In one embodiment, this initialization is accomplished by sending a QUEUE WAKE command to audio driver 1514.

In a step 2812, audio driver 1514 responds to the QUEUE WAKE command by informing audio thread 1534 that it has been initialized. In one embodiment this is accomplished by audio driver 1514 sending a READ WAKE event to audio thread 1534. The READ WAKE event is sent via event queue 1512.

In a step 2816, audio thread 1534 checks the indicators set in step 2804 and thereby determines that voice data is to be played by play thread 1536B. With this accomplished, voice data processor is initialized and playback can begin.

As discussed above with reference to FIG. 26, the data packets that make up the script 1008 to be played are retrieved from frame block queue 1538, de-packetized, and stored in buffers 1518.

The latency associated with playing back voice script 1008 can be minimized by beginning playback of the script as soon as the first packet of that script is retrieved and de-packetized. Therefore, according to the preferred embodiment, when the first packet is retrieved, the audio voice is extracted therefrom and stored in first buffer 1518A. Audio driver 1514 immediately begins playing this data to user 106 while additional packets are being de-packetized and their data stored in second buffer 1518B. Once the data has been played from first buffer 1518A, audio driver 1514 begins playing the data from second buffer 1518B and informs audio thread 1534 that additional data can be de-packetized from the packets stored in frame block queue 1538, and that data may be stored in the now available first buffer 1518A.

Figure 29:
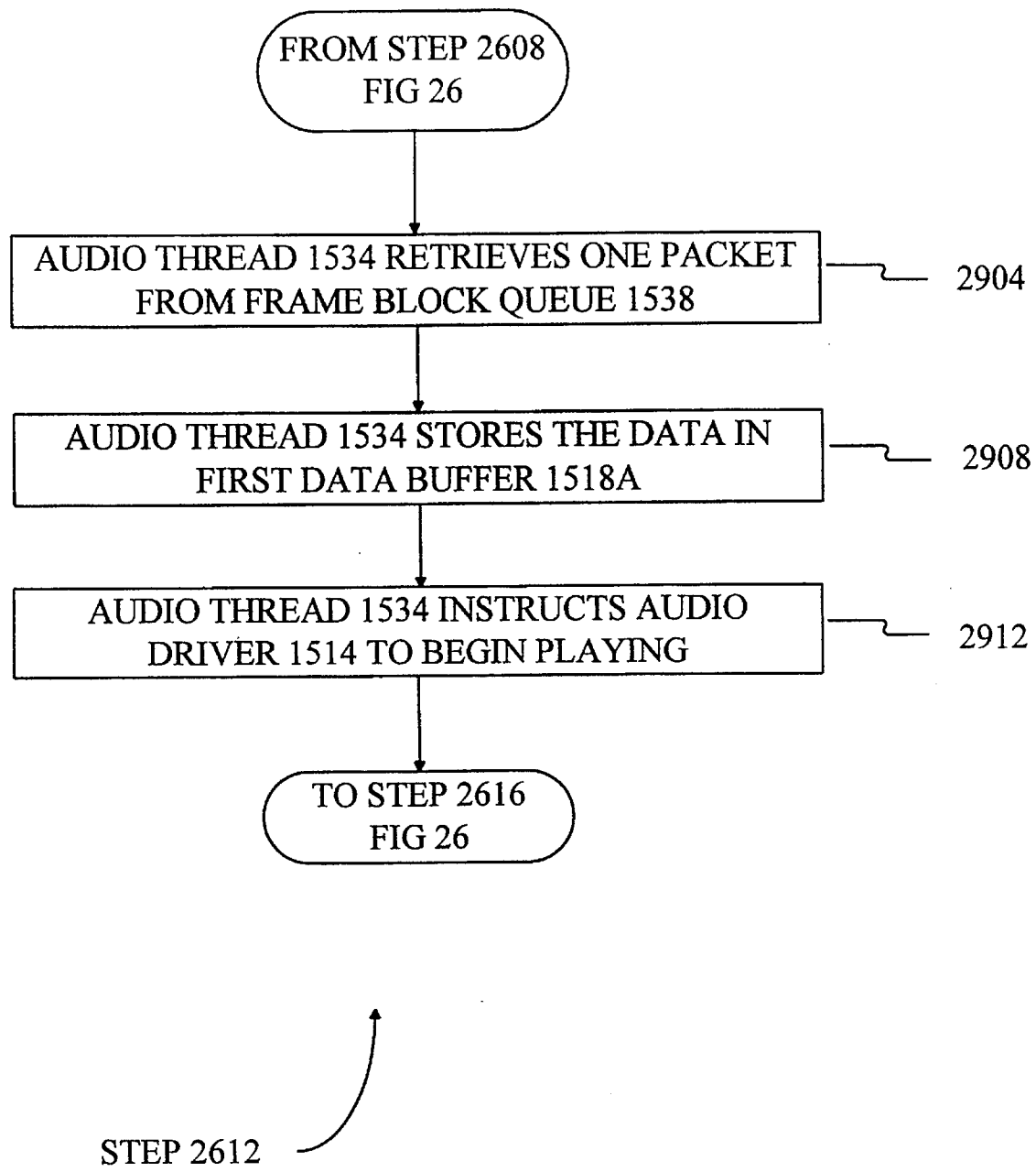
FIG. 29 is an operational flow diagram illustrating the buffering of packets in a data buffer.
Figure 30:
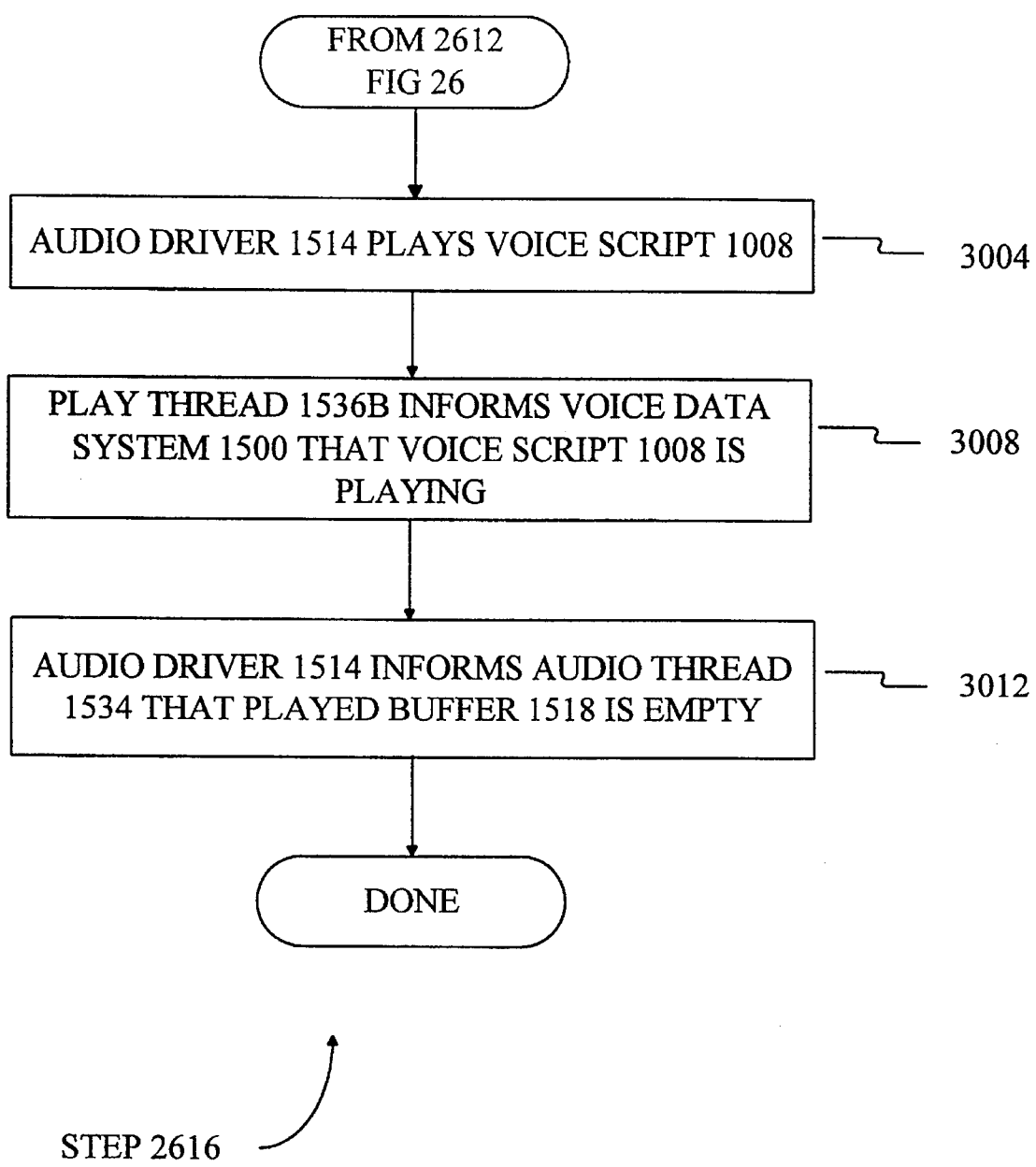
FIG. 30 is an operational flow diagram illustrating the playback of a voice script.

This process of playing from one buffer and de-packetizing and storing data in the other buffer continues until the entire script is played. As a result, playback can begin as soon as the first packet is retrieved, and the data extracted therefrom and playback continues without interruption until completed. These steps 2612 and 2616 are illustrated in greater detail in FIGS. 29 and 30. Referring now to FIGS. 29, 30, and 15, in a step 2904, audio thread 1534 retrieves the first packet of voice script 1008 from frame block queue 1538. In step 2908, audio thread 1534 extracts the data from this data packet and stores this data in first data buffer 1518A.

In a step 2912, audio thread 1534 instructs audio driver 1514 to begin playing voice script 1008. In one embodiment, this is accomplished by audio thread 1534 sending a PLAY BEGIN command to audio driver 1514 along with the location of first buffer 1518A. Audio driver 1514 acknowledges the command to begin playing by sending a BUFFER DONE CONTINUING event via event queue 1512 to audio thread 1534.

Figure 31:
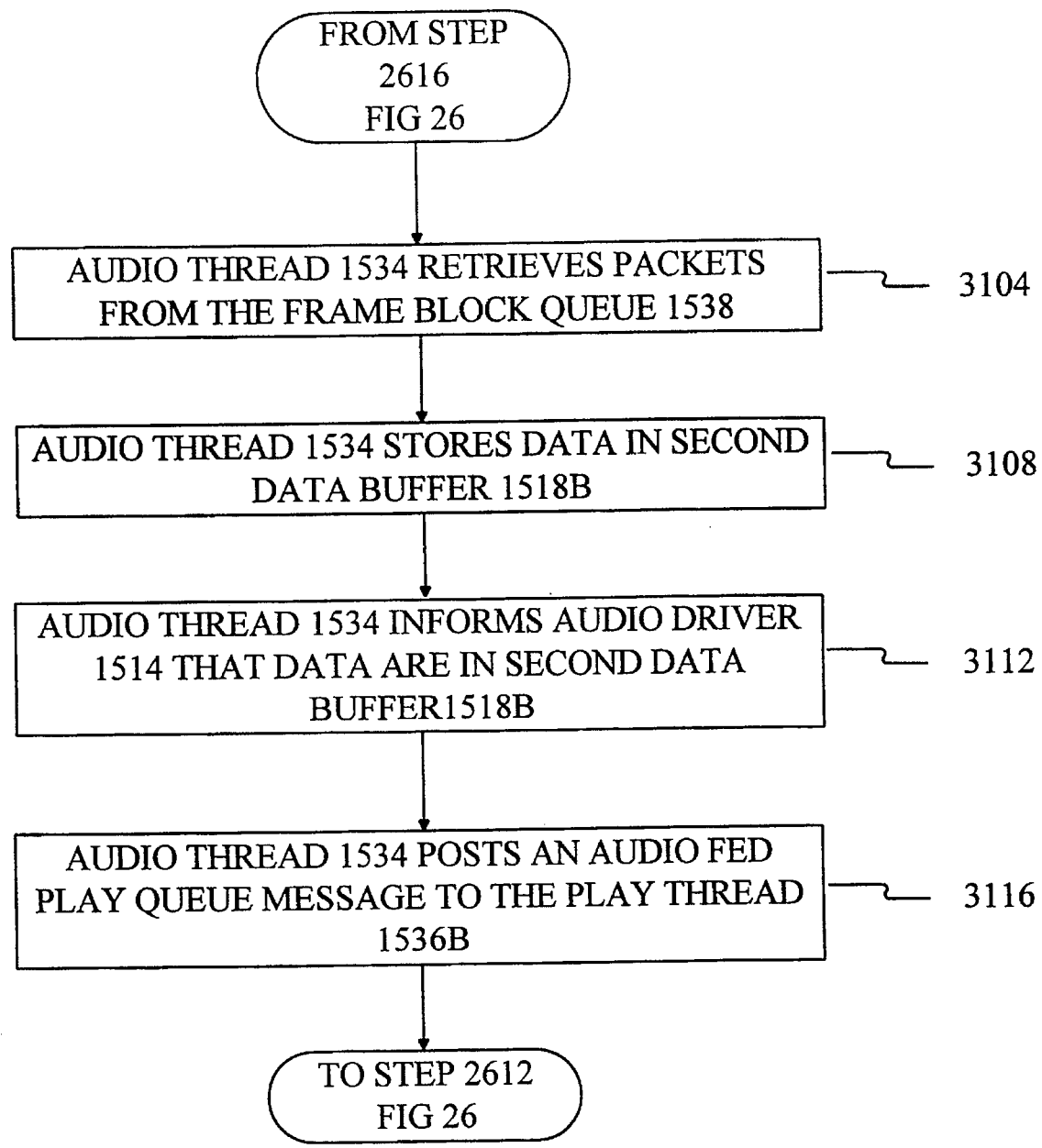
FIG. 31 is an operational flow diagram illustrating steps of extracting data from packets in the frame block queue and storing this data in an available buffer.

At this time, the operation continues at FIG. 30 (step 2616) with audio driver 1514 playing voice script 1008 and the operation also continues at FIG. 31, step 3104, with audio thread retrieving packets from frame block queue 1538 and extracting data therefrom. Referring now to FIG. 30, audio driver 1514 begins playing voice script 1008 to user 106 in a step 3004. Audio driver 1514 informs play thread 1536B by sending a PLAY BEGUN event to play thread 1536B. This occurs in a step 3008. Play thread 1536B informs the rest of voice data processor 1500 that script 1008 is playing.

In a step 3012, audio driver 1514 informs audio thread 1534 that voice data buffer 1518A is empty.

As audio driver 1514 is playing voice script 1008, audio thread 1534 continues to extract data from packets in frame block queue 1538 and store this data in the next available data buffer 1518. This is described with retrence to FIG. 31. FIG. 31 is an operational flow diagram illustrating the steps of extracting data from packets in frame block queue 1538 and storing this data in an available buffer 1518. Referring now to FIG. 31, in a step 3104, audio thread 1534 retrieves packets from frame block queue 1538. In a step 3108, audio thread 1534 stores data in second data buffer 1518B until second data buffer 1518B is full or frame block queue 1538 is empty.

In a step 3112, audio thread 1534 informs audio driver 1514 that data is in second buffer 1518B. In one embodiment, this is accomplished by audio thread 1534 sending a NEXT BUFFER command to audio driver 1514 with the location of second data buffer 1518B.

If at any time during the process of retrieving packets from voice script database 1004 and storing these packets in frame block queue 1538, frame block queue 1538 becomes full, play thread 1536B suspends retrieval of those packets. To alert play thread 1536B that there is now additional room in frame block queue 1538, audio thread 1534 informs play thread 1536B when it has retrieved packets from frame block queue 1538 for extraction of the data therefrom. In one embodiment, this is accomplished by audio thread 1534 posting an AUDIO FED PLAY QUEUE message to play thread 1536B via message queue 1532. This is illustrated by a step 3116.

It should be noted that when audio voice is recorded and encapsulated into packets, the last packet is usually not a full packet of frames. This is not a problem when a single voice script 1008, or single voice message 1308 is being played. However, when multiple voice scripts 1008 or voice messages 1308 are played one right after the other, empty frames in the last packet can result in a noticeable pause between playback of multiple voice scripts 1008 and/or voice messages 1308. To solve this problem, every packet placed in frame block queue 1538 by play thread 1536B contains a full complement of frames. When the last packet for a voice script 1008 or voice message 1308 is retrieved by play thread 1536B, the packet is not automatically placed in frame block queue 1538 if there is an additional voice script 1008 or voice message 1308 to be played. Instead, play thread 1536B first retrieves the first packet of the next voice script 1008 or voice message 1308 to be played. Play thread 1536B appends the first portion of this next packet to the last portion of the previous packet. As a result, the previous packet is a full packet when it is placed into frame block queue 1538. This method of transferring a portion of a next packet to the previous packet continues until the last packet in a series of voice scripts 1008 are retrieved.

There are two scenarios by which playback of a voice script 1008 or a voice message 1308 can be stopped. In the first scenario, the playback is stopped in response to the user 106 pressing the appropriate key (or keystroke sequence) on the telephone keypad. In a second scenario, playback is stopped when there is no more audio voice to be packetized. Both of these scenarios are now discussed in detail.

Figure 32:
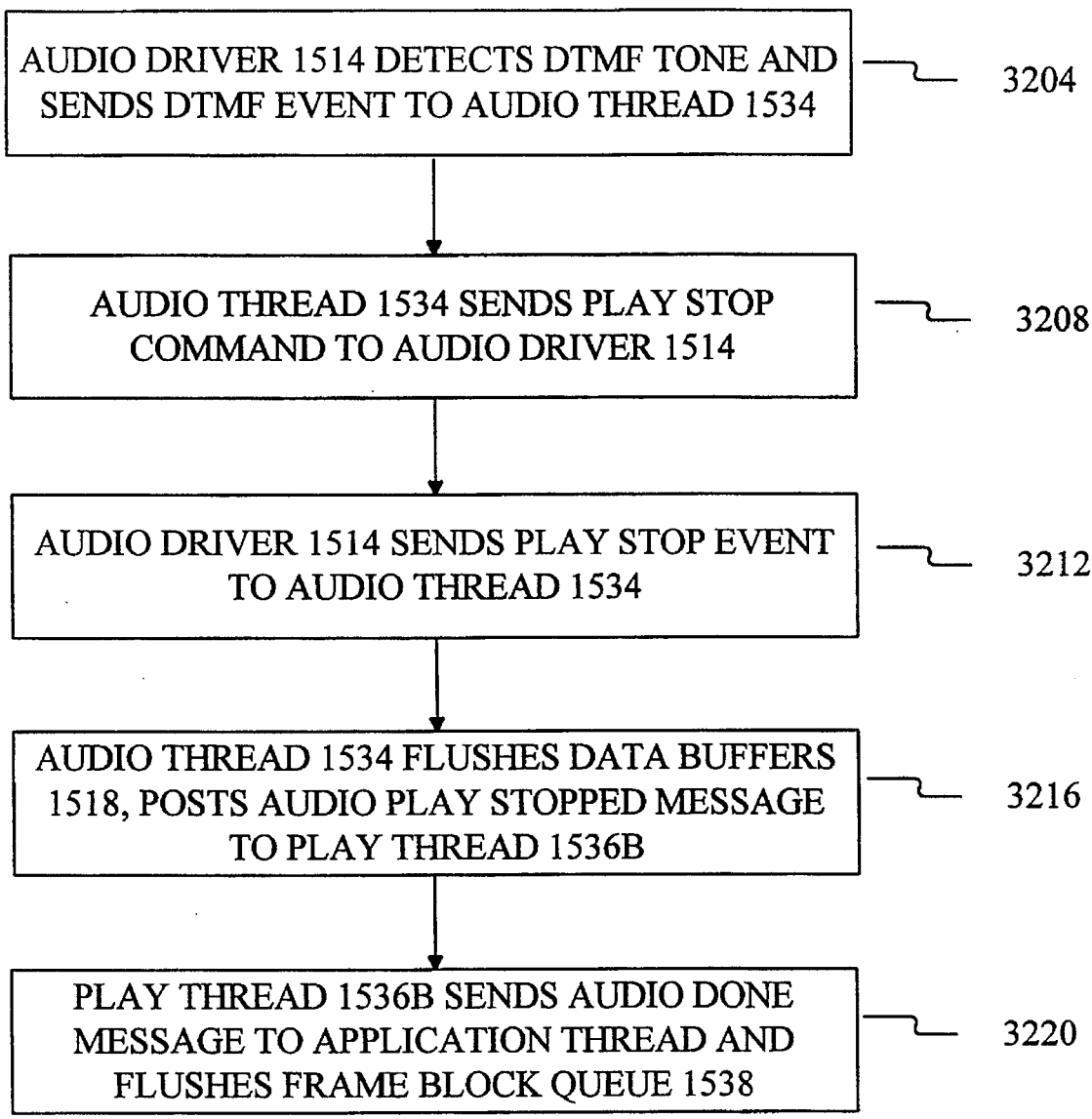
FIG. 32 is an operational flow diagram illustrating a method by which playback is stopped when user 106 enters the appropriate keystroke on the telephone keypad.

FIG. 32 is an operational flow diagram illustrating a method by which playback is stopped when user 106 enters the appropriate keystroke on the telephone keypad. Referring now to FIGS. 15 and 32, when a user is done listening to voice script 1008 the user enters the appropriate key on the telephone keypad. This could occur, for example, when the user has heard enough menu selections provided by a voice script 1008 and enters a key to choose the desired selection before the menu is done playing.

These scenarios are discussed in terms of a voice script 1008 for simplicity. After reading the below description, it will become apparent to a person skilled in the relevant art how these scenarios can be implemented for voice messages 1308.

In a step 3204, audio driver 1514 detects the DTMF tone generated when the user 106 enters the keypad keystroke. In response, audio driver 1514 sends a DTMF tone event to audio thread 1534. Audio thread 1534 recognizes this DTMF tone and interprets it to indicate that playback of script 1008 should be stopped. To stop playback, audio thread 1534 sends a PLAY STOP command to audio driver 1514 in a step 3208. In response, in a step 3212, audio driver 1514 sends a PLAY STOP event to audio thread 1534. In a step 3216, audio thread 1534 flushes data buffers 1518 and posts an AUDIO PLAY STOPPED message to play thread 1536B.

In response, play thread 1536B sends an AUDIO DONE message to the voice response unit application thread and flushes the data in frame block queue 1538. This occurs in a step 3220.

Figure 33:
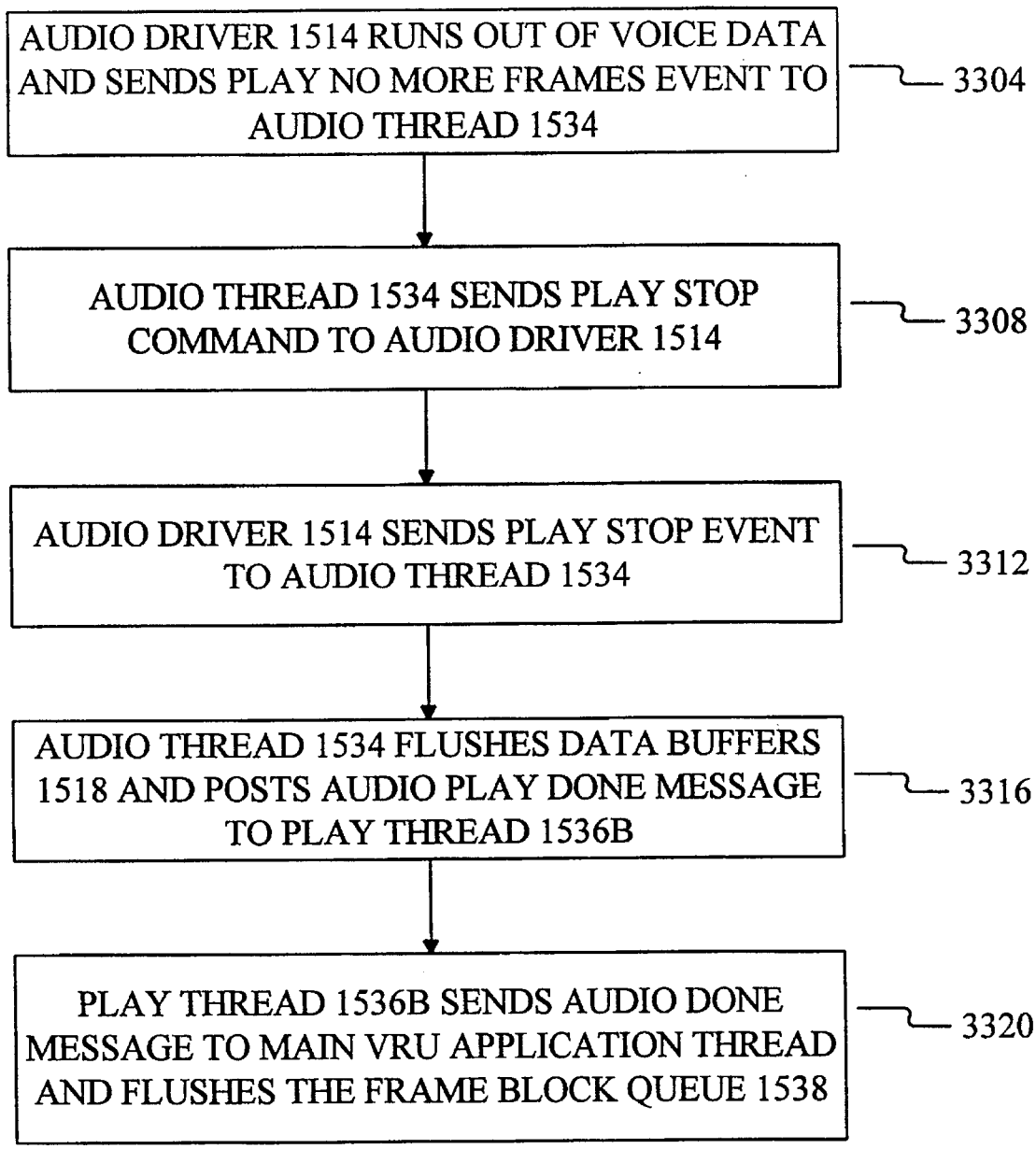
FIG. 33 is an operational flow diagram illustrating a manner in which playback is stopped when voice data is exhausted (i.e. according to scenario 2).

FIG. 33 is an operational flow diagram illustrating a manner by which playback is stopped when voice data is exhausted (i.e. according to scenario 2). Referring now to FIGS. 15 and 33, in a step 3304, when audio driver 1514 runs out of audio voice (i.e., buffers 1518 are empty), audio driver 1514 sends a PLAY NO MORE FRAMES event to audio thread 1534. In a step 3308, audio thread 1534 responds by sending a PLAY STOP command to audio driver 1514. Audio driver 1514 responds in step 3312 by sending a PLAY STOP event to audio thread 1534. In a step 3316, audio thread 1534 flushes data buffers 1518 and posts an AUDIO PLAY DONE message to play thread 1536B. In a step 3320, play thread 1536B sends an AUDIO DONE message to the main automated voice response unit application thread and flushes frame block queue 1538. Because play thread 153613 is no longer required, it ceases to exist.

2.6 Packet Retrieval

Figure 35:
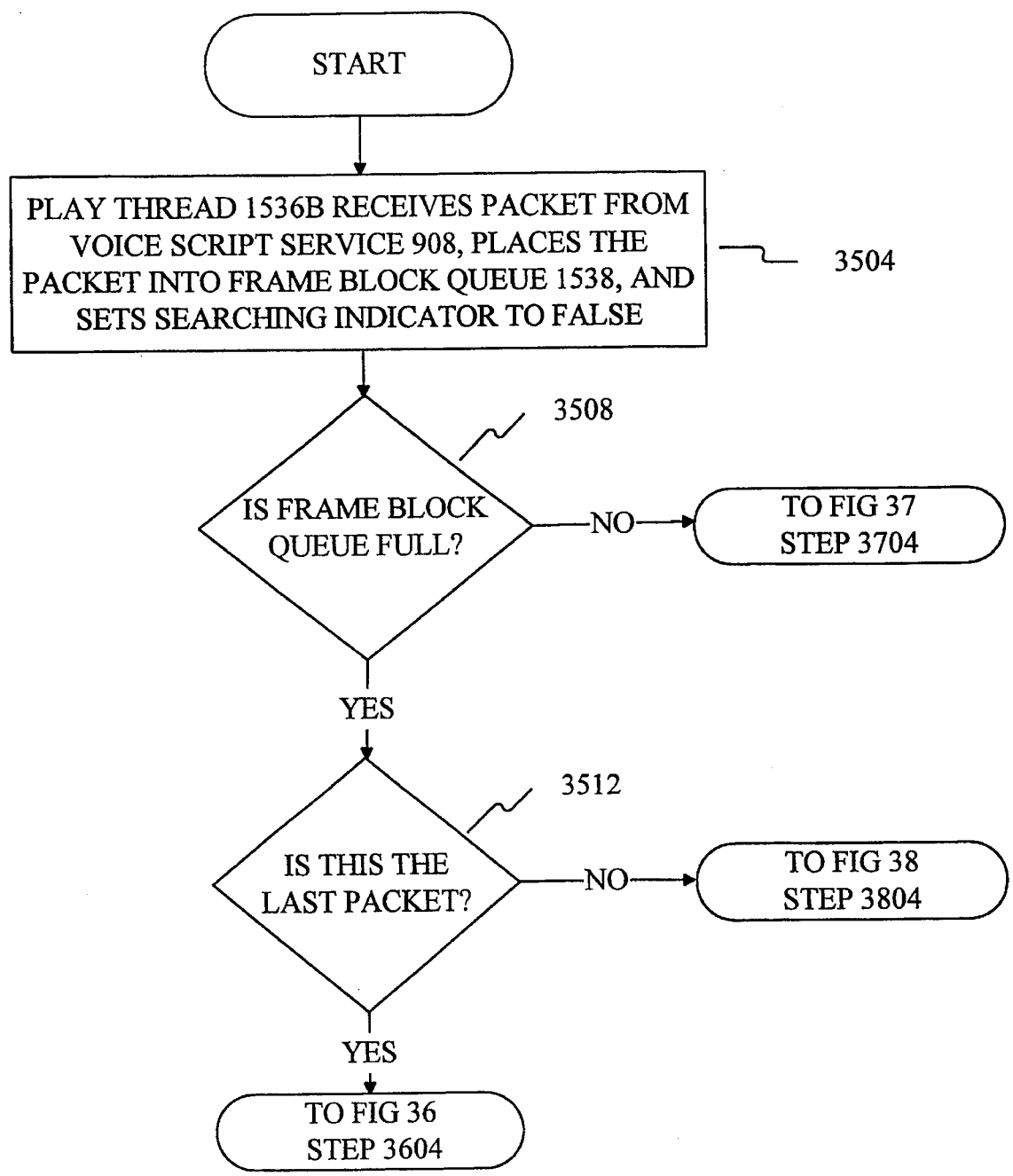
FIGS. 35, 36, 37, 38, 39, and 40, is an operational flow diagram illustrating the manner, in which packets are retrieved from the voice script service and the voice message service, and queued in the frame block queue.
Figure 36:
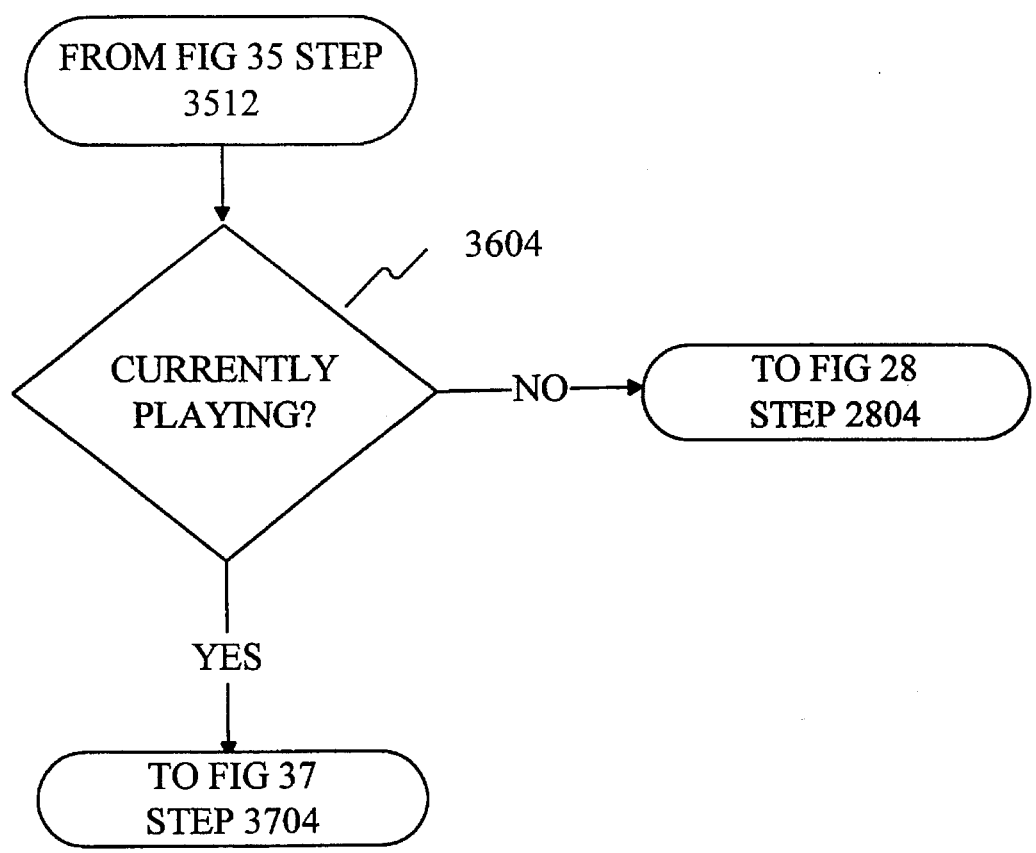
Figure 37:
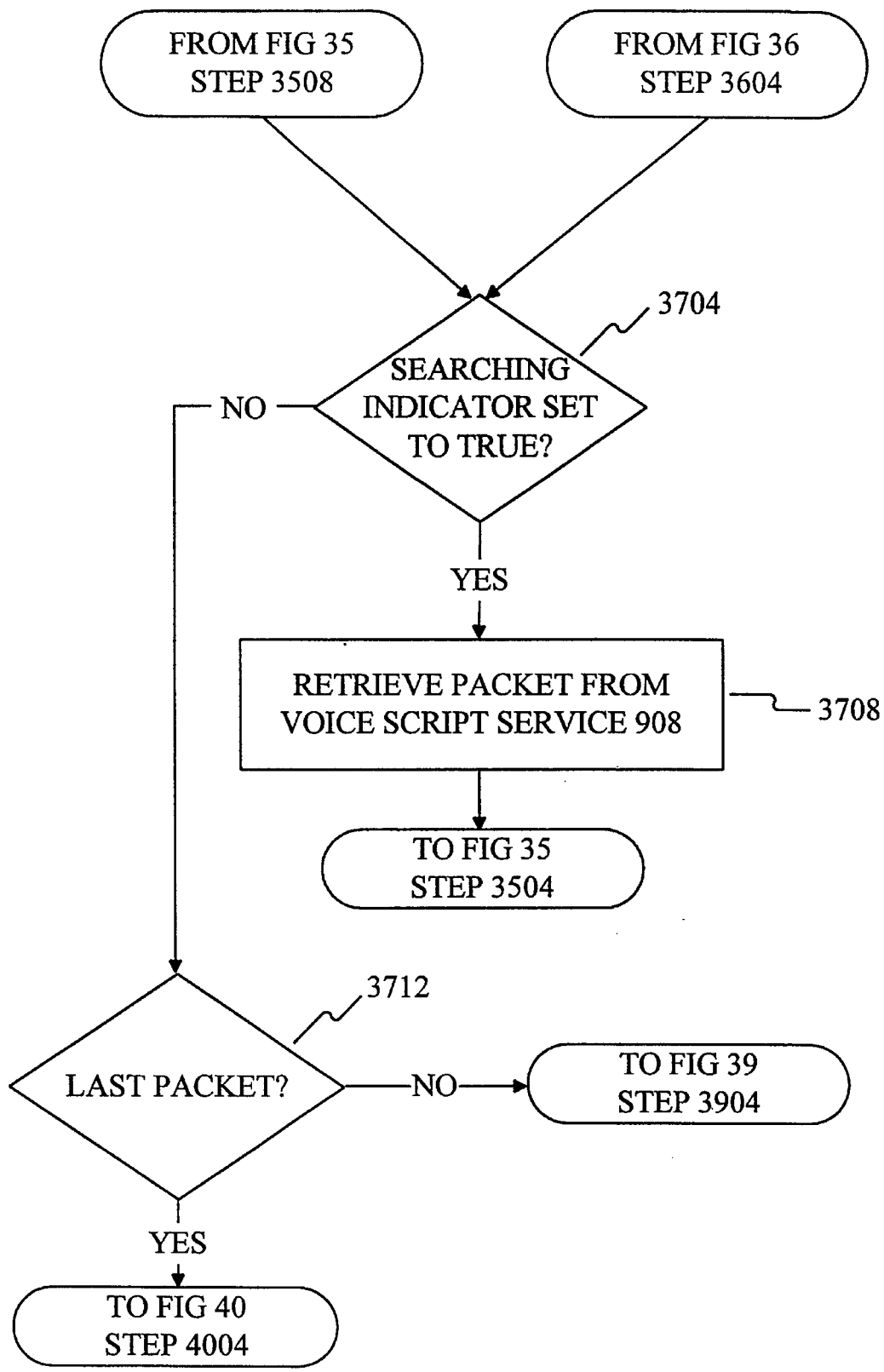

As described above with reference to FIG. 26, in steps 2604 and 2608, play thread 1536B retrieves packets. from the appropriate service 908, 912 and stores these packets in frame block queue 1538. This operation is now described in greater detail with reference to FIG. 34. FIG. 34, which comprises FIGS. 35, 36, 37, 38, 39, and 40, is an operational flow diagram illustrating retrieval of packets and the storage of packets in frame block queue 1538. Referring first to FIG. 35, in a step 3504, play thread 1536B receives a packet from voice script service 908, places the packet into frame block queue 1538, and sets a searching indicator to false. If frame block queue 1538 is not full (decision block 3508), the operation continues at a step 3704 (FIG. 37). If, on the other hand, frame block queue 1538 is full (decision block 3508), play thread 1536B checks to determine whether the packet received is the last packet for the voice script 1008 being played, as illustrated by decision block 3512. If this is not the last packet, the operation continues at step 3804 in FIG. 38. If this is the last packet, the operation continues at FIG. 36 where play thread 1536B checks to determine whether voice script 108 is currently playing, as illustrated by decision block 3604. If the voice script 108 is currently playing, the operation continues at a step 3704 (FIG. 37). If, on the other hand, a voice script 108 is not currently playing (decision block 3604), the operation continues at step 2804 (FIG. 28).

Figure 38:
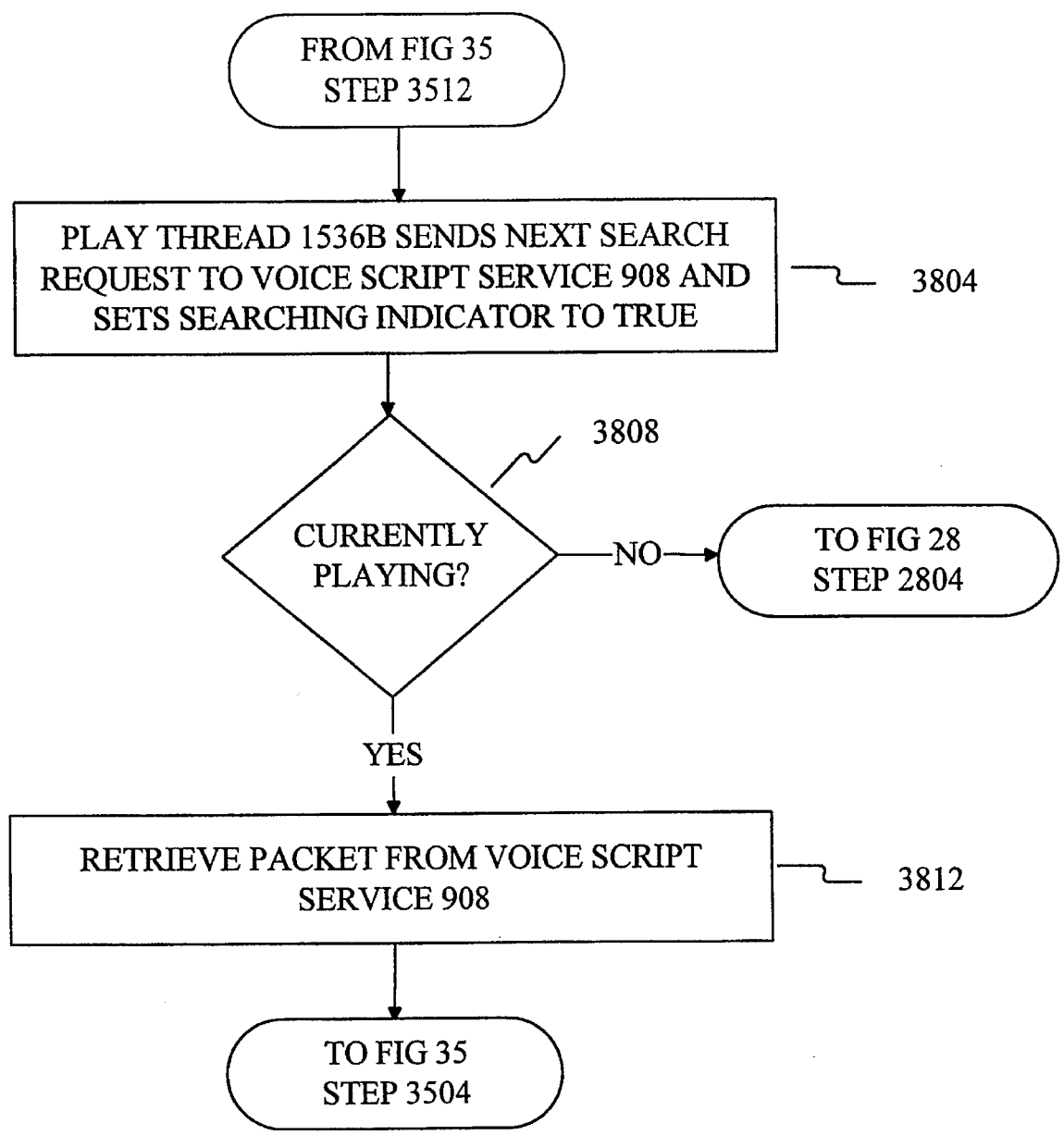

Referring now to FIG. 38, if frame block queue 1538 is not full (decision block 3508) and this is not the last packet, play thread 1536B sends a next search request to voice script service 908 and sets a searching indicator to true. If the script is not currently playing (decision block 3808) the operation continues at step 2804 (illustrated in FIG. 28). If, on the other hand, the script is currently playing, the next packet is retrieved from the voice script service 908. This occurs in a step 3812. At this time, the operation continues at step 3504 (FIG. 35) or play thread 1536Bb receives and queues the packet.

Figure 39:
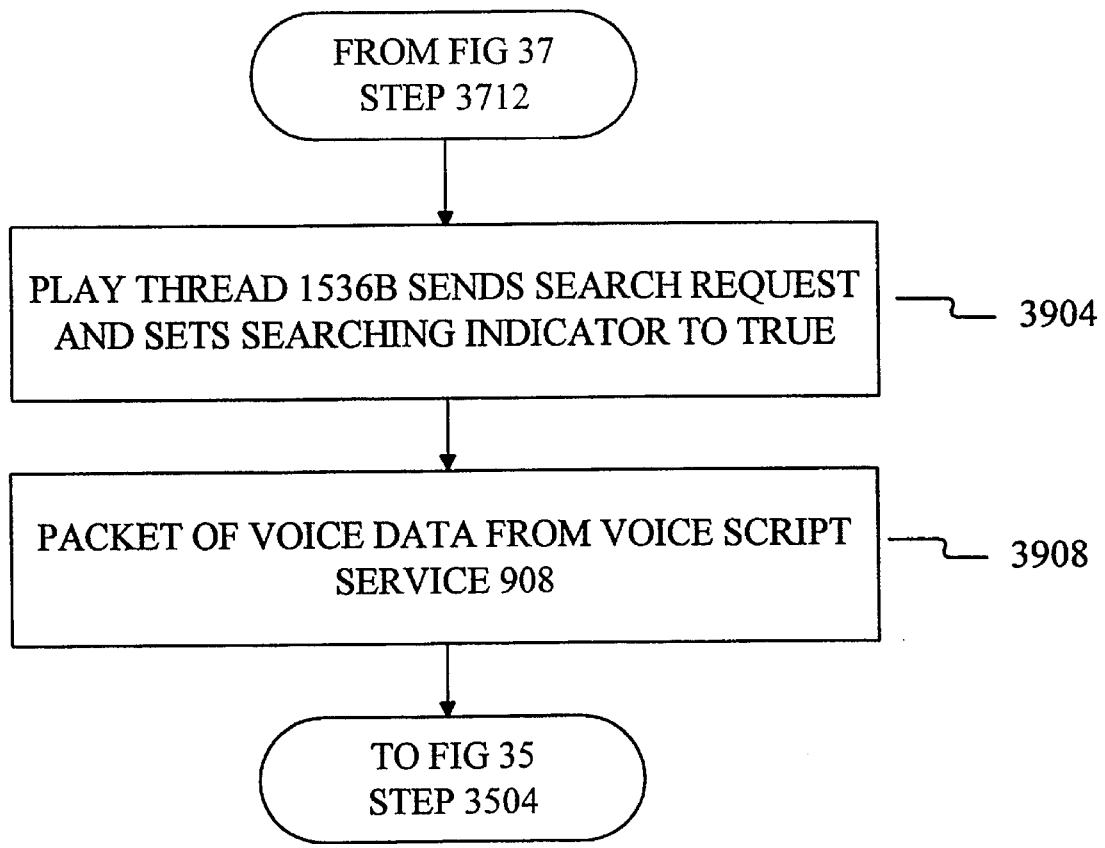

As stated above, if frame block queue 1538 is not full, or if frame block queue 1538 is full and this is the last packet and voice script 1008 is currently playing, the operation continues at step 3704 (illustrated in FIG. 37). Referring now to FIG. 37, if the searching indicator is set to true (illustrated by FIG. 3704), the packet is retrieved from voice script service 908 in a step 3708. At this time, the operation continues at step 3504 (FIG. 35) where play thread 1536B receives the packet and places it into frame block queue 1538. If, on the other hand, the searching indicator is not true, play thread 1536B checks to determine whether this is the last packet (decision block 3712). If it is not the last packet, the operation continues at step 3904, (FIG. 39). If, on the other hand, this is the last packet, the operation continues at step 4004 (FIG. 40).

Referring now to FIG. 39, in a step 3904, play thread 1536B sends a search request to voice script service 908 and sets the searching indicator to true. In a step 3908, a packet of voice data is retrieved from voice script service 908. At this time, the operation continues at step 3504 (FIG. 35) where play thread 1536B receives the packet and places it into frame block queue 1538.

Figure 40:
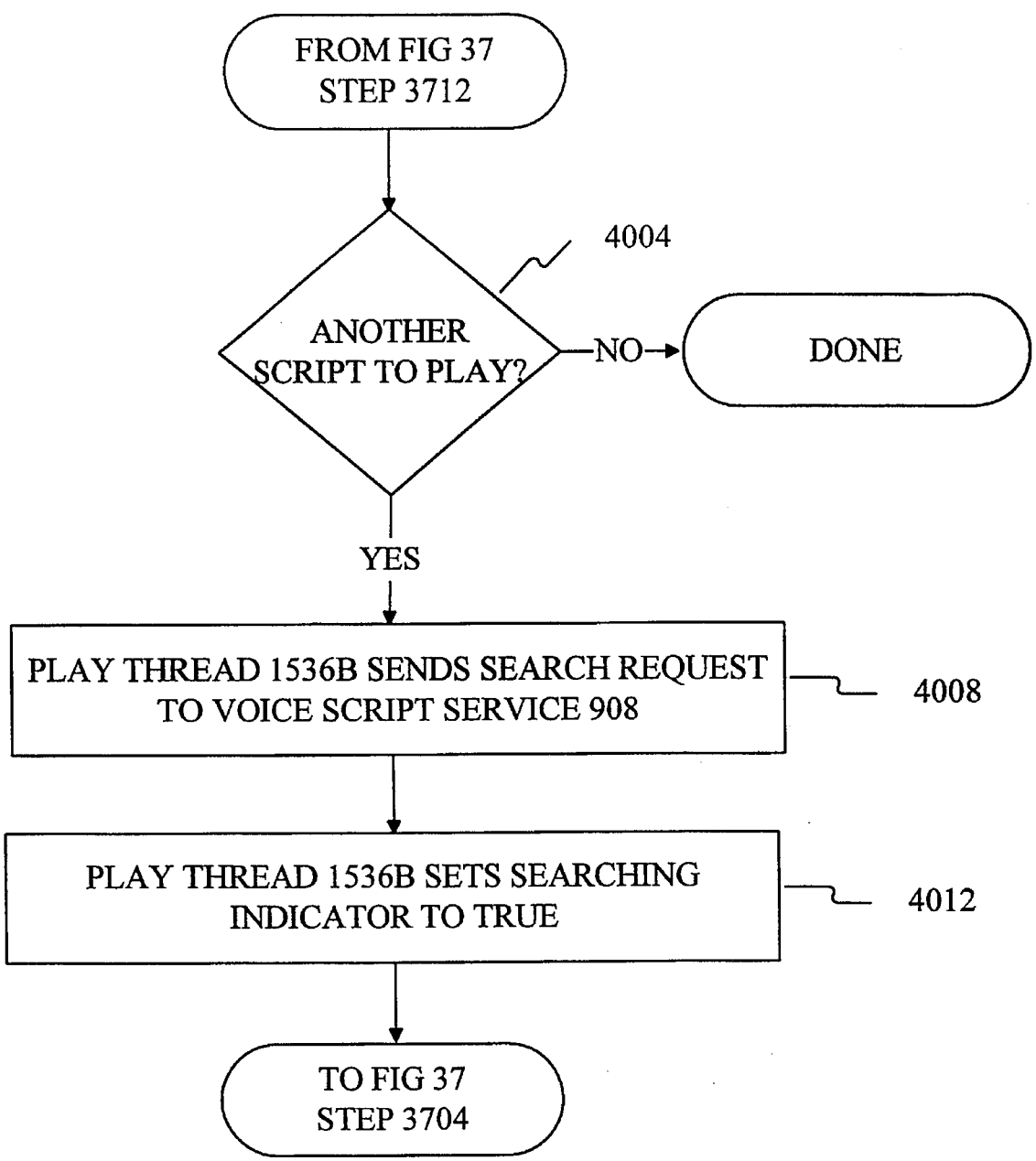

Referring now to FIG. 40, in a step 4004, if there is another voice script 1008 to play, in a step 4008, play thread 1536B sends a search request to voice script service 908. In a step 4012, play thread 1536B sets the searching indicator to true. At this time, the operation continues at step 3704 (FIG. 37). If, on the other hand, in step 4004 there are no more voice scripts 1008 to play at this time, the operation is completed.

In a preferred embodiment, the retrieval of packets from voice script service 908 is accomplished using a CLIF client interface. The CLIF client interface is fully described in Co-Pending Patent Application of Common Assignee, Ser. No. 08/136,211, filed on Oct. 15, 1993, which is incorporated herein by reference in its entirety. According to this embodiment, requests for packets generated by play thread 1536B are sent to the CLIF client interface. The CLIF client interface then retrieves the packet of voice data from voice script service 908 and forwards this packet to play thread 1536B. The CLIF client interface is also used for storing packets to voice script service 908 and for other communications in general.

The process of retrieving packets for playback was described above in terms of retrieving voice data packets for a voice script 1008. This process is the same process used to retrieve a voice message 1308 from voice message service 912.

3.0 DEF

One problem faced by developers of conventional call processing systems is that of developing call processing software that is easily maintainable and highly reconfigurable. Another problem is that of creating a call processing system capable of providing subscriber-unique features and capabilities. As the number of subscribers to the conventional call processing system increases, it becomes increasingly difficult to provide highly maintainable and reconfigurable code to handle a wide variety of custom and/or standard features using conventional software techniques.

In many conventional systems, the call processing software is coded in such a way that when changes are to be made to the system, entire sections of code have to be rewritten and re-compiled. This can be a time-consuming task that requires the platforms on which the code is running to be brought to a non-operational status while the new software is loaded.

In one embodiment, a wide array of subscriber-unique and standard call processing features are provided while eliminating the need to re-compile large portions of operational software. According to the present invention, the call processing operations are driven primarily by data records, known as DEF records. Call processing system 302 uses DEF records in conjunction with call processes to provide subscriber-unique and standard call processing features. A call process is started when a new call enters call processing system 302. The call process accesses one or more data fields in a DEF record that indicate how the call is to be processed. Thus, DEF records can be used to dictate certain subscriber-unique features and generic features as well. When changes are to be made to call processing system 302, the majority of these changes can be made by updating the data fields found in the DEF records. Thus, most changes to call processing system 302 do not require operational software to be modified, re-compiled, and re-loaded.

Figure 41:
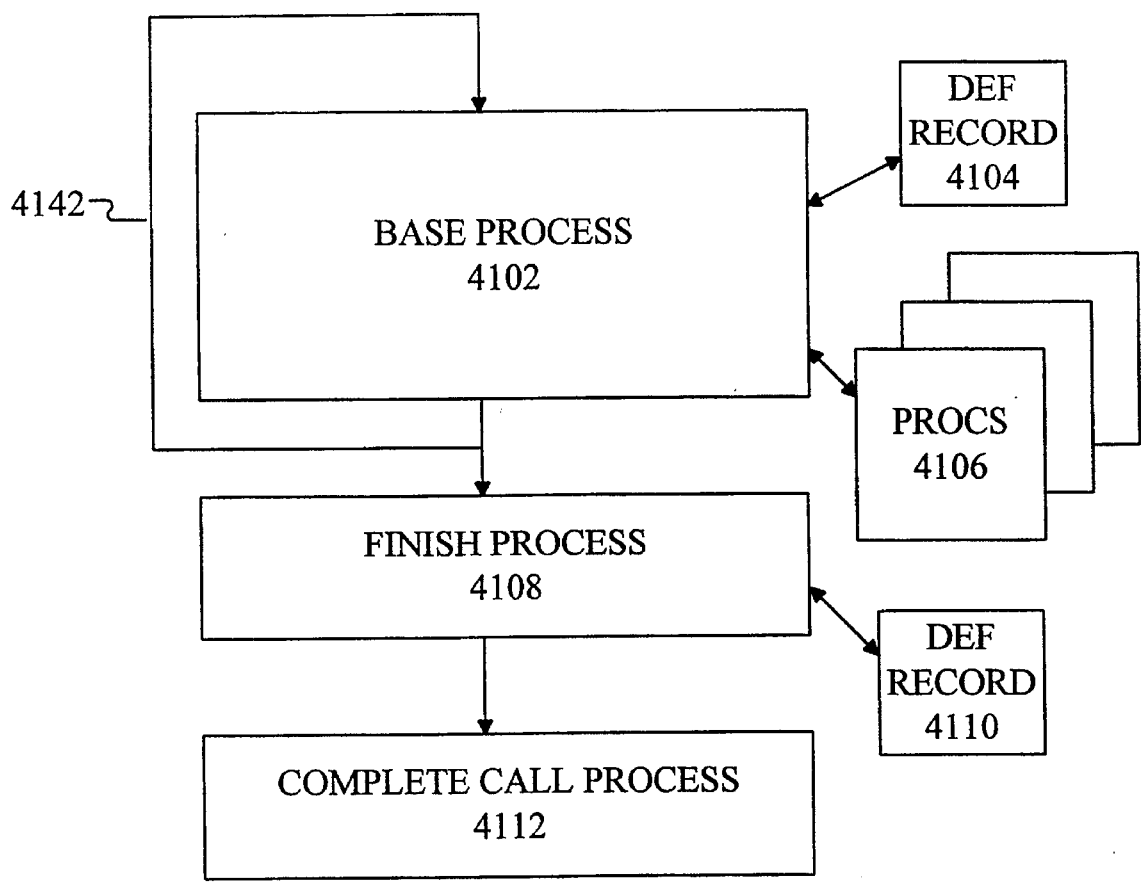
FIG. 41 is a high level block diagram illustrating the processes and DEF records used by a call processing system to process calls.
Figure 42:
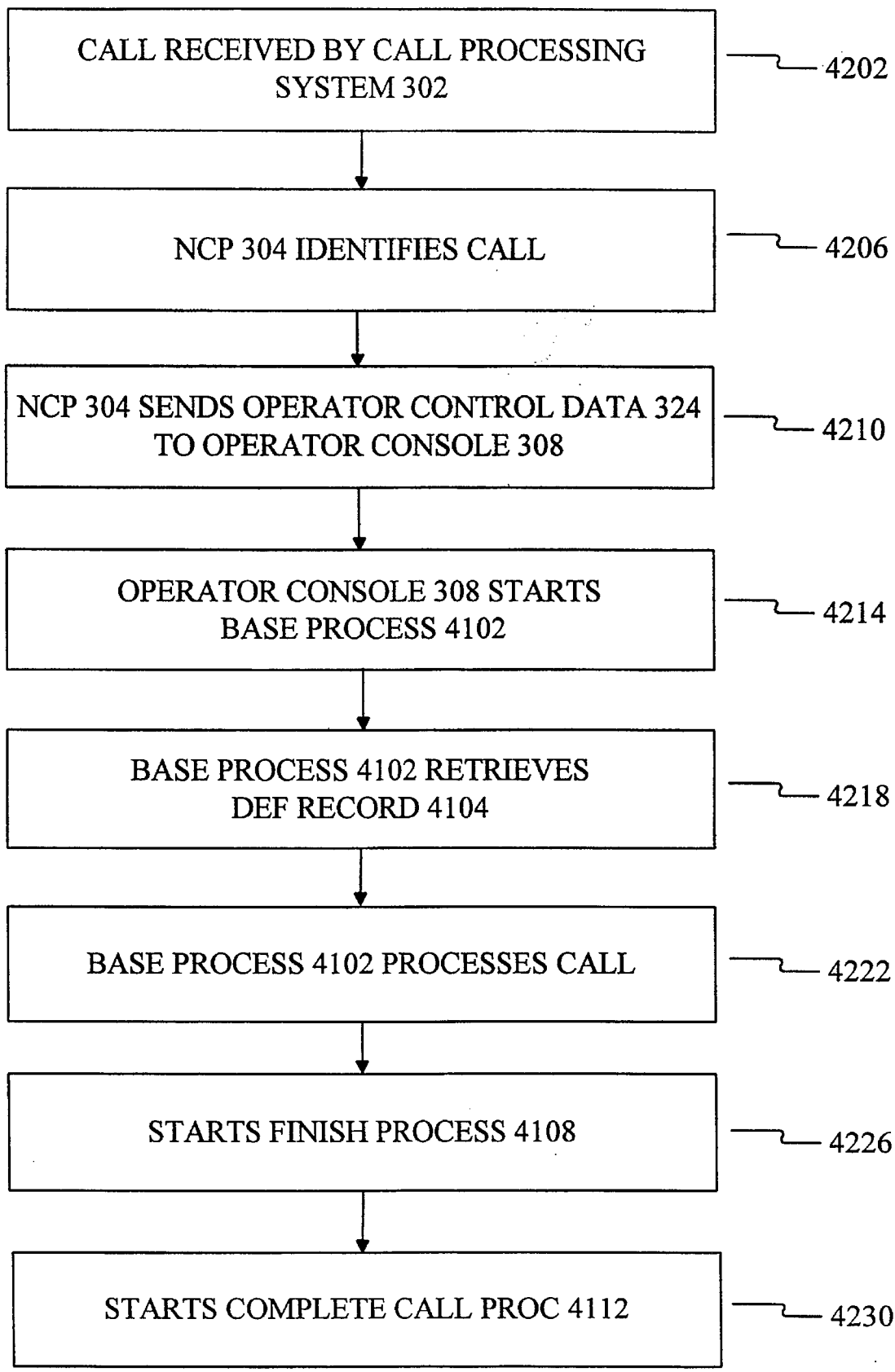
FIG. 42 is an operational flow diagram illustrating the manner in which a call processing system uses DEF records and processes to handle calls.

The manner in which call processing system 302 uses DEF records to process calls is now described. FIG. 41 is a high-level block diagram illustrating the manner in which DEF records are used by call processing system 302 to process calls. FIG. 42 is an operational flow diagram illustrating the manner in which call processing 302 uses DEF records and processes to handle calls. Referring now to FIGS. 41 and 42, in a step 4202, a call is received by call processing system 302. As described above, call data 144 is routed to network control processor 304 and call audio 142 is routed to matrix switch 306. For operator-assisted calls, call audio 142 is then routed to an operator console 308 to provide operator assistance.

In a step 4206, network control processor 304 identifies the call and the type of call being placed. The manner in which network control processor 304 processes the call is described above.

In a step 4210, network control processor sends operator control data 324 to operator console 308. Operator control data 324 includes information required by operator console 308 to process the call. This information includes a base process number, a DEF record number, and other call information such as ANI, called party number, subscriber identification, etc. At this time, operator console 308 can begin processing the call.

In a step 4214, operator console 308 starts a base process 4102. The base process 4 102 started is the base process identified by the base process number that was sent by network control processor 304 with operator control data 324. Base process 4102 is a process template that contains the basic steps that are to be followed by operator console 308 in processing the call. Base process 4102 is coded to look for certain pieces of information within a DEF record 4104. Base process 4 102 uses this information to process the call. This information can dictate that base process 4102 start other processes 4106, wait for user 106 input, or wait for operator instructions.

In a step 4218, base process 4102 retrieves the DEF record 4104 as specified by the DEF record number that was sent with operator control data 324.

In a step 4222, base process 4 102 uses the information in DEF record 4104 to process the call. This process is described in more detail below with retrence to FIGS. 43 and 44.

In one embodiment, when base process 4102 has completed all of its call processing operations, it starts a finish process 4108 and sends a DEF record number identifying a DEF record 4110 that finish process 4108 will use in finishing the call processing. The finish process 4108 is another process that is designed to look for specific data tags 4304 that describe how to finish the call process. For example, finish process 4108 may look for a specific tag 4304. This tag may point to a record that displays keys on the operator screen for the operator to press to complete the call, or that displays (or plays in the case of a voice response unit 334) a closing script.

In a step 4230, finish process 4108 starts to complete call process 4112. Complete call process 4112 completes the call placed by user 106.

Figure 43:
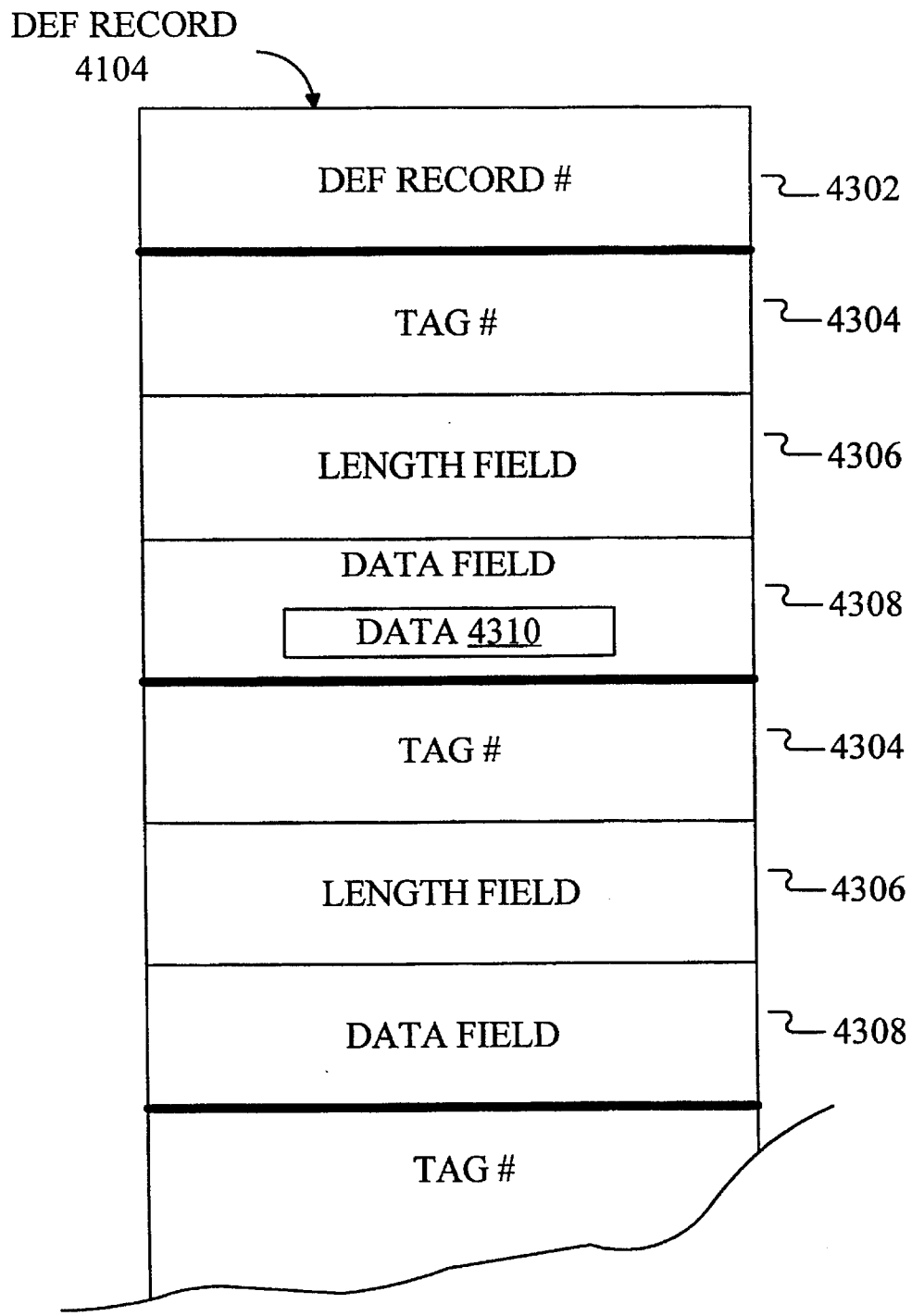
FIG. 43 is a diagram illustrating the structure of a DEF record.

The structure of DEF records 4104 (and 4110 in the case of a finish process 4108) is now more fully described. FIG. 43 is a diagram illustrating the structure of a DEF record 4104 in one embodiment. DEF record 4104 includes a DEF record number 4302. DEF record number 4302 uniquely identifies each DEF record 4104. DEF record number 4102 is sent to operator console 308 with operator control data 324. Network control processor 304 determines which DEF record number 4302 to provide to operator console 308 using call data 344. Different DEF records 4104 may be chosen and identified based on the type of call that is placed, the particular subscriber 114 or other call information. Thus, the operation performed by base process 4102 can be custom tailored based on call data 144 and by the use of different DEF records 4104.

The fields within DEF record 4104 include a tag number 4304, a length field 4306, and a data field 4308. Tag number 4304 is an identifier that base process 4102 uses to find specific data 4310 within DEF record 4104. Length field 4306 specifies the length of data field 4308. Data field 4308 contains data 4310 used in processing the call. Data 4310 can be the actual data used to process the call, or can be a reference to data in another data file, data table, or database.

Depending on the particular DEF record 4104, any number of fields, which comprise tag numbers 4304, length fields 4306 and data fields 4308, can be provided in a DEF record 4104.

Base process 4102 is coded to look for certain tag numbers 4304 within DEF record 4104 at certain times. For example, base process 4102 may be coded to look for tag number 1, then tag number 2, then tag number 3. Tag number 1 may be a tag identifying a greeting script to be played by an automated voice response unit 334, or read by an operator at a manual operator console 332. In this case, base process 4102 looks in DEF record 104 for tag number 1 and reads data 4310 in data field 4308 associated with tag number 1. In the case of a greeting script, data 4310 will point to the script to be played, read, or synthesized to user 106. The script can be customized to a particular customer 110 in a number of different ways. One way is for network control processor 304 to provide customer 110 identification to operator console 308 with operator control data 324. Operator console 308 would then use this identification information in conjunction with data 4310 in data field 4308 associated with tag number 1 to read the carrier-unique greeting script found in a database. For example, operator console 308 will go to voice script database 1004 to retrieve the voice script 1008 identified by data 4310 and the carrier identification. Operator console 308 (i.e., automated voice response unit 334) then plays this voice script 1008 to user 106. For example, the voice script 1008 may say "Welcome to XYZ Company's voice mail system," or "Thank you for using XYZ Long Distance Company. Please enter your calling card number now."

In addition to playing voice scripts 1008 and voice messages 1308, base process 4102 can be coded to find tags to perform numerous other functions. For example, base process 4102 can be coded to perform validation of data received. For example, base process 4102 may be coded to retrieve another tag that identifies that the called number should be validated to verify that the called number is the correct number of digits (for example, 10 digits). In this case, when base process reads the data 4310 associated with that tag number, base process 4102 may start an additional process 4106 that performs the validation. This results in a validation request being sent to a validation system. Once base process 4102 starts the additional process 4106, it doesn't necessarily have to wait for the additional process 4106 to be completed before moving on to the next tag.

As another example, base process 4102 may be coded to retrieve another tag that requires that the calling card number be validated. In this case, data field 4308 associated with that tag will direct base process 4102 to send a request to a validation system to validate the calling card number. Base process 4102 continues to read tags and perform the operations dictated by the tags. Thus, changes to call processing system 302 can be made by redefining the data 4310 in data fields 4308.

Base process 4 102 need not look for every tag number 4304 within a DEF record 4104. It may, instead, only be coded to search for certain tag numbers 4304 with a DEF record 4104.

When processing the call, base process 4102 is also capable of accepting and responding to inputs from user 106. For example, data 4310 may also include strings which base process 4102 uses to match against user input. For example, base process 4102 may be programmed to retrieve 4304 that define data fields 4308 to match user input strings "1#," "2#," "3#." For each of these user input sequences, data 4310 uniquely defines a process 4106 to be started or another base process 4102 to be started. For example, one particular DEF record 4104 may define that when a user dials 1#, a second base process 4102 should be started. Data 43 0 identifies this base process with a base process number and can also identify a specific DEF record 4104 for the new base process 4102 to use. For example, a user dialing 1# may indicate that the user wishes to access a speed-dial feature. In this case, data 4310 and DEF record 4104 will tell base process 4102 to start a speed-dial process when this string is detected.

To recapitulate, processes 4102, 4106, perform operations that can be done in a number of different ways. The manner in which the operation is performed for a specific call is dictated by the data 4420 pointed to by the tags 4304 referenced. As the process 4102, 4106 performs an operation, it may come to a point where data 4310 from the DEF record 4104 is required. At this point, the tag 4304 is referenced and its associated data 4310 retrieved.

Consider the base process 4102 as an example. A base process 4102 is typically designed to collect information from a user 106, validate the information collected, and pursue a course of action based on the information collected and the results of the validation. The general framework for completing these operations is coded in the base process 4102: it must prompt the user for information, validate the information, and follow a course of action. The data 4310 retrieved using tags 4304 provides the specific actions to be followed by the process 4102. These can include, but are not limited to: the manner in which the user is prompted, the order in which information is collected, the manner in which information is validated, the number of additional chances a user 106 is given after a failed validation, the action to take in the event the number of additional chances is exhausted, the amount of time to wait for input, the action to take if the time-out period expires, and a large number of other parameters.

Thus, the data 4310 found in DEF records 4104 dictates how the call is to be processed by base process 4102. New features can be added, existing features changed or deleted, and features customized for specific users by updating one or more DEF records 4104. Thus, operational code does not have to be modified and re-compiled to implement these types of changes.

Figure 44:
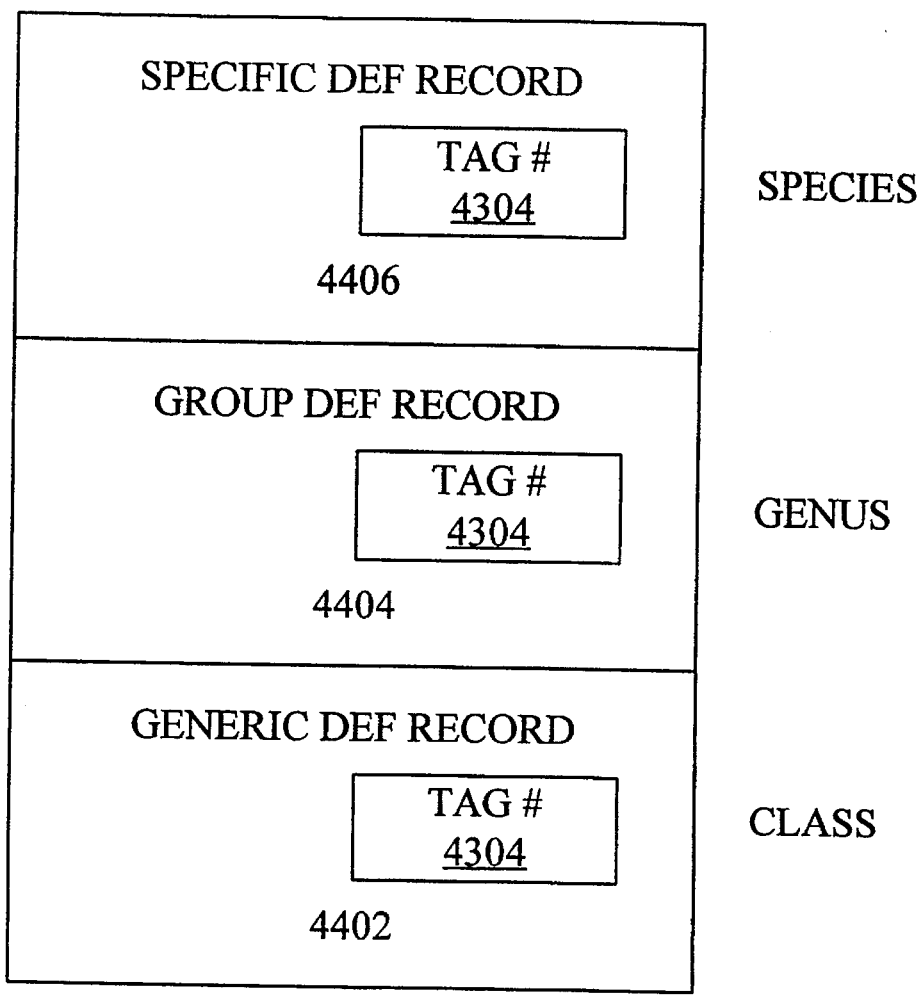
FIG. 44 is a diagram illustrating how different levels of DEF records can be used to optimize data storage.

To minimize the amount of duplication of data 4310, DEF records can be defined at various levels. FIG. 44 is a diagram illustrating how different levels of DEF records 4104 can be used to optimize data storage.

Referring now to FIG. 44, a generic DEF record 4402 includes data 4310 that is common to all subscribers 114. A group DEF record 4404 can contain data 4310 that is unique to a customer 110. Because this data 4310 is unique to a customer 110, it is not contained in generic DEF record 4402. If a particular customer 110 has a unique feature that is different from other carriers 110, data 4310 for that feature is found in group DEF record 4404.

Specific DEF record 4406 defines data 4310 that is specific to a user 106. If a user 106 subscribes to features that are unique from other users 106, data 4310 for those features will be contained in specific DEF record 4406.

In search for data 4310 using tag numbers 4304, base process 4102 will first staff in specific DEF record 4406. If tag number 4304 is not found in specific DEF record 4406, base process 4102 then searches group DEF record 4404. If tag number 4304 is not found in group DEF record 4404, base process 4102 then goes to generic DEF record 4402 to find that tag number 4304. Thus, if a user 106 has a unique feature, or that user's call is to be handled uniquely, the data 4310 instructing base process 4102 on how to handle that call will be found in specific DEF record TB206 and used.

A DEF record manager is a set of functions calls used to manage DEF records read by the application (for example, the operator console 308). The DEF record manager associates a DEF record with a particular call process (base process 4102). The allows the application to search for any tag 4304 in the system or tags 4304 within a particular DEF record 4104. This is done so that some tags 4304 may be accessed by any process 4102, 4106 that may require it while other tags 4304 can be restricted only to the process 4102, 4106 reading the DEF record 4104 containing the tag 4304.

4.0 Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be noted that the block diagrams depicted throughout this document illustrate an example of how the functionality of the various systems can be implemented. Although physical or logical architectures may be inferred by the diagrams and the text describing these diagrams, it is important to note that this is done by way of example only. Numerous alternative physical and/or logical architectures can be chosen when implementing the systems described herein.

What is claimed is:

1. A method for storing voice data for a call processing system, comprising the steps of:
    (a) recording audio voice by an audio driver and storing said audio voice in a first data buffer;
    (b) encapsulating said recorded audio voice stored in said first data buffer into data packets, thereby creating voice data, wherein said step of encapsulating comprises the steps of:
        i. checking said audio voice in said first data buffer to determine whether a configurable length of silence is detected; and
        ii. commanding said audio driver to stop recording if said configurable length of silence is detected; and
    (c) storing said voice data in a database, wherein said step of storing comprises the steps of:
        i. checking said data packets for silence;
        ii. discarding one of said data packets if said one of said data packets does not contain any frames that have detectable voice energy; and
        iii. storing one of said data packets if said one of said data packets does contain frames that have detectable voice energy.

2. The method of claim 1, wherein said audio voice is an audio message and said voice data is a voice message, further comprising the steps of:
    (d) sequentially numbering said data packets; and
    (e) assigning a message number to said voice data.

3. The method of claim 1, wherein step (a) for recording audio voice comprises the steps of:
    i. recording audio voice as digital data;
    ii. storing said audio voice in a first data buffer; and
    iii. indicating to an audio thread when said first data buffer is full.

4. The method of claim 3, wherein step (a) for recording audio voice further comprises the step of sending an event to said audio thread indicating that recording has begun.

5. The method of claim 3, wherein step (a) further comprises the steps of:
    iv. commanding an audio driver to begin recording said audio voice and storing said audio voice in said first data buffer; and
    v. commanding said audio driver to continue recording said audio voice and storing said audio voice in a second data buffer.

6. The method of claim 3, wherein said method for storing voice data further comprises the steps of:
    (d) placing said data packets into a frame block queue; and
    (e) setting an indicator that signals that said first data buffer is available for storing additional audio voice.

7. The method of claim 6, wherein said step of checking said audio voice comprises the steps of:
    (i) checking each frame of audio voice as it is being encapsulated into said data packets and determining a number of silent frames; and
    (ii) comparing the number of silent frames to a predetermined length of time to determine whether said configured length of silence is exceeded; and
wherein step (b) further comprises the step of instructing a record thread to check data packets for silence if said configurable length of silence is exceeded.

8. The method of claim 5, further comprising the steps of:
    (d) detecting a DTMF tone indicating that recording is to be stopped;
    (e) stopping said recording of said audio voice; and
    (g) checking said data packets for silence.

9. A system for storing voice data for a call processing system, comprising:
    an audio driver for recording aubio voice and storing said audio voice in a first data buffer;

means for encapsulating said recorded audio voice stored in said first data buffer into data packets, thereby creating voice data, wherein said means for encapsulating comprises:

means for checking said audio voice in said first data buffer to determine whether a configurable length of silence is detected; and means for commanding said audio driver to stop recording if said configurable length of silence is detected; and means for storing said voice data in a database, wherein said means for storing comprises:

means for checking said data packets for silence;

means for discarding one of said data packets if said one of said data packets does not contain any frames that have detectable voice energy; and means for storing one of said data packets if said one of said data packets does contain frames that have detectable voice energy.

10. The system of claim 9, wherein said audio voice is an audio message and said voice data is a voice message, further comprising:

means for sequentially numbering said data packets; and means for assigning a message number to said voice data.

11. The system of claim 9, wherein said means for recording audio voice comprises:

means for recording audio voice as digital data;

means for storing said audio voice in a first data buffer; and means for indicating to an audio thread when said first data buffer is full.

12. The system of claim 11, wherein said means for recording audio voice further comprises means for sending an event to said audio thread indicating that recording has begun.

13. The system of claim 11, wherein said means for recording further comprises:

means for commanding an audio driver to begin recording said audio voice and storing said audio voice in said first data buffer; and means for commanding said audio driver to continue recording said audio voice and storing said audio voice in a second data buffer.

14. The system of claim 11, further comprising:

means for placing said data packets into a frame block queue; and means for setting an indicator that signals that said first data buffer is available for storing additional audio voice.

15. The system of claim 9, wherein said means for checking said audio voice comprises:

means for checking each frame audio voice as it is being encapsulated into said data packets and determining a number of silent frames;

means for comparing the number of silent frames to a predetermined length of time to determine whether said configured length of silence is exceeded; and wherein said means for encapsulating further comprises means for instructing a record thread to check data packets for silence if said configurable length of silence is exceeded.

16. The system of claim 13, further comprising:

means for detecting a DTMF tone indicating that recording is to be stopped;

means for stopping said recording of said audio voice; and means for checking said data packets for silence.

* * * * *